(12) United States Patent
Asuna et al.

(10) Patent No.: US 11,497,997 B2
(45) Date of Patent: Nov. 15, 2022

(54) SERVER SYSTEM, GAME SYSTEM, AND GAME EXECUTION METHOD

(71) Applicant: BANDAI NAMCO Entertainment Inc., Tokyo (JP)

(72) Inventors: Kouji Asuna, Tokyo (JP); Kiyoshi Minami, Yokohama (JP); Tatsuki Mizuno, Yamato (JP); Kenichi Ogura, Kodaira (JP); Akio Onda, Warabi (JP); Takashi Aoki, Funabashi (JP); Shintaro Murai, Tokyo (JP); Yusuke Tsutsumi, Tokyo (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 0 days.

(21) Appl. No.: 17/133,013

(22) Filed: Dec. 23, 2020

(65) Prior Publication Data

US 2021/0197086 A1 Jul. 1, 2021

(30) Foreign Application Priority Data

Dec. 27, 2019 (JP) .............................. JP2019-238515
Dec. 27, 2019 (JP) .............................. JP2019-238516
Dec. 27, 2019 (JP) .............................. JP2019-238517

(51) Int. Cl.
*A63F 13/00* (2014.01)
*A63F 13/45* (2014.01)
*A63F 13/352* (2014.01)
*A63F 13/533* (2014.01)
*A63F 13/792* (2014.01)
*A63F 13/798* (2014.01)

(52) U.S. Cl.
CPC ............ *A63F 13/45* (2014.09); *A63F 13/352* (2014.09); *A63F 13/533* (2014.09); *A63F 13/792* (2014.09); *A63F 13/798* (2014.09)

(58) Field of Classification Search
CPC .. G07F 17/3239; G07F 17/3262; A63F 13/52; A63F 13/58; A63F 13/816
See application file for complete search history.

(56) References Cited

U.S. PATENT DOCUMENTS

| 8,721,442 | B2* | 5/2014 | Sato ...................... | A63F 13/812 463/36 |
| 8,961,305 | B2* | 2/2015 | Takeda .................. | A63F 13/323 463/31 |
| 9,358,457 | B2* | 6/2016 | Takeda .................. | A63F 13/211 |

FOREIGN PATENT DOCUMENTS

| JP | 2011-050577 A | 3/2011 |
| JP | 2016-146914 A | 8/2016 |
| JP | 2016-168349 A | 9/2016 |

(Continued)

OTHER PUBLICATIONS www.epicgames.com/fortnite/ja/home; discussed on p. 2 of the specification; retrieved on Dec. 23, 2020 (Corresponding English version: www.epicgames.com/fortnite/en-US/home).

*Primary Examiner* — David L Lewis
*Assistant Examiner* — Eric M Thomas
(74) *Attorney, Agent, or Firm* — Posz Law Group, PLC

(57) ABSTRACT

A server is configured to detect an option element of an advantage option for an option set player and customize a specification of the advantage option that has been set or to be set in the future, based on the option element thus detected, to increase the attractiveness of the advantage option so that the player will be more motivated to actively acquire the advantage option.

41 Claims, 26 Drawing Sheets

(56) References Cited

FOREIGN PATENT DOCUMENTS

| | | |
|---|---|---|
| JP | 2017-064082 A | 4/2017 |
| JP | 2017-174365 A | 9/2017 |
| JP | 2018-005705 A | 1/2018 |
| JP | 2018-029808 A | 3/2018 |
| JP | 2019-017975 A | 2/2019 |
| JP | 2019-213709 A | 12/2019 |
| JP | 2019-213712 A | 12/2019 |

\* cited by examiner

| | | MISSION INFORMATION | | | ADVANTAGE OPTION INFORMATION | | PLAYER ID ADVANTAGE OPTION SETTING FLAG INFORMATION MISSION PROGRESS FLAG INFORMATION HISTORY INFORMATION | | | |
|---|---|---|---|---|---|---|---|---|---|---|
| MISSION ID | ORDER | TYPE | CONTENT INFORMATION | MISSION ACCOMPLISHMENT CONDITION | REWARD ID | OPTION SPECIFICATION INFORMATION | U001 ○ | U002 ? | U003 ○ | ... |
| M001 | 1 | ITEM | MISSION 1 | CONDITION 1 | B001 | FIXED: 001 INDIVIDUAL: OP01 | ○ | --- | ○ | ... |
| M002 | 2 | ITEM | MISSION 2 | CONDITION 2 | B002 | FIXED: 001 INDIVIDUAL: OP02 | | --- | ○ | ... |
| M003 | 3 | ITEM | MISSION 3 | CONDITION 3 | B003 | FIXED: 001 INDIVIDUAL: OP03 | | --- | ○ | ... |
| M004 | 4 | TASK | MISSION 4 | CONDITION 4 | B004 | FIXED: 001 INDIVIDUAL: OP04 | | --- | | ... |
| ... | ... | ... | ... | ... | ... | | ... | ... | ... | ... |

FIG. 5

| REWARD ID | CONTENT INFORMATION | REWARD CHANGE INFORMATION |
|---|---|---|
| B001 | CONTENT INFORMATION 1 | CHANGE INFORMATION 1 |
| B002 | CONTENT INFORMATION 2 | CHANGE INFORMATION 2 |
| B003 | CONTENT INFORMATION 3 | CHANGE INFORMATION 3 |
| B004 | CONTENT INFORMATION 4 | CHANGE INFORMATION 4 |
| B005 | CONTENT INFORMATION 5 | CHANGE INFORMATION 5 |
| ... | ... | ... |

FIG. 6

| | | | | | ADVANTAGE OPTION INFORMATION (ADVANTAGE OPTION A) | | | |
|---|---|---|---|---|---|---|---|---|
| | MISSION INFORMATION | | | | | PLAYER ID | | |
| | | | | | | ADVANTAGE OPTION SETTING FLAG INFORMATION MISSION PROGRESS FLAG INFORMATION | | |
| MISSION ID | ORDER | TYPE | CONTENT INFORMATION | MISSION ACCOMPLISHMENT CONDITION | REWARD ID | U001 ○ | U002 × | U003 ○ |
| M001 | 1 | ITEM | MISSION 1 | CONDITION 1 | B001 | ○ | — | ○ |
| M002 | 2 | ITEM | MISSION 2 | CONDITION 2 | B002 | | — | ○ |
| M003 | 3 | ITEM | MISSION 3 | CONDITION 3 | B003 | | — | ○ |
| M004 | 4 | TASK | MISSION 4 | CONDITION 4 | B004 | | | |
| ... | ... | ... | ... | ... | ... | ... | ... | ... |

FIG. 13

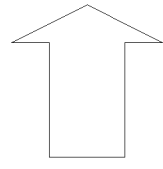
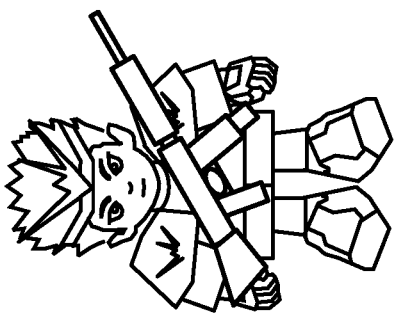
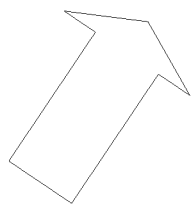
FIG. 20

FIG. 22

Initial state:

| LOGIN | ACQUIRABLE OR NOT | LOGIN BONUS |
|---|---|---|
| DAY 1 | ○ | 20 COINS |
| DAY 2 | | DANCE 1 (EMOTE) |
| DAY 3 | ○ | BRONZE SWORD |
| DAY 4 | ○ | SWORD ATTACK POWER +10 |
| DAY 5 | | SILVER MEDAL |
| DAY 6 | | SAGE'S STONE |
| ... | ... | ... |

↑ MISSION ACCOMPLISHED! + NORMAL REWARD

LOGIN BONUS RESULT WHEN NORMAL REWARD IS ACQUIRED

| LOGIN | ACQUIRABLE OR NOT | LOGIN BONUS |
|---|---|---|
| DAY 1 | ○ | 20 COINS |
| DAY 2 | ○ | DANCE 1 (EMOTE) |
| DAY 3 | ○ | BRONZE SWORD |
| DAY 4 | ○ | SWORD ATTACK POWER +10 |
| DAY 5 | ○ | SILVER MEDAL |
| DAY 6 | ○ | SAGE'S STONE |
| ... | ... | ... |

↑ MISSION ACCOMPLISHED! + BILLING AMOUNT REACHED XX YEN! (REWARD CHANGE)

LOGIN BONUS RESULT WHEN REWARD IS CHANGED

| LOGIN | ACQUIRABLE OR NOT | LOGIN BONUS |
|---|---|---|
| DAY 1 | ○ | 20 COINS |
| DAY 2 | ○ | SUPER DANCE 1 (EMOTE) |
| DAY 3 | ○ | BRONZE SWORD |
| DAY 4 | ○ | SWORD ATTACK POWER +10 |
| DAY 5 | ○ | GOLD MEDAL |
| DAY 6 | ○ | SAGE'S STONE HYPER |
| ... | ... | ... |

SERVER SYSTEM, GAME SYSTEM, AND GAME EXECUTION METHOD

Japanese Patent Applications Nos. 2019-238515, 2019-238516 and 2019-238517, filed on Dec. 27, 2019, are hereby incorporated by reference in their entirety.

BACKGROUND OF THE INVENTION

The present invention relates to a server system, a game system, a game execution method, and the like.

Conventionally, not only games that are completed within a single standalone device, but also a large number of online games that can be played over a communication network such as a social game (a game using a communication-based networking service known as a social networking service (SNS)) have been widely available.

Furthermore, in all types of games, such as match-up games including race games and sport games, RPGs, or simulation games, a system has been known in which missions (such as a game level to be reached or clearing a predetermined game stage or task) are set in advance, and the game progresses or is executed with players accomplishing the missions in the game.

In particular, many systems have been provided that implement a game in which a player acquires a reward each time the player accomplishes a mission. For example, in one known game system, a reward to be acquired by accomplishing a mission becomes more advantageous for a player who has obtained an option effective within a predetermined period than that for a player who has not obtained the option (for example, the official website of FORTNITE [searched on Oct. 30, 2019] (URL: https://www.epicgame.com/fortnite/ja/home)).

In the game system according to the official website of FORTNITE [searched on Oct. 30, 2019] (URL: https://www.epicgame.com/fortnite/ja/home), an option is provided as a common option to all the players, meaning that some players may not find the reward so attractive. Thus, such players are not so motivated to actively obtain the option.

In addition, in the game system according to the official website of FORTNITE [searched on Oct. 30, 2019] (URL: https://www.epicgame.com/fortnite/ja/home), a player who has obtained such an option to make the reward advantageous is not necessarily capable of receiving the advantage.

This may result in the game being less entertaining, and making the motivation to obtain the special option difficult to maintain.

Specifically, for such a game system or the like, the type of the mission and the type of the reward acquired by accomplishing the mission are often set in advance by the game provider side. Thus, for example, there may be a case where many missions difficult to accomplish by a player may be set, with a reward desired by the player set for such difficult missions. Furthermore, the desired reward may be rarely set.

Thus, in such a case, a player who has obtained an option to make the reward advantageous may not necessarily be capable of easily acquiring the reward to be acquired within a valid period.

As a result, the game may become less entertaining, and the motivation to obtain the special option may become low.

Furthermore, in the game system according to the official website of FORTNITE [searched on Oct. 30, 2019] (URL: https://www.epicgame.com/fortnite/ja/home) and the like, a player who has the option has an advantage in the game over one who does not, but there is no difference in advantage between players who have the option. Thus, there is a room for improvement in terms of playability based on the option.

SUMMARY

The invention can provide a game system that can provide an advantage option to a player while taking the player's characteristics into consideration, so that the attractiveness of the option can be increased and the motivation of the player to actively obtain the option can be increased.

The invention can further provide a game system and the like that can make the setting and execution timing of a mission to be accomplished by a player within a given valid period flexible, so that the game can be more entertaining and motivation for obtaining an option for making the reward to be acquired advantageous can be increased.

The invention can further provide a game system and the like that can increase the attractiveness of an option for giving an advantage to a player in a game in which the option can be set, and can make the game more entertaining by incorporating game characteristics of the option.

According to a first aspect of the invention, there is provided a server system configured to cause a terminal device, connected to the server system via a network, to execute a game, the server system comprising a processor programmed to:

receive an operation instruction from a player via the terminal device;

set, for the player, based on the operation instruction from the player that has been received, an advantage option indicating an option to give an advantage in the game to the player;

control a storage storing, as advantage option information, information of a specification of the advantage option including at least mission information defining a mission accomplishment condition indicating a condition of a mission to be accomplished within a given valid period by the player for which the advantage option is set and a reward to be acquired by the player upon accomplishing the mission;

make the game progress, for an option set player that is the player for which the advantage option is set or a player character that is an operation target of the option set player, based on the operation instruction from the option set player and the advantage option information associated with the advantage option set for the option set player;

execute reward control processing of setting, when the option set player is determined to have satisfied the mission accomplishment condition defined in the mission information within the valid period, the reward defined in the mission information to be acquirable by the option set player;

execute option status detection processing of detecting as an option status, a given status of an option element indicating an element related to the advantage option set for the option set player;

execute specification change processing of changing, based on a detection result of the option status detection processing, at least one of (a) the specification of a set advantage option indicating the advantage option that is set for the option set player, and (b) the specification of another advantage option different from the set advantage option set for the option set player; and provide game information of the game including information related to the reward acquired, to the terminal device.

According to a second aspect of the invention, there is provided a game execution method of causing a terminal device to execute a game, the method comprising:

executing reception processing of receiving an operation instruction from a player via the terminal device;

setting, for the player, based on the operation instruction from the player that has been received, an advantage option indicating an option to give an advantage in the game to the player, controlling a storage storing, as advantage option information, information of a specification of an advantage option including at least mission information defining a mission accomplishment condition indicating a condition of a mission to be accomplished within a given valid period by the player for which the advantage option is set, and a reward to be acquired by the player upon accomplishing the mission;

making the game progress, for an option set player that is the player for which the advantage option is set or a player character that is an operation target of the option set player, based on the operation instruction from the option set player and advantage option information associated with the advantage option set for the option set player;

executing reward control processing of setting, when the option set player is determined to have satisfied a mission accomplishment condition defined in the mission information within the valid period, a reward defined in the mission information to be acquirable by the option set player;

executing option status detection processing of detecting as an option status, a given status of an option element indicating an element related to the advantage option set for the option set player;

executing specification change processing of changing, based on a detection result of the option status detection processing, at least one of (a) the specification of a set advantage option indicating the advantage option that is set for the option set player, and (b) the specification of another advantage option indicating another advantage option to be set for the option set player after the valid period ends; and displaying game information of the game including information related to the reward acquired, on the terminal device.

According to a third aspect of the invention, there is provided a game system configured to execute a game, the game system comprising a processor programmed to: receive an operation instruction from a player;

a setting unit configured to set, for the player, based on the operation instruction from the player that has been received, an advantage option indicating an option to give an advantage in the game to the player;

control a storage storing, as advantage option information, information of a specification of an advantage option including at least mission information defining a mission accomplishment condition indicating a condition of a mission to be accomplished within a given valid period by the player for which the advantage option is set, and a reward to be acquired by the player upon accomplishing the mission;

make the game progress, for an option set player that is the player for which the advantage option is set or a player character that is an operation target of the option set player, based on the operation instruction from the option set player and advantage option information associated with the advantage option set for the option set player; a reward control unit configured to execute reward control processing of setting, when the option set player is determined to have satisfied the mission accomplishment condition defined in the mission information within the valid period, a reward defined in the mission information to be acquirable by the option set player;

execute option status detection processing of detecting as an option status, a given status of an option element indicating an element related to the advantage option set for the option set player;

execute specification change processing of changing, based on a detection result of the option status detection processing, at least one of (a) the specification of a set advantage option indicating the advantage option that is set for the option set player, and (b) the specification of another advantage option indicating another advantage option to be set for the option set player after the valid period ends; and display on a display, game information related to the game including information of the reward acquired.

According to a fourth aspect of the invention, there is provided a server system configured to cause a terminal device, connected to the server system via a network, to execute a game, the server system comprising a processor programmed to:

receive an operation instruction from a player via the terminal device;

execute the game based on the operation instruction from the player that has been received;

control a storage storing mission information in which a mission accomplishment condition indicating a condition of a mission to be accomplished within a given valid period by the player and a reward acquired by the player when the mission is accomplished are defined in association with a type of an advantage option indicating an option for giving an advantage to the player in the game;

execute, based on a given selection instruction, selection setting processing of setting, for the player, when an advantage option associated with the player is selected from a plurality of the advantage options as a selected advantage option, first mission information stored in association with the selected advantage option;

execute, when a first mission accomplishment condition indicating the mission accomplishment condition defined in the first mission information is determined to be satisfied in the game within the valid period, reward control processing of setting a first reward defined in the first mission information to be acquirable by the player;

provide game information of the game, including at least information of the reward set to be acquirable, to the terminal device;

sets, for the player, when it is determined that an accomplishment status of the mission accomplishment condition defined in the first mission information or an acquisition status of the first reward defined in the first mission information regarding the player for which the first mission information is set satisfies a given status determination condition, second mission information stored in association with an unselected advantage option different from the selected advantage option selected; and executes, when a second mission accomplishment condition in the second mission information set for the player is determined to be satisfied, the reward control processing of setting a second reward defined in the second mission information to be acquirable by the player.

According to a fifth aspect of the invention, there is provided a game execution method of making a terminal device execute a game, the method comprising:

executing reception processing of receiving an operation instruction from a player via the terminal device;

executing the game based on the operation instruction from the player that has been received;

controlling a storage storing mission information in which a mission accomplishment condition indicating a condition of a mission to be accomplished by the player within a given valid period and a reward acquired by the player when the mission is accomplished are defined in association with a type of an advantage option indicating an option for giving an advantage to the player in the game;

executing, based on a given selection instruction, selection setting processing of setting, for the player, when an advantage option associated with the player is selected from a plurality of the advantage options as a selected advantage option, first mission information stored in association with the selected advantage option;

executing, when a first mission accomplishment condition indicating the mission accomplishment condition defined in the first mission information is determined to be satisfied in the game within the valid period, reward control processing of setting a first reward defined in the first mission information to be acquirable by the player;

providing game information of the game, including at least information of the reward set to be acquirable, to the terminal device;

setting, as the selection setting processing, for the player, when it is determined that an accomplishment status of the mission accomplishment condition defined in the first mission information or an acquisition status of the first reward defined in the first mission information regarding the player for which the first mission information is set satisfies a given status determination condition, second mission information stored in association with an unselected advantage option different from the selected advantage option selected; and executing, when a second mission accomplishment condition in the second mission information set for the player is determined to be satisfied, the reward control processing of setting a second reward defined in the second mission information to be acquirable by the player.

According to a sixth aspect of the invention, there is provided a game system comprising a processor programmed to:

receive an operation instruction from a player;

execute a game based on the operation instruction from the player that has been received;

control a storage storing mission information in which a mission accomplishment condition indicating a condition of a mission to be accomplished by the player within a given valid period and a reward acquired by the player when the mission is accomplished are defined in association with a type of an advantage option indicating an option for giving an advantage to the player in the game;

execute, based on a given selection instruction, selection setting processing of setting, for the player, when an advantage option associated with the player is selected from a plurality of the advantage options as a selected advantage option, first mission information stored in association with the selected advantage option;

execute, when a first mission accomplishment condition indicating the mission accomplishment condition defined in the first mission information is determined to be satisfied in the game within the valid period, reward control processing of setting a first reward defined in the first mission information to be acquirable by the player;

as the selection setting processing, set, for the player, when it is determined that an accomplishment status of the mission accomplishment condition defined in the first mission information or an acquisition status of a first reward defined in the first mission information regarding the player for which the first mission information is set satisfies a given status determination condition, second mission information stored in association with an unselected advantage option different from the selected advantage option selected; and execute, when a second mission accomplishment condition in the second mission information set for the player is determined to be satisfied, the reward control processing of setting a second reward defined in the second mission information to be acquirable by the player.

According to a seventh aspect of the invention, there is provided a server system configured to cause a terminal device, connected to the server system via a network, to execute a game, the server system comprising a processor programmed to:

control a storage storing as advantage option information, information of an advantage option having an advantage content defined as a content of an advantage in the game given within a given valid period to a player for which the advantage option is set;

receive an operation instruction from the player via the terminal device; set the advantage option for the player, based on the operation instruction from the player that has been received, execute the game, for an option set player that is the player for which the advantage option is set or a player character that is an operation target of the option set player, based on the operation instruction from the option set player and the advantage option information associated with the advantage option set for the option set player;

execute game status detection processing of detecting a game status of the option set player related to the game;

execute change processing of changing the advantage content given to the option set player, based on a detection result of the game status detection processing; and provide to the terminal device, game information of the game including information of the advantage content.

According to an eighth aspect of the invention, there is provided a game execution method of making a terminal device execute a game, the method comprising:

controlling a storage storing as advantage option information, information of an advantage option having an advantage content defined as a content of an advantage in the game given within a given valid period to a player for which the advantage option is set;

executing reception processing of receiving an operation instruction from the player via the terminal device;

setting the advantage option for the player, based on the operation instruction from the player that has been received;

executing the game, for an option set player that is the player for which the advantage option is set or a player character that is an operation target of the option set player, based on the operation instruction from the option set player and advantage option information associated with the advantage option set for the option set player;

executing game status detection processing of detecting a game status of the option set player related to the game;

executing change processing of changing the advantage content given to the option set player, based on a detection result of the game status detection processing; and causing the terminal device to display game information of the game, including information of the advantage content.

According to a ninth aspect of the invention, there is provided a game system executing a game, the game system comprising the processor programmed to:

control a storage storing as advantage option information, information of an advantage option having an advantage content defined as a content of an advantage in the game given to a player within a given valid period to which the advantage option is set;

receive an operation instruction from the player via the terminal device;

set the advantage option for the player, based on the operation instruction from the player that has been received;

execute the game, for an option set player that is the player for which the advantage option is set or a player character that is an operation target of the option set player, based on the operation instruction from the option set player and advantage option information associated with the advantage option set for the option set player;

execute game status detection processing of detecting a game status of the option set player related to the game;

execute change processing of changing the advantage content given to the option set player, based on a detection result of the game status detection processing; and cause a display to display game information of the game, including information of the advantage content.

BRIEF DESCRIPTION OF THE SEVERAL VIEWS OF THE DRAWING

FIG. 5 is a diagram illustrating an example of advantage option information stored in an advantage option information storage according to the first embodiment.

FIG. 6 is a diagram illustrating an example of reward information stored in a game data storage according to the first embodiment.

FIG. 13 is a diagram illustrating an example of advantage option information stored in an advantage option information storage according to the second embodiment.

FIG. 20 is a diagram illustrating reward change processing executed by a reward control unit according to the third embodiment.

FIG. 22 is a diagram illustrating reward change processing executed by the reward control unit according to the third embodiment.

DETAILED DESCRIPTION OF THE EMBODIMENT

Figure 1:
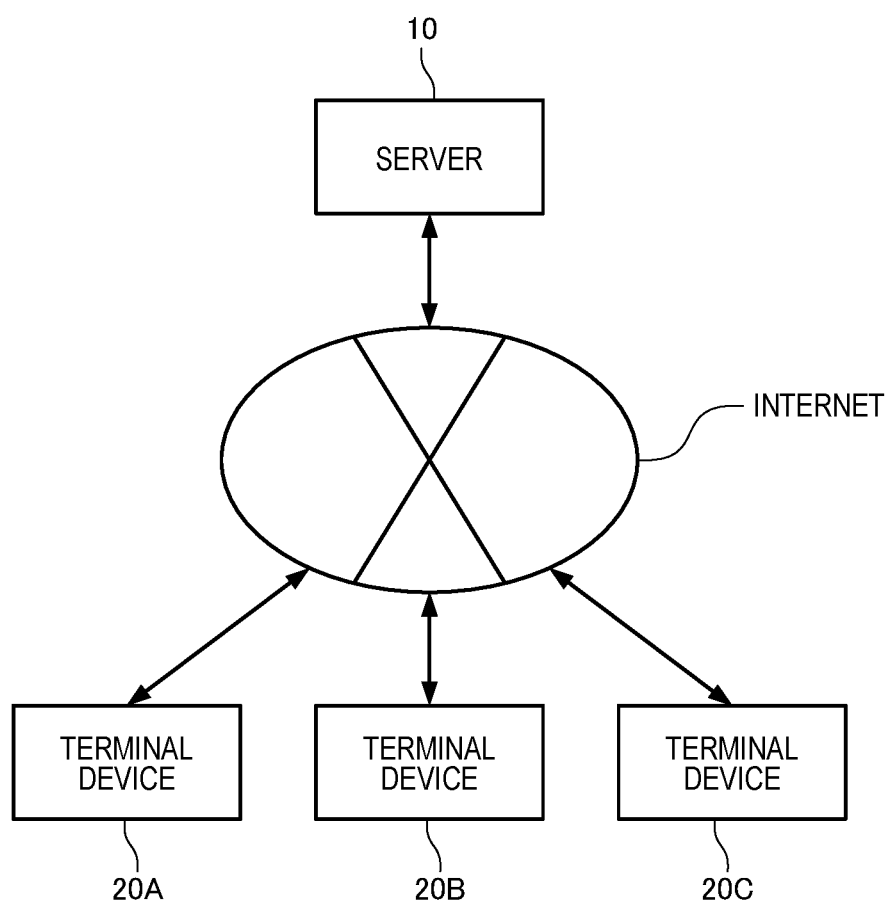
FIG. 1 is a diagram illustrating an example of a configuration of a game system according to the first embodiment.

One aspect of the invention relates to the following game system.

(1) One embodiment of the invention is a server system configured to cause a terminal device, connected to the server system via a network, to execute a game, the server system having a processor programmed to:
- receive an operation instruction from a player via the terminal device;
- set, for the player, based on the operation instruction from the player that has been received, an advantage option indicating an option to give an advantage in the game to the player;
- control a storage storing, as advantage option information, information of a specification of the advantage option including at least mission information defining a mission accomplishment condition indicating a condition of a mission to be accomplished within a given valid period by the player for which the advantage option is set and a reward to be acquired by the player upon accomplishing the mission;
- make the game progress, for an option set player that is the player for which the advantage option is set or a player character that is an operation target of the option set player, based on the operation instruction from the option set player and the advantage option information associated with the advantage option set for the option set player;
- execute reward control processing of setting, when the option set player is determined to have satisfied the mission accomplishment condition defined in the mission information within the valid period, the reward defined in the mission information to be acquirable by the option set player;
- execute option status detection processing of detecting as an option status, a given status of an option element indicating an element related to the advantage option set for the option set player;
- execute specification change processing of changing, based on a detection result of the option status detection processing, at least one of (a) the specification of a set advantage option indicating the advantage option that is set for the option set player, and (b) the specification of another advantage option different from the set advantage option set for the option set player; and
- provide game information of the game including information related to the reward acquired, to the terminal device.

With the server system described above, the specification of the advantage option can be customized based on the option status of the advantage option of the option set player, whereby the advantage option can be provided while taking the characteristics of each player into consideration.

For example, the server system described above can change the specification of the advantage option set or to be set, in accordance with a detection result of the option status such as a setting status when the advantage option is set, a mission progress status, an acquisition status of a reward that has been acquired by accomplishing a mission, or a use status of the reward.

For example, the server system described above can change the specification of a set or to-be-set advantage option in accordance with such an option status, a setting condition (whether billing is involved, or the number of settable advantage options) for setting a to-be-set advantage option, by increasing/reducing the rewards set to be acquirable by accomplishing a mission, increasing/reducing missions, adding or changing a reward or a mission (including changing an executed or acquired order), changing the degree of difficulty of a mission, changing the valid period, or the like.

Thus, with the server system described above, the attractiveness of the advantage option can be increased so that the motivation of each player to actively obtain the advantage option can be increased.

The term "advantage option" indicates, for example, an option for providing an effect to an option set player having the advantage option to be more advantageous in the game over a non-option set player not having the advantage option, regarding the same game action, game processing, and a result of the action or the processing.

Specifically, this "advantage option" may be selectable based on billing or may be selectable without billing.

The term "mission" is accomplished by satisfaction of a mission accomplishment condition including, for example:
(1A1) a predetermined parameter of a player or a player character such as a game level, experience points, points, game currency, or player character ability value reaching a value set in advance; and
(1A2) the player or the player character executing an action in the game (that is, a game action) set in advance such as a match against an enemy character and accomplishment of a predetermined task.

Specifically, the mission related to the game action includes, for example:
(1A2-1) the player character obtaining a specific item in the game;
(1A2-2) the player character defeating a specific enemy character such as a boss character (including a specific type or quantity, and accomplishing within a predetermined time limit);
(1A2-3) clearing a specific stage such as a bonus stage or a predetermined number of stages (including clearing the stage(s) within a time limit); and
(1A2-4) executing healing (self-healing or healing for a player character in a specific relationship such as an ally) or resting for a predetermined number of times.

Furthermore, "specification of advantage option" includes, for example, defined contents such as a mission accomplishment condition (level and the number of options and conditions) and the type of reward (type, level (size, attribute, and ability), and quantity) defined in the mission information, as well as the number of settable advantage options, categories of the advantage options when there is a plurality of advantage options, and a condition and status when the advantage option is set.

Specifically, the condition and status when the advantage option is set include: a period (that is, a valid period) during which the function of the advantage option set is exerted; whether setting the advantage option involves billing, and a billing amount; a condition and a status (level, experience points, points, type and quantity of possessed item, and task that has been cleared) of a player or a player character that is the operation target of the player, when each advantage option is set; and the like.

The "valid period" may be, for example, a period set in advance (also referred to as a season) between a predetermined game start timing and a predetermined end timing set regardless of an event in the game, or may be a period from a predetermined game start timing or a start timing of a certain event such as a start of a battle, to a timing arriving in association with an event such as the player character reaching a goal.

When a specific advantage option among a plurality of advantage options is set based on an instruction from the player, the "valid period" is preferably managed as a common period for the plurality of advantage options, but the period is not limited to this.

In addition to the above, "setting a reward to be acquirable" includes: unconditionally giving the reward to the player; provide the reward obtained assuming that the billing consumption of the game currency or the points are involved; suspend the provision of the reward if the player does not show an intention to obtain the reward (for example, an operation instruction); and determine whether the reward is to be provided based on determination processing of determining whether the reward is actually provided in a lottery event such as gacha.

For example, this "acquisition of reward" includes, for example:

(1B1) making a change in a parameter, such as experience points and an ability value, changing as the game progresses, advantageous:

(1B2) making a specific item, new player character, or a parameter such as game currency/points/strength value acquired, easy to be acquired (for example, increasing the possibility of winning the aforementioned in gacha, reducing the cost for purchasing or exchanging the aforementioned, changing a possessed item to an item of the same type with a higher ability or the like, and making the aforementioned easier to be found or obtained), or increasing the options for the aforementioned, (1B3) making the task easier, (1B4) making the possibility of winning the gacha in the game advantageous for the player, including increasing the possibility of winning a rare item or reducing the possibility of not winning anything, (1B5) reducing consumption of a parameter (billing amount, consumed points, or a strength value (energy value) of a player character) in the game, (1B6) changing an outer appearance (that is, looks)/ability/attribute/quantity/value (including influence on a selling price and synthetic materials in a game when selling in-game or to another player)/restriction release (such as making the usable time longer or unlimited) of an item usable by a player character, (1B7) giving a trophy/medal, (1B8) changing outer appearance/ability/attribute of a player character, (1B9) enabling a reward failed to be acquired at a determined timing in a game such as a reward (daily bonus, for example) failed to be acquired due to failure to satisfy a predetermined condition or a reward that was available before the game starts, or changing the reward (that is, the unacquired reward) to a reward providing an advantageous effect to the player when the reward is acquired, and (1B10) changing an order of a plurality of rewards acquired one by one along the progress of the game (with the grade of the reward gradually increasing) to be advantageous for the player.

For example, "option element" includes
(1C1) an advantage option itself or its history;
(1C2) a mission or a mission accomplishment condition defined for the advantage option;
(1C3) a reward defined for the advantage option:
(1C4) billing related to the advantage option:
(1C5) an option set player for which the advantage option is set and another player related to the option set player;
and the like.

The "option status" includes, for example:
(1D1) a status at the time of setting the advantage option (hereinafter, referred to as "advantage option setting status");
(1D2) a mission progress status:
(1D3) a status based on a temporal element of a mission;
(1D4) a contribution status indicating a level of contribution of an advantage option to a game (that is, a contribution level);
(1D5) a reset status in an advantage option set for an advantage option set player (status on reset count or frequency);
(1D6) a billing status of an option set player (a status on a billing amount while an advantage option is set or during the entire or predetermined period of the game, billing count, the number of changes made in the advantage option based on the billing or the like);
(1D7) a status on past advantage option history (hereinafter, referred to as "past option history status");
(1D8) a status on an advantage option of another player related to the option set player (hereinafter, referred to as "other player relationship status");
and the like.

In particular "advantage option setting status" indicates, for example, a status at the time of setting an advantage option such as a timing when the advantage option is set, based on a comparison with a valid period set in advance or a timing set by another player.

The "past option history status" indicates the past statuses (1D1) to (1D6) set before the currently set advantage option, the number of advantage options set in the past, or the number of advantage options continuously set in the past.

Furthermore, "other player relationship status" indicates, for example, statuses (1D1) to (1D8) (including numerical values statistically calculated) of the advantage option of another player related to the option set player, a status based on a comparison in the option status between the option set player and the other player (including the status of the option set player relative to all the players or higher level players).

Specifically, the other player related to the option set player includes: a player in a certain relationship with the option set player such as a friend or a follower; a player on the same team; a player who gave an advantage option to the option set player as a present, a player who received an advantage option from the option set player as a present; all the players; and a player with a predetermined attribute such as a top ranker.

For example, in addition to the above, "change in specification of set advantage option" includes:
(1E1) adding or reducing a reward, or changing the content of a reward (including changing the acquisition order);
(1E2) adding or reducing a mission (specifically, the mission accomplishment condition), or changing the type or the executed order of the mission;

(1E3) changing the degree of difficulty of the mission;
(1E4) changing the mission accomplishment condition itself; and
(1E5) changing (extending or shortening) the valid period; and the like for the currently set advantage option.

The "change in specification of another advantage option" is a change in specification of another advantage option set together with a to-be-acquired advantage option or a set advantage option, for example, and includes:
(1F1) a change in whether billing is involved, or in a billing amount;
(1F2) a change (increase or decrease) in the number of selectable advantage options;
(1F3) (1E1) to (1E5);
and the like.

(2) In the server system described above, in the mission information, an order in which the determination is performed for a plurality of the mission accomplishment conditions is defined in advance, and the processor may be programmed to:
execute mission determination processing of determining whether the mission accomplishment condition of the mission information set for the player is satisfied, and as the mission determination processing, determine, in the defined order, whether each of the mission accomplishment conditions is satisfied.

For example, the server system described above can perform customization of the specification of the advantage option including eliminating or reducing missions difficult for the option set player and mission execution order, whereby the advantage option can be provided while taking the characteristics of each player into consideration.

(3) In the server system described above, the processor may be programmed to:
detect as the option status, a comparison result as a result of comparing the option element with a given reference, and
execute, based on the comparison result as the option status detected, the specification change processing of changing the specification of the set advantage option or the specification of the other advantage option.

For example, the server system described above can detect how advantageous the option element is, by using a numerical value expressing how quickly an advantage option is acquired and the level of quick acquisition, or based on whether the reward acquired by accomplishing a mission is used later in the game or the number of the rewards.

Thus, for example, the server system described above can change the specification of the corresponding advantage option in the set advantage option and the other advantage option to be a specification advantageous for the option set player, when the option element in the option status is highly advantageous.

Specifically, the server system described above can increase the incentive for the advantage option in response to more effective use of the advantage option, and thus can increase the motivation of each player to actively obtain the advantage option.

The "given reference" may be one or more references that can be compared with the option status, and is a predetermined reference for an element that is the same as the option element described above for example.

(4) In the server system described above, the processor may be programmed to
detect, as the option status, a contribution level indicating a contribution of the option element to the game; and
execute, based on the contribution level of the option element, the specification change processing of changing the specification of at least one of the set advantage option and the other advantage option.

For example, the server system described above can change the advantage option to be one advantageous for the option set player, in accordance with the contribution level indicating the level of contribution of the option element of the advantage option to the game.

Specifically, for example, the server system described above can change a reward to one more advantageous for the corresponding player along with an increase in the contribution level, whereby the player that has executed the game using more advantage options can enjoy the advantage in the game more.

The "contribution level" is a numerical value expressing the use of the option element in the game, and is a value indicating the contribution to the option set player in the game, including, for example: the number of times of usage, number of times of consumption, usage frequency or usage time or consumption time of the reward obtained with the advantage option set, the record (a game record such as a win-loss record and points acquired) as a result of setting the advantage option, or the level and win-loss record improved after the advantage option has been set.

The "contribution level" also includes a result of comparison with a given reference.

(5) In the server system described above, the processor may be programmed to:
detects, as the contribution level, a numerical value related to use of the reward acquired as a result of accomplishment of the mission; and
execute the specification change processing of changing the specification related to the reward for the set advantage option or the other advantage option to a specification with which another reward with the contribution level satisfying a given condition is acquired with a priority over other rewards.

For example, the server system described above can increase a chance of acquiring rewards providing more advantageous effects to the corresponding player, as the use of the rewards acquired by accomplishing mission increases for example, so that the option set player can enjoy the advantage in the game in more obvious ways.

(6) In the server system described above, the processor may be programmed to detect, for the option set player, a progress status of the mission defined in the mission information of the advantage option set for the option set player, as the option status of the advantage option.

The server system described above can make the game more entertaining, and make the player feel the advantage of the advantage option, and thus can make the player recognize the effectiveness of the advantage option as the game progresses, and thus can increase the attractiveness of the advantage option.

The "progress status" includes, for example, a reward acquisition status and a progress status of the mission accomplishment condition such as:
(1G1) the number and the type of acquired rewards;
(1G2) the number and the type of accomplished missions;
(1G3) the level of the accomplished mission;
(1G4) a condition and element lacking for accomplishing a mission;
(1G5) the number of times the last mission is accomplished, when missions from the first one to the last one defined in the mission information can be repeatedly executed; and the like.

(7) In the server system described above, the processor may be programmed to detect, based on a temporal element related to the mission defined in the mission information of the advantage option, the progress status of the mission.

The server system described above can make the game more entertaining, and make the player feel the advantage of the advantage option, and thus can make the player recognize the effectiveness of the advantage option as the game progresses, and thus can increase the attractiveness of the advantage option.

The "temporal element" includes timings related to the accomplishment of a mission and acquisition of a reward, such as for example: the time required for accomplishing each mission and obtaining the reward; the time required for accomplishing all the missions defined by the mission information, or obtaining all the rewards; a length of time between the timing at which all the missions are accomplished or all the rewards are obtained and the end timing of the valid period.

(8) In the server system described above, the processor may be programmed to:
execute mission switching processing of, when a given special condition in the game is satisfied in a case where the game processing is executed for the option set player based on a specific mission accomplishment condition in the mission information, switching the mission accomplishment condition of the mission executed by the option set player to a mission accomplishment condition defined as a mission to be executed first in the mission information; and
detect an execution status of the mission switching processing as the option status of the set advantage option.

For example, the server system described above can change the advantage option to be advantageous for the player each time the player accomplishes all the missions, or change the advantage option to be less advantageous to the player each time the mission is reset before all the missions are accomplished.

Specifically, the server system described above can customize an advantage option based on a mission accomplishment status that is one of features of the advantage option, and thus can make the player feel the advantage of the advantage option, and recognize the effect of the advantage option along the progress of the game, whereby the attractiveness of the advantage option can be increased.

The "special condition" includes, for example, clearing all the missions (satisfying all the mission accomplishment conditions), clearing a specific mission, or showing an intention to forcibly transitioning to the mission set in the mission information to be the mission executed first by the option set player (that is, reset).

(9) In the server system described above, the processor may be programmed to change the specification of the set advantage option or the other advantage option, by changing a degree of difficulty of the mission accomplishment condition defined in the mission information of the advantage option.

The server system described above can customize the advantage option in accordance with the degree of difficulty related to how entertaining the game is. Thus, the advantage option can be provided while taking the characteristics of each player into consideration. For example, a mission can be easy for beginner players, a mission can be difficult for advanced players, changing missions to be easily accomplished, eliminating or reducing missions difficult to accomplish.

The "change in degree of difficulty" includes, for example: changing the period until a mission is accomplished; changing the number of mission accomplishment conditions; making the requirement of the mission accomplishment condition difficult (easy); changing the mission to one the corresponding player is good at; or when there is an unaccomplished mission before the valid period, lowering the degree of difficulty of the mission accomplishment condition of the unaccomplished mission.

The "mission the player is good or bad at" is, for example, assumed to be identified in advance based on the accomplishment time of the mission of the same type in the past, based on the accomplishment time and accomplishment time of another player, based on an accomplishment rate of each type of mission, or based on the number of missions of the type that have been accomplished so far.

(10) In the server system, the processor may be programmed to change, when the degree of difficulty of the mission accomplishment condition is changed, a content of the reward associated with the mission accomplishment condition in accordance with the changed degree of difficulty.

The server system described above can change a reward to one more advantageous (or disadvantageous) for the corresponding player, as the degree of difficulty is changed to be higher (or lower) for example.

(11) In the server system described above, the processor may be programmed to:
as the option status detection processing, detect the option status for an attribute of the option element, and
execute, based on the option status for the attribute, the specification change processing of changing the specification of at least one of the set advantage option and the other advantage option.

The server system described above can more accurately recognize the preferences and status of the player, and thus can change an advantage option to be more suitable for the player.

The "attribute" includes, for example, when there is a plurality of advantage options, the type (category) of the advantage option itself, the type of a mission (such as whether the mission is based on a game action or is a result of the game action, a type of a series of game actions), the type of the reward, and rarity of the reward.

(12) In the server system described above, the processor may be programmed to:
detect, as the option status, a status of a change in the specification of the set advantage option or the other advantage option in the specification change processing; and
execute, based on the change in the specification of the set advantage option or the other advantage option, the specification change processing of changing the specification of at least one of the set advantage option and the other advantage option.

The server system described above can change the content of the advantage option to be more advantageous to the option set player as the number of times the advantage option or the mission is changed in accordance with the status of the option element, or as the billing amount increases when the specification can be changed by billing.

Thus, the server system described above can more clearly provide the advantage of the advantage option in the game, in the advantage option setting, and thus can increase the motivation of each player to actively obtain the advantage option.

The "change in specification of set advantage option or another advantage option" indicates a change in these options themselves, or a change in the option element of the mission (including the mission accomplishment condition and the reward) or the like.

The "status of change in specification of set advantage option or another advantage option" includes, for example, which specification of the advantage option of a predetermined reference or mission has changed, how many times the specification of the advantage option has been changed, how much change has been made on the specification, or billing count, billing amount, or the like related to the change.

(13) In the server system described above, the processor may be programmed to:
    detect, as the option status, a given status of another option element of another player different from the option set player; and
    execute, based on a detection result of the option status of the other option element of the other player, the specification change processing of changing the specification of at least one of the set advantage option and the other advantage option.

The server system described above can change the content of the advantage option depending on the status of the option element of the other player in a certain relationship such as a friend.

The server system described above can promote interaction between players in the game, and make the player feel the advantage of the advantage option, and thus can vitalize that game and make the player recognize the effectiveness of the advantage option as the game progresses, and thus can increase the attractiveness of the advantage option.

The "other player" is preferably a player in a certain relationship with the option set player, such as a player who is in the same team as described above, a player who played together, a friend, or a follower. However, this should not be construed in a limiting sense, and the other player may be a player that can be compared with the option set player such as all players participating (registered) in the game and the top ranker players, for example.

As described above, the "given status of option element of another player" includes, for example:
(1H1) an advantage option setting status at the time when the advantage option is set,
(1H2) mission progress status,
(1H3) a status based on a temporal element of the mission,
(1H4) a contribution status indicating the contribution level of the advantage option in the game,
(1H5) a reset status of set advantage option set for the player for which the advantage option is set, or
(1H6) a billing status of the option set player.

Specifically, as the given status of the option elements in a case where another player is a plurality of players such as all the players, a statistical value such as an average value is preferably used.

(14) A game execution method according to an embodiment of the invention is a game execution method of causing a terminal device to execute a game, the method including:
    executing reception processing of receiving an operation instruction from a player via the terminal device;
    setting, for the player, based on the operation instruction from the player that has been received, an advantage option indicating an option to give an advantage in the game to the player,
    controlling a storage storing, as advantage option information, information of a specification of an advantage option including at least mission information defining a mission accomplishment condition indicating a condition of a mission to be accomplished within a given valid period by the player for which the advantage option is set, and a reward to be acquired by the player upon accomplishing the mission;
    making the game progress, for an option set player that is the player for which the advantage option is set or a player character that is an operation target of the option set player, based on the operation instruction from the option set player and advantage option information associated with the advantage option set for the option set player;
    executing reward control processing of setting, when the option set player is determined to have satisfied a mission accomplishment condition defined in the mission information within the valid period, a reward defined in the mission information to be acquirable by the option set player;
    executing option status detection processing of detecting as an option status, a given status of an option element indicating an element related to the advantage option set for the option set player;
    executing specification change processing of changing, based on a detection result of the option status detection processing, at least one of (a) the specification of a set advantage option indicating the advantage option that is set for the option set player, and (b) the specification of another advantage option indicating another advantage option to be set for the option set player after the valid period ends; and
    displaying game information of the game including information related to the reward acquired, on the terminal device.

With the game execution method described above, the specification of the advantage option can be customized based on the option status of the advantage option of the option set player, whereby the advantage option can be provided while taking the characteristics of each player into consideration.

Thus, with the game execution method described above, the attractiveness of the advantage option can be increased so that the motivation of each player to actively obtain the advantage option can be increased.

(15) A game system according to an embodiment of the invention is a game system configured to execute a game, the game system including a processor programmed to:
    receive an operation instruction from a player;
    a setting unit configured to set, for the player, based on the operation instruction from the player that has been received, an advantage option indicating an option to give an advantage in the game to the player;
    control a storage storing, as advantage option information, information of a specification of an advantage option including at least mission information defining a mission accomplishment condition indicating a condition of a mission to be accomplished within a given valid period by the player for which the advantage option is set, and a reward to be acquired by the player upon accomplishing the mission;
    make the game progress, for an option set player that is the player for which the advantage option is set or a player character that is an operation target of the option set player, based on the operation instruction from the option set player and advantage option information associated with the advantage option set for the option set player; a reward control unit configured to execute reward control processing of setting, when the option set player is determined to have satisfied the mission accomplishment condition defined in the mission information within the valid period, a reward defined in the mission information to be acquirable by the option set player;

execute option status detection processing of detecting as an option status, a given status of an option element indicating an element related to the advantage option set for the option set player;

execute specification change processing of changing, based on a detection result of the option status detection processing, at least one of (a) the specification of a set advantage option indicating the advantage option that is set for the option set player, and (b) the specification of another advantage option indicating another advantage option to be set for the option set player after the valid period ends; and display on a display, game information related to the game including information of the reward acquired.

With the game system described above, the specification of the advantage option can be customized based on the option status of the advantage option of the option set player, whereby the advantage option can be provided while taking the characteristics of each player into consideration.

Thus, with the game system described above, the attractiveness of the advantage option can be increased so that the motivation of each player to actively obtain the advantage option can be increased.

Another aspect of the invention relates to the following game system.

(16) An embodiment of the invention relates to a server system configured to cause a terminal device, connected to the server system via a network, to execute a game, the server system including a processor programmed to:

receive an operation instruction from a player via the terminal device;

execute the game based on the operation instruction from the player that has been received;

control a storage storing mission information in which a mission accomplishment condition indicating a condition of a mission to be accomplished within a given valid period by the player and a reward acquired by the player when the mission is accomplished are defined in association with a type of an advantage option indicating an option for giving an advantage to the player in the game;

execute, based on a given selection instruction, selection setting processing of setting, for the player, when an advantage option associated with the player is selected from a plurality of the advantage options as a selected advantage option, first mission information stored in association with the selected advantage option;

execute, when a first mission accomplishment condition indicating the mission accomplishment condition defined in the first mission information is determined to be satisfied in the game within the valid period, reward control processing of setting a first reward defined in the first mission information to be acquirable by the player;

provide game information of the game, including at least information of the reward set to be acquirable, to the terminal device;

sets, for the player, when it is determined that an accomplishment status of the mission accomplishment condition defined in the first mission information or an acquisition status of the first reward defined in the first mission information regarding the player for which the first mission information is set satisfies a given status determination condition, second mission information stored in association with an unselected advantage option different from the selected advantage option selected; and executes, when a second mission accomplishment condition in the second mission information set for the player is determined to be satisfied, the reward control processing of setting a second reward defined in the second mission information to be acquirable by the player.

The server system described above can set, even in a case where the first mission information about the selected advantage option is set, the second mission information about the unselected advantage option not selected, in accordance with the accomplishment status and the first reward acquisition status in the first mission accomplishment condition.

Thus, the server system described above can switch the mission of the selected advantage option to a mission of another advantage option within the valid period.

For example, with the server system described above, in a case where the motivation to accomplish the mission set by the selected advantage option, such as a case where a mission difficult for the player is set or a case where the reward acquired when the mission is accomplished is a reward unwanted by the player, a mission of the unselected advantage option can be newly (that is a new advantage option) set for the player, whereby the probability of an easier mission to be executed or a reward wanted by the player to be acquired can be increased.

As a result, with the server system described above, the mission to be accomplished by the player and the executed timing can be flexibly set within a valid period of the advantage option, and thus the game can be more entertaining, and the motivation to obtain the special option for acquiring the reward can be increased.

The "valid period" described above is preferably managed as a common period for a plurality of advantage options (all the advantage options), but this should not be construed in a limiting sense.

The "given selection instruction" includes an operation instruction from the player and an instruction from a program issued in accordance with the progress of the game. Furthermore, the "given selection instruction" also includes selection of an advantage option won in lottery processing such as gacha for example, executed based on an instruction from the player.

Furthermore "determined that the first (second) mission accomplishment condition indicating the mission accomplishment condition defined in the first (second) mission information in the game" includes, for example, given game processing executed on the game by the player associated with the mission information determined to have satisfied the first or the second mission accomplishment condition, or a result of the given game processing executed on the game by the player associated with the mission information determined to have satisfied the first or the second mission accomplishment condition.

The "given game processing executed in the game by the player associated with the mission information" includes game processing related to an action of the player in the game as well as game processing based on a game action of the player character as the operation target of the player in the game, based on an instruction from the player.

For example, such game processing includes:

(2A1) login to the game by the player;

(2A2) billing and consumption of points for the game executed by the player;

(2A3) registration of a friend or follower executed by the player or another player; and (2A4) processing based on game action such as movement, attack, defense, talk, rest, town planning, and various actions related to execution of a match with another player character, related to various games (such as match-up games, racing games, RPGs, or shooting games) performed by the player character that is an operation target of the player.

Furthermore, the "result of the given game processing in the game executed by the player associated with the mission information" includes, for example:

(2B1) a result of login such as the number of login times to the game, total login time, or login timing;

(2B2) a result of billing or consumption such as billing timing, or a billing amount or a point consumption amount within a certain period or a total billing amount or point consumption amount;

(2B3) a result of registration of a friend relationship such as a friend or follower registration timing or registration count;

(2B4) a result, related to the player, of execution of the game such as the level of the player reaching a certain level; and (2B5) a result of an action of the player character including: achievement of a certain task such as defeating a certain enemy character (boss character for example), the number of enemy characters defeated, acquisition of a certain item, clearing a certain stage; and a parameter (such as level, experience points, points, game currency, or various ability values) related to an attribute of the player character reaching a certain value.

The "accomplishment status of the mission accomplishment condition" includes, for example: when a plurality of missions are set in the mission information, the type and the number of missions, among the plurality of missions, the mission accomplishment condition of which is satisfied; and when a plurality of missions are set in an incremental manner based on their degrees of difficulty, the degree of difficulty and the reward level of the mission the mission accomplishment condition of which is satisfied.

The "reward acquisition status" includes, for example: when a plurality of missions are set in the mission information, the type and the number of rewards that have been acquired from the plurality of missions; and when a plurality of missions are set in an incremental manner based on their degrees of difficulty and levels of rewards, the degree of difficulty and the level of reward of the mission that has been accomplished.

The "given status determination condition" includes (2C1) when a plurality of mission accomplishment conditions are defined in the mission information of each advantage option information, satisfaction of a certain mission accomplishment condition among the plurality of mission accomplishment conditions, (2C2) when a plurality of mission accomplishment conditions are defined in the mission information of each advantage option information with the mission accomplishment conditions set in an incremental manner based on degrees of difficulty, satisfaction of a mission accomplishment condition of a given degree of difficulty, and (2C3) satisfaction of a condition different from the mission accomplishment condition defined in each mission information.

Specifically, the condition different from the mission accomplishment condition defined in each mission information includes matters enabling whether the player or the player character has satisfied a given condition can be determined such as:

(2D) whether the game level of the player or the player character has reached a game level set in advance;

(2D2) whether a certain item in the game is acquired by the player character;

(2D3) whether the requirements set for the parameters set for the player or player character such as experience points, points, game currency, and ability values set in advance have been satisfied, and (2D4) Whether the player character has defeated a specific enemy character such as a boss character.

In the selection setting processing, "setting mission information to the player" includes setting the mission information and making it function (exert) effectively in the game, and simply setting the mission information and making it function based on an instruction from the player or the like.

Specifically, when the mission information about the unselected advantage option is set for the player, the mission information on the selected advantage option that has been set may be automatically switched to the mission information on the unselected advantage option when the unselected advantage option is set, or the unselected advantage option may be simply set and the switching among these pieces of mission information may be implemented based on an instruction from the player.

(17) In the server system described above, the processor may be programmed to manage the valid period as a common period for the plurality of advantage options.

Specifically, the server system described above can fix the period during which the option is applied without changing the period depending on whether the unselected advantage option is set, so that only the mission to be accomplished by the option set player and the executed timing can flexibly set, without creating an advantageous or disadvantageous status for the player depending only on whether the new advantage option is set.

For example, with the option server system described above, in a case where the valid period of "20 hours" is the common period for a plurality of advantage options (including all the advantage options), when 10 hours elapses during the game under the set advantage option, and switching to the unselected advantage option takes place at that timing with the mission information of the unselected advantage option information set, the remaining valid period of the unselected advantage option is "10 hours".

Thus, the server system described above can make the game more entertaining and increase the motivation to obtain a special option to make the acquired reward advantageous, without excessive differentiation among players in the game.

With the server system described above, when the switching to the unselected advantage option in the latter half of the valid period, the period during which the advantage can be enjoyed becomes short, meaning that a timing of switching to the unselected advantage option (that is, a timing of satisfying the predetermined status determination condition is satisfied) needs to be taken into consideration. Thus, the game can include game strategy regarding selection of an advantage option or switching to another advantage option, to be more entertaining.

The expression "managed as a common period for a plurality of advantage options" means that when an unselected advantage option is set by the selection setting processing among at least two advantage options, the period does not change, that is, the period of the selected advantage option is inherited. The period may be common to all the advantage options.

The "common period" is basically a valid period with the common length and common start and end timings. Alternatively, the common period may be a valid period with only the common length, meaning that the start timing, the end timing, or both can vary.

(18) In the server system described above, in the mission information, a plurality of the mission accomplishment conditions and a plurality of the rewards corresponding to the respective mission accomplishment conditions are set, and the processor may be programmed to execute, when a corresponding one of the plurality of mission accomplishment conditions in the mission information set for the player is determined to be satisfied within the valid period, the reward control processing of setting the reward defined in association with the mission accomplishment condition thus determined, to be acquirable by the player.

For example, the server system described above can change the mission accomplishment condition or the reward defined to that in the mission information of the other advantage option information if a status determination condition is satisfied, (2F1) when a degree of difficulty of one or more mission accomplishment conditions defined in the set mission information about the selected advantage option are high for the player, or (2F2) when the player has acquired all the rewards he or she wants among the rewards defined in the mission information about the advantage option, and thus does not require unacquired rewards.

Thus, with the server system described above, when the player is stuck in terms of acquisition of advantage options, the reward desired by the player can be set to be acquirable until the reward is acquired or the valid period ends. Thus, the advantage option is more likely to have its advantage enjoyed by the player, and thus can have a higher value.

As a result, the server system described above can increase the motivation to obtain a special option for acquiring a reward.

(19) In the server system described above in the mission information, an order in which the determination is performed for the plurality of mission accomplishment conditions is defined, and the processor may be programmed to:

execute mission determination processing of determining whether a mission accomplishment condition in the mission information set for the player is satisfied; and as the mission determination processing, determine, in the defined order, whether each of the mission accomplishment conditions is satisfied.

For example, with the server system described above, if a given status determination condition is satisfied, the mission accomplishment condition or the reward defined in the mission information of the other advantage option information can be changed, (2G1) when a degree of difficulty of a certain mission accomplishment condition defined in the mission information about the selected advantage option is high for the player, or (2G2) when the player does not require a certain reward among rewards defined in the mission information about the selected advantage option.

Thus, for example, with the server system described above, even if it fails to reach the last one of the plurality of missions defined in the mission information of the advantage option, the last one can be reached using another advantage option. Furthermore, when the reward defined in the mission information of the selected advantage option is unrequired, the acquisition of the reward can be avoided and another reward can be set to be acquirable.

Thus, with the server system described above, a plurality of routes for reaching the last mission (completing the missions) can be prepared, whereby hesitation to use the advantage option can be reduced. Furthermore, many desired rewards are set to be acquirable by the player. Thus, the game can be more entertaining.

(20) In the server system described above, the processor may be programmed to determine, when the second mission information of the unselected advantage option is set for the player, a mission accomplishment condition from which the determination processing starts to be executed among the mission accomplishment conditions defined in the order in the second mission information, in accordance with the accomplishment status of the mission accomplishment condition defined in the first mission information for the selected advantage option or the acquisition status of the reward defined in the first mission information, wherein sequentially execute the mission determination processing on the mission accomplishment conditions associated with the second mission information among the mission accomplishment conditions determined, in the defined order.

For example, in accordance with the accomplishment status of the mission accomplishment condition defined in the first mission information or the reward acquisition status defined in the first mission information, the server system described above, (2H1) determines, when the second mission information about the unselected advantage option is set for the corresponding player, the mission accomplishment condition in the second mission information with the same order as the mission accomplishment condition in the first mission information during the mission determination processing, or (2H2) determines the mission accomplishment condition defined to be the first in the order in the second mission information, to change the starting point of the mission accomplishment condition in the mission information about the unselected advantage option.

Specifically, the server system described above can start execution of the determination processing from a mission accomplishment condition between the first and the last one in the second mission information.

Thus, for example, with the server system described above, even if it fails to reach the last one of the plurality of missions defined in the mission information of the advantage option, the last one can be reached using another advantage option. Furthermore, when the reward defined in the mission information of the selected advantage option is unrequired, the acquisition of the reward can be avoided and another reward can be set to be acquirable.

The expression "determining the mission accomplishment condition from which the execution of the mission determination processing starts" may include random or predetermined rule-based determination in the game and determination based on the selection by the player.

(21) In the server system described above, the processor may be programmed to, when the second mission information is set for the player, stop the reward control processing being executed on the first mission information that has already been set, and execute the reward control processing based only on the second mission information newly set.

With the server system described above, when the given status determination condition is satisfied, the processing related to acquisition of the reward can also be switched to that according to another advantage option. Thus, even when the player is stuck in terms of accomplishment of a mission or acquisition of a reward based on the advantage option, the player can proceed with the mission or acquisition of a reward.

Note that "stops the execution of the reward control processing" means stopping the reward control processing to be executed and does not include stopping the reward control processing that has already been executed.

(22) In the server system, a category of a mission to be accomplished as defined in the mission information may differ among the advantage options.

The server system described above can classify the missions into categories, based on the types of the rewards (the types of items acquirable by the player) or types of mission accomplishment conditions (accomplishing/winning/clearing the task/match/stage), and thus can provide advantage options such as an advantage option that guarantees the execution of the mission the player is good at, or an advantage option enabling the player to acquire only the desired reward.

Thus, the server system described above can increase the motivation for acquiring the advantage option, and reduce the hesitation to acquire the advantage option.

For example, "the category differs" indicates:
(2J1) a case where the type of rewards acquired by accomplishing the respective mission defined by the respective advantage options is unified, and the unified reward type differs among the advantage options, or
(2J2) a case where the type of the mission accomplishment conditions defined by the respective advantage options is unified, and the unified type differs among the advantage options.

Note that "category differs" includes a case where the mission accomplishment condition or the reward of only one mission defined by the advantage options differ among the advantage options, and the mission accomplishment condition and the score of other missions are the same among the advantage options.

The "type of the rewards is unified" means that, in a case where a plurality of mission accomplishment conditions are defined in the mission information of the advantage option information, the type of the reward (such as the game currency, item, or experience points) set to be acquirable by the player when the mission is accomplished is always the same in the same category.

The "type of the mission accomplishment condition is unified" means that, in a case where a plurality of missions are defined in each mission information, an item for determination for given game processing (such as a mission for increasing the experience points, a mission for winning the competition against an enemy character, and a mission for acquiring an item within a time limit) executed by the player in the game or a result of the game processing is the same in the same category.

The unification of the type of the reward or the unification of the type of the mission accomplishment condition also includes a case where, when a plurality of rewards is obtained with one mission information or when a plurality of conditions is defined, the main common reward and condition are the same.

(23) In the server system, a degree of difficulty in the game of a mission to be accomplished as defined in the mission information may differ among the advantage options.

The server system described above can, for example, set the degree of difficulty (degree of difficulty based on parameters and thresholds, or degree of difficulty based on a set of fields the player is good and bad at regarding the accomplishment of the mission) associated with the advantage option, and thus can provide the advantage mission in accordance with the characteristics of the player, that is, based on the levels of the players from beginner to advanced.

Furthermore, the server system described above can provide a game offering strategic factor to the player regarding the user of various advantage options based on the game status even after the selection of the advantage option, as in a case where the player who has enough remaining valid period can try the mission for an unselected advantage option with a higher degree of difficulty based on the accomplishment status.

Thus, the server system described above can increase the motivation for acquiring the advantage option, reduce the hesitation to acquire the advantage option, and can execute the game involving various strategies based on advantage options, and thus can make the game more interesting and offer wider variety of uses of the advantage option.

The expression "degree of difficulty differs" includes, for example, a case where the degree of difficulty different of all the missions defined in the mission information is different, and also includes a case where at least one mission (that is, mission accomplishment condition) is different.

(24) In the server system described above, the processor may be programmed to:
execute status determination processing of determining whether the status determination condition is satisfied; and
determine that the status determination condition is satisfied when a plurality of mission accomplishment conditions is defined in the mission information set for the player, and when a certain one of the mission accomplishment conditions is determined to be satisfied.

With the server system described above, the timing of setting the unselected advantage option to a player can be linked with acquisition of a reward based on the accomplishment of a mission in the advantage option, whereby the player can easily come up with a strategy regarding the use of other advantage options.

(25) In the server system described above, the processor may be programmed to determine that the status determination condition is satisfied, when a mission accomplishment condition with a highest degree of difficulty defined in the mission information set for the player is determined to be satisfied or all the mission accomplishment conditions are determined to be satisfied.

The server system described above makes the condition for setting the mission information associated with the unselected advantage option for the player, so that a sense of accomplishment and superiority in acquisition of the advantage option as well as further advantage can be enjoyed in the game, whereby the game can be more entertaining.

(26) In the server system described above, the processor may be programmed to:
manage the mission information set for the player; and
when the first mission accomplishment condition defined in the first mission information is determined to be satisfied, execute, based on the operation instruction from the player, suspension processing of suspending acquisition of a reward that is defined in the first mission information and is set to be acquirable; and set, in the reward control processing, in accordance with the reward suspended, at least one of the mission accomplishment condition and the reward defined in the second mission information to be advantageous in the game for the player for which the mission information is set.

The server system described above suspends an unrequired reward, so that the player can be advantageous in the game upon using other advantage options, whereby a game involving playability and strategy regarding whether or not to acquire the reward can be provided. Thus, the game can be more entertaining in terms of use of the advantage option.

Note that "in accordance with the suspended reward" means in accordance with the number type, value, or the like of the rewards.

(27) A game execution method according to an embodiment of the invention is a game execution method of making a terminal device execute a game, the method including:

executing reception processing of receiving an operation instruction from a player via the terminal device;

executing the game based on the operation instruction from the player that has been received;

controlling a storage storing mission information in which a mission accomplishment condition indicating a condition of a mission to be accomplished by the player within a given valid period and a reward acquired by the player when the mission is accomplished are defined in association with a type of an advantage option indicating an option for giving an advantage to the player in the game;

executing, based on a given selection instruction, selection setting processing of setting, for the player, when an advantage option associated with the player is selected from a plurality of the advantage options as a selected advantage option, first mission information stored in association with the selected advantage option;

executing, when a first mission accomplishment condition indicating the mission accomplishment condition defined in the first mission information is determined to be satisfied in the game within the valid period, reward control processing of setting a first reward defined in the first mission information to be acquirable by the player;

providing game information of the game, including at least information of the reward set to be acquirable, to the terminal device;

setting, as the selection setting processing, for the player, when it is determined that an accomplishment status of the mission accomplishment condition defined in the first mission information or an acquisition status of the first reward defined in the first mission information regarding the player for which the first mission information is set satisfies a given status determination condition, second mission information stored in association with an unselected advantage option different from the selected advantage option selected; and executing, when a second mission accomplishment condition in the second mission information set for the player is determined to be satisfied, the reward control processing of setting a second reward defined in the second mission information to be acquirable by the player.

The game execution method described above can set, even in a case where the first mission information about the selected advantage option is set, the second mission information about the unselected advantage option not selected, in accordance with the accomplishment status and the first reward acquisition status in the first mission accomplishment condition.

Thus, the game execution method described above can switch the mission of the selected advantage option to a mission of another advantage option within the valid period.

As a result, with the game execution method described above, the mission to be accomplished by the player and the executed timing can be flexibly set within a valid period of the advantage option, and thus the game can be more entertaining, and the motivation to obtain the special option for acquiring the reward can be increased.

(28) A game system according to one embodiment of the invention includes: a processor programmed to:

receive an operation instruction from a player;

execute a game based on the operation instruction from the player that has been received;

control a storage storing mission information in which a mission accomplishment condition indicating a condition of a mission to be accomplished by the player within a given valid period and a reward acquired by the player when the mission is accomplished are defined in association with a type of an advantage option indicating an option for giving an advantage to the player in the game;

execute, based on a given selection instruction, selection setting processing of setting, for the player, when an advantage option associated with the player is selected from a plurality of the advantage options as a selected advantage option, first mission information stored in association with the selected advantage option;

execute, when a first mission accomplishment condition indicating the mission accomplishment condition defined in the first mission information is determined to be satisfied in the game within the valid period, reward control processing of setting a first reward defined in the first mission information to be acquirable by the player;

as the selection setting processing, set, for the player, when it is determined that an accomplishment status of the mission accomplishment condition defined in the first mission information or an acquisition status of a first reward defined in the first mission information regarding the player for which the first mission information is set satisfies a given status determination condition, second mission information stored in association with an unselected advantage option different from the selected advantage option selected; and execute, when a second mission accomplishment condition in the second mission information set for the player is determined to be satisfied, the reward control processing of setting a second reward defined in the second mission information to be acquirable by the player.

The game system described above can set, even in a case where the first mission information about the selected advantage option is set, the second mission information about the unselected advantage option not selected, in accordance with the accomplishment status and the first reward acquisition status in the first mission accomplishment condition.

Thus, the game system described above can switch the mission of the selected advantage option to a mission of another advantage option within the valid period.

As a result, with the game system described above, the mission to be accomplished by the player and the executed timing can be flexibly set within a valid period of the advantage option, and thus the game can be more entertaining, and the motivation to obtain the special option for acquiring the reward can be increased.

Another aspect of the invention relates to the following game system.

(29) A server system according to an embodiment of the invention is a server system configured to cause a terminal device, connected to the server system via a network, to execute a game, the server system comprising a processor programmed to:

control a storage storing as advantage option information, information of an advantage option having an advantage content defined as a content of an advantage in the game given within a given valid period to a player for which the advantage option is set;

receive an operation instruction from the player via the terminal device;

set the advantage option for the player, based on the operation instruction from the player that has been received;

execute the game, for an option set player that is the player for which the advantage option is set or a player character that is an operation target of the option set player, based on the operation instruction from the option set player and the advantage option information associated with the advantage option set for the option set player;

execute game status detection processing of detecting a game status of the option set player related to the game;

execute change processing of changing the advantage content given to the option set player, based on a detection result of the game status detection processing; and provide to the terminal device, game information of the game including information of the advantage content.

With the server system described above, for an option set player having an advantage in the game over a non-option set player having no advantage option set such as acquiring a larger number of rewards or a reward of a higher value (rarity or rank) or level, or easier condition related to the game, the content of the reward to be acquired such as the number or the type of the rewards can be changed in accordance with the game status of the option set player.

Thus, with the server system, the advantageous effect enjoyed by the option set player based on the game status can be changed in accordance with the game progress status, to make the option set player more focused on the game or more motivated to play the game or actively interact with other players.

Thus, with the server system described above, the game can be more entertaining, by increasing the motivation to acquire the advantage option as well as the attractiveness of the advantage option, and with the advantage option itself involving the game-like quality.

The "content of reward" is a content of a reward acquired by the player for example, and includes rewards making the player advantageous in the game or increase the motivation to acquire the reward, such as (3A1) making a change in a parameter changing in accordance with game progress (experience points, ability value, points, game currency, specific item, or an encounter rate/matching probability/encounter order of a matching opponent (player character or enemy character)) advantageous, (3A2) making a specific item, new player character, or a parameter such as game currency/points/strength value acquired, easy to be acquired (for example, increasing the possibility of winning this in gacha, reducing the cost for purchasing or exchanging this, changing a possessed item to an item of the same type with a higher ability or the like, and making this easier to be found or obtained), or increasing the option of this, (3A3) making the task more difficult or easier, (3A4) making the possibility of winning the gacha in the game advantageous for the player, including increasing the possibility of winning a rare item or reducing the possibility of not winning anything, (3A5) reducing consumption of a parameter (billing amount, consumed points, or a strength value (energy value) of a player character) in the game, (3A6) changing an outer appearance (that is, looks) ability/attribute/quantity/value (including a selling price in a game or when selling to another player and impact on a combining material) restriction release (such as making the usable time longer or unlimited) of an item usable for a player character, (3A7) giving a trophy/medal/emote, (3A8) changing outer appearance/ability/attribute of a player character, (3A9) enabling a reward failed to be acquired at a determined timing in a game such as a reward (daily bonus, for example) failed to be acquired due to failure to satisfy a predetermined condition or a reward that was available before the game starts, or changing the reward (that is, the unacquired reward) to a reward providing an advantageous effect to the player when the reward is acquired, and (3A10) changing an order of a plurality of rewards acquired one by one along the progress of the game (with the grade of the reward gradually increasing) to be advantageous for the player.

Specifically, the "game status" includes, for example:

(3B1) a parameter of an individual player or a player character that varies as the game progresses, such as a level and experience points;

(3B2) a status based on at least one of whether the player or player character has a game element and the type of the game element;

(3B3) a status based on a game action related to login or an acquisition timing of an advantage option by the player or the player character or a temporal element (such as timing or period) related to the game action; and (3B4) a status based on information about another player (hereinafter, referred to as "related player") related to the player.

In addition to the above, the "change processing" includes both changing the content of an advantage to one advantageous for the player, and changing the content of an advantage to one disadvantageous for the player, but the content of an advantage is preferably changed to one advantageous for the player.

A case where the "change processing" is executed to change the content of an advantage to one advantageous to the player includes, for example:

(3C1) changing the content of the advantage to the option set player to be better, in accordance with a better record in the game, a larger billing amount in the game, earlier setting of the advantage option for the player, a larger number of items acquired, a longer play time of the player in the game, or a larger number of logins to the game within the valid period;

(3C2) changing the content of the advantage to the option set player to be better (such as increasing the frequency of appearance of certain items such as items that are frequently used or items with high rarity, or reducing the frequency of or preventing the appearance of the item that is already possessed), in accordance at a certain timing or in a certain period during the valid period such as immediately after the advantage option is set, in an end period of the valid period;

(3C3) changing the content of the advantage to the option set player to be better, in accordance with a larger number of related players, higher closeness to the related players, a better record of the related players, or a larger value of a predetermined element (the number of participants, the number of active players, active rate, and inactive rate) of all the players within the valid period; and (3C4) rewards such as items or abilities already possessed by the player, items or abilities set for the player character, or items or abilities to be used in tasks already cleared is not acquired or the possibility of acquisition of such a reward is reduced, or rewards such as the item or ability to be required (expected to be required) for the player or the player character in the future or the possibility of acquisition of such a reward is increased.

Specifically, "changing the content of the advantage to be better" includes changing the content of the advantage described above to be better.

The "change processing" not only includes changing the content of the advantage to the option set player currently possessing the advantage option, but also includes a case where the content of the advantage given when an advantage option is acquired in the future (for example, within a new valid period in which the advantage option can be set after the current valid period has ended).

(30) In the server system described above, the processor may be programmed to execute the game status detection processing of detecting as the game status, game element information including a variable game parameter that varies with a game progress of the option set player or the player character that is the operation target of the option set player.

The server system described above can, for example, detect as the game status, an index of the player related to the game such as a record, progress, or skill of the player in the game, by detecting the various parameters as numerical values such as the level, the experience points, or the like of the player for example.

Thus, with the server system described above, the content of the advantage can be changed to be a different advantageous content based on the record, the progress, or the skill for each option set player, so that the game can be more entertaining, by increasing the motivation to acquire the advantage option as well as the attractiveness of the advantage option, and with the advantage option itself involving the game-like quality.

Specifically, the "varying game parameter" includes the current or past varying game parameter of the corresponding option set player and option player's player character, which is one or more of parameters such as a player level, a player character level, a billing amount (total billing amount within a certain period or from the start of the game), experience points, points, game currency amount, and the number of items possessed for example.

The "game element information including varying game parameter" may be any information including varying game parameter, and thus may include information other than the varying game parameter. For example, the information other than the varying game parameter includes information about whether the game element is provided and the type of the game element.

(31) In the server system described above, the variable game parameter may include at least one of a parameter related to a record in the game, a parameter related to billing in the game, and a parameter related to an item provided in the game.

The server system described above can, detect as the game status, an index of the player related to the game such as a record, progress, or skill of the player in the game.

(32) In the server system described above, the processor may be programmed to execute the game status detection processing of detecting as the game status, game element information including at least one of information of whether the option set player or the player character that is the operation target of the option set player has a game element and information of a type of the game element.

For example, the server system described above can detect the index of the player in the game such as the record, progress, skill, or the like of the player in the game, as the game status, based on game elements such as whether a certain item is possessed, whether a certain ability (defined by a parameter) of the player character is possessed, the type of these.

Thus, with the server system described above, the content of the advantage can be changed to be a different advantageous content based on the record, the progress, or the skill for each option set player, so that the game can be more entertaining, by increasing the motivation to acquire the advantage option as well as the attractiveness of the advantage option, and with the advantage option itself involving the game-like quality.

The game element includes the current or past game element of the corresponding player or player character including the item possessed by the player or the player character, whether a character is possessed, and the type of the possessed character or item.

(33) In the server system described above, the processor may be programmed to execute the game status detection processing of detecting as the game status, at least one of a game action related to the option set player or the player character that is the operation target of the option set player and a temporal element related to the game action.

The server system described above can detect the game status such as an index of a player such as the progress in the game, level of advancement in the game, the level of immersion in the game, a timing more suitable for enjoying the advantage, or the like.

Thus, the server system described above can change the content of advantage to a different advantageous content based on the contribution level to the activation of the game, the level of immersion, or the like of each option set player, and can make the content of the advantage to be advantageous immediately after the advantageous option is acquired, whereby the motivation for the acquisition can be increased.

As a result, with the server system described above, the game can be more entertaining, by increasing the attractiveness of the advantage option, and with the advantage option itself involving the game-like quality.

For example, the "game action" includes login, game execution (play), billing, acquisition of (paid or free) advantage options, and participation in an event such as a lottery event (including gacha) or a minigame.

The "temporal element related to the game action" includes, for example, a timing based temporal element and continuous temporal element.

The timing based temporal element related to various game action timings such as (3D1) a timing when an advantage option is set, (3D2) login timing (certain login timing such as a first login timing, or plurality of login timings), (3D3) a billing timing (billing timing for a reward such as the first billing timing), (3D4) a timing at which the billing reaches a certain amount,
(3D5) a game start timing,
(3D6) a timing when a certain level is reached, and
(3D7) a timing when a certain item is acquired.

The continuous temporal element includes
(3E1) a login count (access count),
(3E2) a login frequency (consecutive login days and the number of accesses in a day), and
(3E3) an access time to the game (within a valid period, a total time from the start of the game, and within a certain period).

The temporal element may be each of the temporal elements (3D1) to (3D7) and (3E1) to (3E3) described above within the valid period of the advantage option, an overall period over the entirety of the game, or a certain period (for example, an event period) in the valid period or the overall period.

(34) In the server system described above, the processor may be programmed to detect the game status in a given special period with respect to the valid period.

For example, the server system described above can detect the game status such as a timing more suitable for enjoying the advantage such as that in a period immediately before the valid period starts, a period immediately before the end of the valid period, a given event period within the valid period, or a special period before the valid period for the option set player that has acquired the advantage option before the valid period starts.

Thus, the server system described above provides a limited period in which a further advantage can be provided not only within the valid period, so that the motivation to acquire the advantage option can further be increased.

(35) In the server system described above, the processor may be programmed to executes the game status detection processing of detecting as the game status, the game action performed by the option set player or the player character that is the operation target of the option set player at a given timing corresponding to the temporal element related to the game action.

The server system described above can detect the game status such as a player index including the progress or level of advancement of the player in the game, or the level of immersion in the game of the player, a timing more suitable for enjoying the advantage, based on a game action timing such as the first billing timing, a timing of reaching the predetermined billing amount, a timing when the game started, a timing of reaching a predetermined level, a timing of acquiring an advantage option, or a timing of acquiring a certain item.

Thus, with the server system described above, the content of the advantage can be changed to be a different more advantageous content for player who has executed more actions related to the game for example, so that the game can be more entertaining, by increasing the motivation to acquire the advantage option as well as the attractiveness of the advantage option, and with the advantage option itself involving the game-like quality.

(36) In the server system described above, the processor may be programmed to execute the game status detection processing of detecting as the game status, an access status to the game corresponding to the game action performed by the option set player.

The server system described above can detect, for example, the level of immersion in the game or the contribution level to the game, by obtaining a numerical value expressing a game action by the option set player such as the access time the access count, the access frequency, or the like.

Thus, with the server system described above, the content of the advantage can be changed to be a different more advantageous content for player who has executed more actions related to the game for example, so that the game can be more entertaining, by increasing the motivation to acquire the advantage option as well as the attractiveness of the advantage option, and with the advantage option itself involving the game-like quality.

(37) In the server system described above, the processor may be programmed to execute the game status detection processing of detecting as the game status, related player information of another player related to the option set player.

Based on the number and types of players, such as a friend or a follower, in a given relationship with another player such as friend relationship, the server system described above can detect as the game status, an index of the player, and an active state or inactive state indicating whether the game is actively played (not only including whether the number of currently active users is large or small, but also including a load element on the system providing the game such as a server) such as:
(3F1) closeness to another player;
(3F2) contribution to vitalization of the game;
(3F3) a team status (the scale of the team, a status indicating whether the team is winning or losing in the game, teamwork (whether the team record is good or bad));
(3F4) the scale of the game (the number of players registered to participate in the game as a whole);
(3F5) percentage of the players currently participating in the game or participated in the game in the past;
(3F6) the number of active users;
(3F7) a time zone in which the game is not actively played (or not in the inactive state); and
(3F8) the percentage of the players who acquired the advantage option or have acquired the advantage option in the past.

As a result, with the server system described above, the game can be more entertaining, by increasing the attractiveness of the advantage option, and with the advantage option itself involving the game-like quality.

For example, the information related to the other player (hereinafter, referred to as "related player") related to the player includes:
(3G1) the number of friends or followers or their level or record;
(3G2) a communication count or frequency, such as the number of comments or emails sent/received during the game;
(3G3) view count and frequency of player information;
(3G4) the number of times and frequency of exchange (handover) of an item with another player;
(3G5) the number of members in a team, a team record, the number of times or rate of successful team play (a combination play such a combo); or
(3G6) the number of all the players registered in the game and the record of each player;
(3G7) the number of players currently participating (accessing) or the number of players who have accessed in the past; and
(3G8) the number of players currently possessing the advantage option or the number of players who acquired the advantage option in the past.

(38) In the server system described above, the related player information may include information about a player in a predetermined relationship with the option set player and information about all players participating in the game.

The server system described above can detect as the game status, the number of players in a predetermined relationship with the player such as a friend or a follower or the type of such players, the status of the team of the player, the number of times the communications are performed with the other players in the game, the number of all the registered players in the game, the currently participating players (access players), and the number of players that have acquired the advantage option.

Thus, the server system described above can change the content of the advantage to a different advantageous content base on the closeness to the other player, the level of contribution to the activation of the game, the status of the team (the scale of the team, the status indicating whether the team is winning or losing in the game, or the team work (whether the team record is good or bad)), the scale of the game, the percentage of the players who are currently participating in the game or have participated in the game in the past, and the percentage of the players who acquired the advantage option or have acquired the advantage option in the past.

(39) In the server system described above, the processor may be programmed to detect for a type of a game action performed by the player character that is the operation target of the option set player, an advantage content change parameter for changing the advantage content, the advantage change parameter varying in accordance with the game status as a result of the game action, and executes the change processing of changing the advantage content based on the advantage change parameter detected.

Specifically, the server system described above is configured to be capable of changing, based on each advantage content change parameter changing in accordance with the game status as a result of each game action, the corresponding reward or the content of the reward, while being capable of focusing on the reward or the reward content to be changed for the sake of the player, since the type of the game action is directly related to the reward or the reward content to be changed.

Thus, with the server system described above, the reward or the content thereof can be easily changed as desired by the player in this manner, whereby the game can be more entertaining.

(40) A game execution method according to one embodiment of the invention is a game execution method of making a terminal device execute a game, the method comprising:
controlling a storage storing as advantage option information, information of an advantage option having an advantage content defined as a content of an advantage in the game given within a given valid period to a player for which the advantage option is set;
executing reception processing of receiving an operation instruction from the player via the terminal device;
setting the advantage option for the player, based on the operation instruction from the player that has been received;
executing the game, for an option set player that is the player for which the advantage option is set or a player character that is an operation target of the option set player, based on the operation instruction from the option set player and advantage option information associated with the advantage option set for the option set player;
executing game status detection processing of detecting a game status of the option set player related to the game;
executing change processing of changing the advantage content given to the option set player, based on a detection result of the game status detection processing; and
causing the terminal device to display game information of the game, including information of the advantage content.

With the game execution method, the advantageous effect enjoyed by the option set player based on the game status can be changed in accordance with the game progress status, to make the option set player more focused on the game or more motivated to play the game or actively interact with other players.

Thus, with the game execution method described above, the game can be more entertaining, by increasing the motivation to acquire the advantage option as well as the attractiveness of the advantage option, and with the advantage option itself involving the game-like quality.

(41) A game system according to one embodiment of the invention is a game system executing a game, the game system comprising the processor programmed to:
control a storage storing as advantage option information, information of an advantage option having an advantage content defined as a content of an advantage in the game given to a player within a given valid period to which the advantage option is set;
receive an operation instruction from the player via the terminal device;
set the advantage option for the player, based on the operation instruction from the player that has been received;
execute the game, for an option set player that is the player for which the advantage option is set or a player character that is an operation target of the option set player, based on the operation instruction from the option set player and advantage option information associated with the advantage option set for the option set player;
execute game status detection processing of detecting a game status of the option set player related to the game;
execute change processing of changing the advantage content given to the option set player, based on a detection result of the game status detection processing; and
cause a display to display game information of the game, including information of the advantage content.

With the game system, the advantageous effect enjoyed by the option set player based on the game status can be changed in accordance with the game progress status, to make the option set player more focused on the game or more motivated to play the game or actively interact with other players.

Thus, with the game system described above, the game can be more entertaining, by increasing the motivation to acquire the advantage option as well as the attractiveness of the advantage option, and with the advantage option itself involving the game-like quality.

Embodiments of the invention are described in detail below with reference to the drawings. It is noted that the following embodiments do not unduly limit the scope of the invention as stated in the claims. In addition, all of the elements described in the following embodiments are not necessarily essential requirements of the invention.

1. First Embodiment

First, a game system according to a first embodiment of the invention will be described with reference to FIGS. 1 to 10.

1.1 Game System

First, an overview and a general configuration of a game system 1 according to the first embodiment of the invention will be described with reference to FIG. 1. FIG. 1 is a diagram illustrating an example of a configuration of the game system 1 according to the first embodiment.

In the game system 1 according to the first embodiment, as illustrated in FIG. 1, a server 10 which provides a game service and a terminal device 20 (for example, terminal devices 20A, 20B, and 20C) are connectable to the Internet (an example of a network).

By accessing the server 10 from the terminal device 20, a user can play a game being transmitted from the server 10 over the Internet. Furthermore, by accessing the server 10 from the terminal device 20, the user can communicate with other users.

The server 10 is an information processing apparatus capable of providing a service that enables users to play a game via the terminal device 20, connected to the server 10 via the Internet so as to be capable of communicating with the server 10. In addition, the server 10 may function as an SNS server which provides a communication-type service. In this case, an SNS server may be an information processing device which provides a service that enables a plurality of users to communicate with each other.

Furthermore, for example, when the server 10 functions as an SNS server, the server 10 is capable of providing a game referred to as a social game which is executed using an operating environment (an application programming interface (API), a platform, or the like) of the provided SNS.

In particular, the server 10 is capable of providing games provided on a web browser of the terminal device 20 including browser games (games which start by simply opening an installation site with a web browser) created in various languages such as HTML, FLASH, CGI, PHP, shockwave, a Java (registered trademark) applet, and JavaScript (registered trademark) for example.

Social games differ from existing online games in that dedicated client software is not required, and include games that can be played with only a web browser and an SNS account. In addition, the server 10 is configured to be capable of being connected to a terminal (a smart phone, a personal computer, a game device, or the like) of another user via a network and providing an online game which enables a same game progress to be simultaneously shared online.

Meanwhile, the server 10 may be constituted by one device or processor or a plurality of devices or processors.

In addition, information such as billing information and game information stored in a storage area (a storage 140 to be described later) of the server 10 may be stored in a database (a storage apparatus or a memory in a broad sense) connected via a network (an intranet or the Internet) or, when the server 10 functions as an SNS server, information such as player information storage 146 stored in the storage area may be stored in a database (a storage or a memory in a broad sense) connected via a network (an intranet or the Internet).

Specifically, the server 10 receives input information based on an operation by a user (in other words, a player executing a game) transmitted from the terminal device 20 and performs game processing based on the received input information. In addition, the server 10 transmits a game processing result to the terminal device 20, and the terminal device 20 performs various processing so as to provide the user with the game processing result received from the server 10 in a viewable manner.

The terminal device 20 is an information processing device such as an image generating device including a smart phone, a mobile phone, a PHS, a computer, a game device, a PDA, and a mobile game device, and is capable of connecting to the server 10 via a network such as the Internet (a WAN) or a LAN. A communication line between the terminal device 20 and the server 10 may be either wired or wireless.

In addition, the terminal device 20 is provided with a web browser capable of viewing web pages (data in an HTML format). In other words, the terminal device 20 has a communication control function for communicating with the server 10 and a web browser function for performing display control using data (web data, data created in the HTML format, etc.) received from the server 10, and executes various processing in order to provide the user with a game screen and enable the user to execute a game. Alternatively, the terminal device 20 may acquire game control information provided by the server 10 and execute predetermined game processing, and execute a game based on the game processing.

Specifically, when the terminal device 20 makes a request to execute a predetermined game to the server 10, the terminal device 20 is connected to a game site of the server 10 and a game starts. Specifically, by using an API as necessary, the terminal device 20 causes the server 10 functioning as an SNS server to execute predetermined processing, or, to acquire the player information storage 146 managed by the server 10 functioning as an SNS server to execute a game.

1.2 Server

Figure 2:
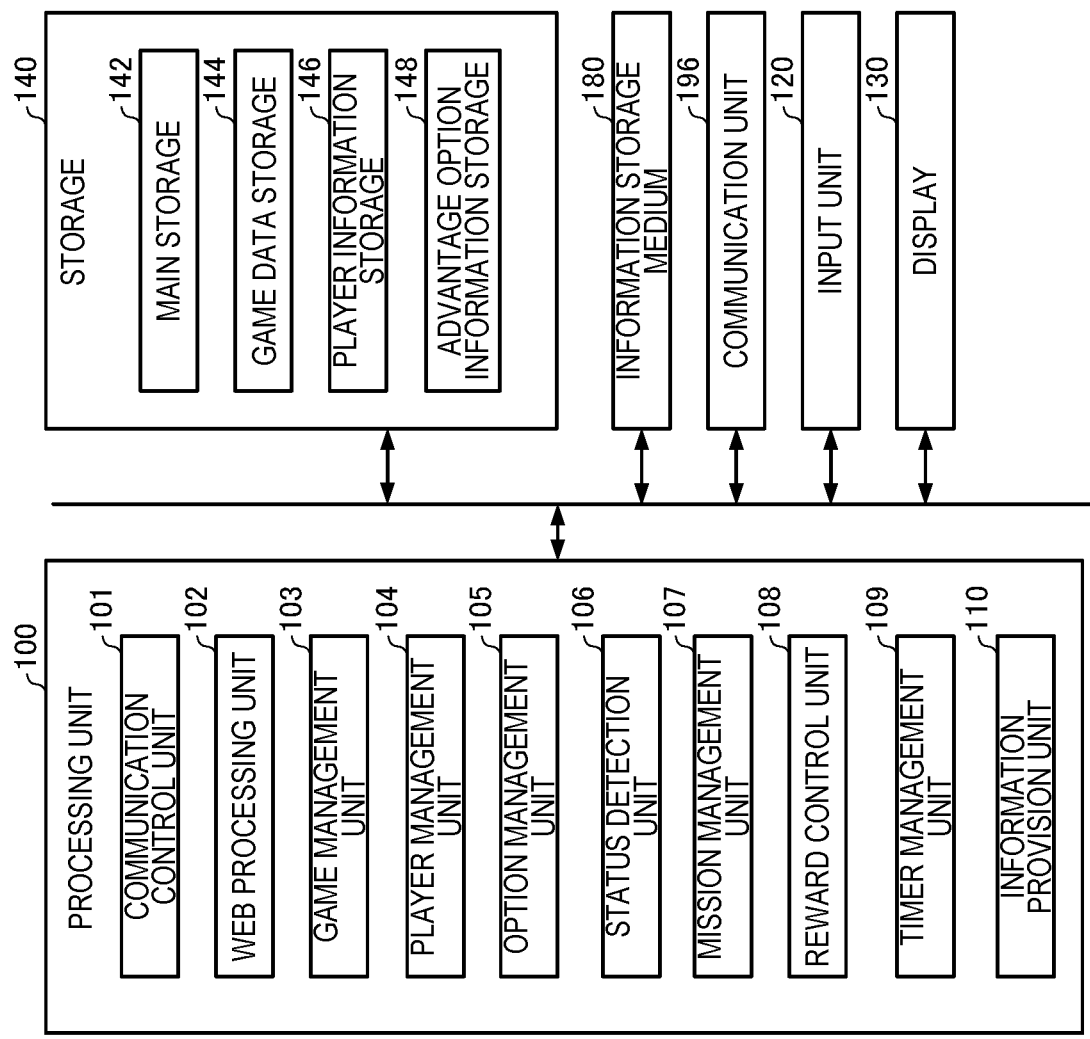
FIG. 2 is a functional block diagram illustrating a server according to the first embodiment.

Next, the server 10 according to the first embodiment will be described with reference to FIG. 2. FIG. 2 is a functional block diagram illustrating the server 10. Alternatively, the server 10 may have a configuration in which a part of the components (units) illustrated in FIG. 2 is omitted.

The server 10 includes an input unit 120 used by an administrator (operator) or the like for input, a display 130 which performs a predetermined display, an information storage medium 180 storing predetermined information, a communication unit 196 for communicating with the terminal device 20 etc., a processing unit 100 which executes processing mainly related to a game to be provided, and the storage 140 storing a variety of data mainly used in the game.

The input unit 120 is used by a system administrator etc. to input settings related to a game and other necessary settings and to input data. For example, the input unit 120 is constituted by a mouse, a keyboard, or the like.

The display 130 is for displaying an operation screen for the system administrator. For example, the display 130 is constituted by a liquid crystal display or the like.

The information storage medium 180 (a computer-readable medium) stores a program, data, etc., and a function of the information storage medium 180 is constituted by an optical disc (a CD or a DVD), a magneto-optical disc (MO), a magnetic disk, a hard disk, a magnetic tape, a memory (ROM), or the like.

The communication unit 196 performs various controls for communicating with the outside (for example, a terminal, another server, or another network system), and a function of the communication unit 196 is constituted by hardware such as various processors and a communication ASIC, a program, or the like.

The storage 140 serves as a work area for the processing unit 100, the communication unit 196, etc., and a function of the storage 140 is implemented by a RAM (VRAM) etc. Moreover, information stored in the storage 140 may be managed by a database.

The storage 140 includes a main storage 142 as well as:
(A1) a game data storage 144 that stores game information indicating information about the game;
(A2) a player information storage 146 that stores player information indicating information about each player and information about a player related to a game of a player (hereinafter referred to as "player-related information"); and
(A3) an advantage option information storage 148 that stores one or a plurality of options (hereinafter, referred to as "advantage option information") for giving an advantage such as acquisition of reward in a game to a player within a given validity period, and
forms a storage according to a first embodiment.

In particular, the game data storage 144 stores; information about a game field where the game takes place; condition information used for various determinations; information about each object on the game field; information for changing each object; various table information; information about a player character of each player; information about each item used in the game, and the like.

The player information storage 146 stores the player-related information for each player including:
(B1) a nickname and a player ID of the player, as well as the name and an ID of a player's team when he or she is in the team (hereinafter, referred to as "affiliation information");
(B2) information (hereinafter, referred to as "record information") about a record of an individual and a team including current level (player level), score, experience points, energy parameter value (life energy value, strength value, and a power value), reward acquired, game time, or the like;
(B3) information about characteristics (whether it has an ability and a parameter defining each ability) and an attribute (including level) of a player character (when there are a plurality of characters, information about the characteristics and the attribute of each of the characters);
(B4) information about billing such as billing history and billing amount;
(B5) item-related information including information (hereinafter, referred to as "item information") about an item possessed by a player character and information about an item possessed in the past;
(B6) information (hereinafter, referred to as "access information") about a history of login (access);
(B7) information about reward acquired (hereinafter, also referred to as "acquired reward information");
(B8) information (hereinafter, also referred to as "affiliated team information" on an affiliated team; and
(B9) information (hereinafter, also referred to as "related player information") related to another player (hereinafter, also referred to as "related player") in a certain relationship, such as a registered friend or a follower.

The related player information includes information about a player (a user in a case of a service other than games) in a certain relationship such as a friend or a follower, not only in the game according to the first embodiment including the advantage option, but also in other games, as well as an application other than games and a service using a given platform such as various network services (SNS and video streaming service, for example).

In particular, in this case, the player management unit 104 described later acquires information about a player or a user such as a friend using the platform such as the application or the service as described above before the game starts or at a predetermined timing during the game, and stores the acquired information in the player information storage 146 as the related player information.

Furthermore, in this case, upon acquiring the related player information from such an external platform, the player management unit 104 may identify a player participating in the game according to the first embodiment, and register information about the player in the player information storage 146. It should be noted that, with the configuration according to the first embodiment, in this case, the related player in the other platform service and the game according to the first embodiment is identified based on common identification information such as a common player ID (user ID), a nickname, credit card information, or a phone number and UID of a mobile terminal device, and the information of such a player is registered in the player information storage 146.

The advantage option information storage 148 stores advantage option information including mission information defining mission accomplishment conditions indicating conditions for a plurality of respective missions to be accomplished within a given valid period by each player, and a reward that is obtained by the player when each mission is accomplished and is associated with each mission accomplishment condition.

The advantage option information storage 148 may store advantage option information defining a mission accomplishment condition and a score associated with each mission accomplishment condition, for each advantage option.

The processing unit 100 performs a variety of processing using the main storage 142 in the storage 140 as a work area. Functions of the processing unit 100 can be implemented by hardware such as various processors (a CPU, DSP, or the like) and an ASIC (a gate array or the like), and programs.

The processing unit 100 performs a variety of processing according to the first embodiment based on the program (data) stored in the information storage medium 180. In other words, the information storage medium 180 stores a program that causes a computer to function as each unit (a program which causes a computer to execute processing of each unit) of the first embodiment.

For example, the processing unit 100 (processor) performs, based on a program stored in the information storage medium 180, overall control of the server 10 as well as a variety of processing including control of delivery of data etc. between the units. Furthermore, the processing unit 100 performs processing for providing various services in response to a request from a terminal device 20.

Specifically, the processing unit 100 includes at least a communication control unit 101, a web processing unit 102, a game management unit 103, a player management unit 104, an option management unit 105, a status detection unit 106, a mission management unit 107, a reward control unit 108, a timer management unit 109, and an information provision unit 110.

The communication control unit 101 performs processing for transmitting and receiving data to and from the terminal device 20 via the network. In other words, the server 10 performs a variety of processing based on information received by the communication control unit 101 from the terminal device 20 etc.

In particular, the communication control unit 101 performs processing for transmitting, based on a request from the terminal device 20 of a player, a game screen to the terminal device 20 of the user.

The communication control unit 101 executes various types of processing for receiving an instruction input from the player through the terminal device 20.

The web processing unit 102 functions as a web server. For example, the web processing unit 102 performs, through a communication protocol such as Hypertext Transfer Protocol (HTTP), processing for transmitting data in response to a request by a web browser 211 installed on the terminal device 20 and processing for receiving data transmitted by the web browser 211 of the terminal device 20.

While a case where the server 10 is provided with a function as an SNS server will be described as an example in the first embodiment, the server 10 may be separately formed as a game server and a server for SNS. In addition, the server 10 may perform a part of or all of processing of a game according to the first embodiment or the terminal device 20 may perform a part of the processing of the game.

The game management unit 103 operates in conjunction with the terminal device 20 to build a game space as a virtual space, and on the basis of the operation of the player input via the terminal device 20, executes various types of game processing related to various match-up games such as battle games (where a plurality of players enters a match to fight or combat each other), action games, RPG, sound games, or a sports game.

The game management unit 103 executes various types of game processing based on player instructions transmitted from the terminal device 20.

In particular, in response to the operation input from the player to the terminal device 20, the game management unit 103 implements operations of other related characters and objects and various types of game processing, while controlling movement in a game space and each action in the game performed by a player character that is an operation target of each player.

The game management unit 103 may execute various types of game processing on a single player character or may execute various types of game processing on a plurality of player characters based on an instruction from one player.

The player management unit 104 registers and manages the player-related information, including the items possessed by the player and the acquired rewards, in the player information storage 146 and manages the player character, or a deck having the player character set during the game.

The option management unit 105 manages each option information stored in the advantage option information storage 148 and manages a player for which the advantage option is set.

The option management unit 105 executes specification change processing of changing at least one of a specification of an advantage option (hereinafter, referred to as "set advantage option") that has been set for an option set player and another advantage option that is different from the set advantage option set for the option set player (hereinafter, simply referred to as "other advantage option").

In the first embodiment, the other advantage option different from the set advantage option includes an advantage option (hereinafter, referred to as "to-be-set advantage option") that is to be obtained by and set for the option set player in the future, or the other advantage option (hereinafter, referred to as "concurrently set advantage option") set concurrently with the set advantage option.

Furthermore, the following description is given with the other advantage option assumed to be the to-be-set advantage option.

The status detection unit 106 executes option status detection processing of detecting, as an option status, a given status of an element (hereinafter, referred to as "option element") related to the set advantage option for each player (hereinafter, also referred to as "option set player") to which the advantage option has been set.

The mission management unit 107 manages a mission accomplishment status of the option set player or a player character (hereinafter, referred to as "option player's player character") that is an operation target of the option set player.

In particular, the mission management unit 107 executes processing (hereinafter, referred to as a "mission determination processing") that determines whether the mission has been accomplished by the option set player or the option player's player character.

The reward control unit 108 executes reward control processing of setting, when a mission is determined to have been accomplished by a corresponding option set player or option player's player character, a corresponding reward to be at least acquirable by the player (including giving the reward to the player unconditionally).

The timer management unit 109 has a timer function and is used to manage the progress status of the game. Specifically, the timer management unit 109 works together with the game management unit 103, and outputs the current time and a preset time to each unit. The timer management unit 109 is used for synchronization with other terminal devices.

The information provision unit 110 generates various types of game information (including reward information and information about dramatic effect) for the terminal device 20 to process the game, and provides the game information to the corresponding terminal device 20.

Specifically, the information provision unit 110 provides, as the game information, information about a mission and information about the contents of the advantage such as a reward for the option set player, to the player corresponding to the terminal device 20 at a given timing, in a notifiable manner.

1.3 Terminal Apparatus

Figure 3:
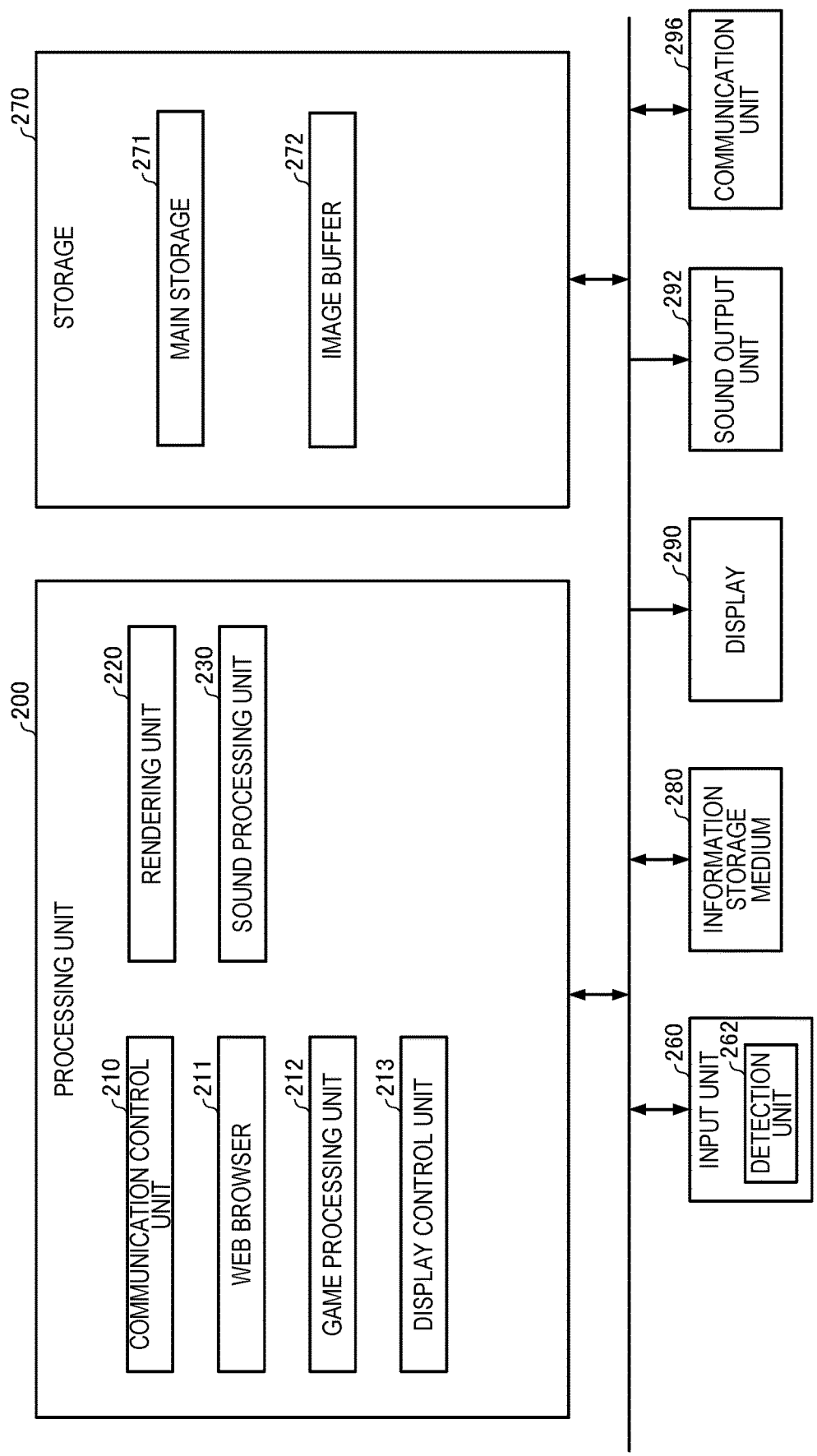
FIG. 3 is a functional block diagram illustrating a terminal device according to the first embodiment.

Next, the terminal device 20 according to the first embodiment will be described with reference to FIG. 3. FIG. 3 is a functional block diagram illustrating the terminal device 20. The terminal device 20 may have a configuration in which a part of the components (units) illustrated in FIG. 3 is omitted.

An input unit 260 is a device which enables a player to input information and which outputs input information of the player to the processing unit 200. The input unit 260 is provided with a detection unit 262 which detects input information (an input signal) of the player. Examples of the input unit 26 include a lever, a button, a steering wheel, a microphone, a touch panel-type display, a keyboard, and a mouse.

A storage 270 serves as a work area for the processing unit 200, a communication unit 296, etc., and a function of the storage 270 can be implemented by a RAM (VRAM) or the like. In addition, the storage 270 includes a main storage 271 to be used as a work area and an image buffer 272 storing a final display image etc. Note that a configuration with some of these omitted may be employed.

The information storage medium 280 (a computer-readable medium) stores a program, data, etc., and a function of the information storage medium 280 may be implemented by an optical disc (a CD or a DVD), a magneto-optical disc (MO), a magnetic disk, a hard disk, a magnetic tape, a memory (ROM), or the like.

The processing unit 200 performs a variety of processing according the first embodiment based on the program (data) stored in the information storage medium 280. The information storage medium 280 may store a program that causes a computer to function as each unit (a program which causes a computer to execute processing of each unit) of the first embodiment.

Note that, in the first embodiment, a program and game data for causing the computer to function as each unit according to the first embodiment stored in the information storage medium 180 and the storage 140 of the server 10 is received over a network. The program and the data thus received are stored in an information storage medium 280. The programs and data received from the server 10 may be stored in a storage 270. Such a case in which the program and data are received for making the network system function is also within the scope of the invention.

A display 290 is for outputting an image generated in the first embodiment and a function thereof can be realized by a CRT, an LCD, a touch panel-type display, a head-mounted display (HMD), or the like. A sound output unit 292 is for outputting sound generated in the first embodiment and a function thereof can be realized by a speaker, a headphone, or the like.

The communication unit 296 performs various controls for communicating with the outside (for example, another terminal or another server), and a function of the communication unit 296 can be implemented by hardware such as various processors and a communication ASIC, a program, or the like.

The processing unit 200 (processor) executes processing such as game processing, display control, image generation processing, or sound generation processing, based on the information about the game acquired from the server 10 via the communication unit 296, the input information acquired from the input unit 260, and a program.

The processing unit 200 performs a variety of processing using the main storage 271 inside the storage 270 as a work area. Functions of the processing unit 200 can be realized by hardware such as various processors (a CPU. DSP, or the like) and an ASIC (a gate array or the like), and programs.

The processing unit 200 includes a communication control unit 210, the web browser 211, a game processing unit 212, a display control unit 213, the rendering unit 220, and the sound processing unit 230. Note that a configuration with some of these omitted may be employed.

The communication control unit 210 performs processing for transmitting and receiving data to and from the server 10. The communication control unit 210 performs processing for storing data received from the server 10 in the storage 270, processing for analyzing received data, processing for controlling transmission and reception of other data, etc.

The communication control unit 210 may perform processing for storing address information (an IP address and a port number) of the server in the information storage medium 280 and managing the stored address information. Furthermore, the communication control unit 210 may communicate with the server 10 when receiving input information to start communication from a player.

The communication control unit 210 performs processing for transmitting identification information of a user to the server 10 and receiving data (such as player information, game card information, player's web page, and game screen) related to the player from the server 10.

The communication control unit 210 may perform data transmission/reception to/from the server 10 at a predetermined interval or may perform data transmission/reception to/from the server 10 when receiving input information from the input unit 260. In addition, the communication control unit 210 may perform processing for receiving a game screen from the server 10.

The web browser 211 is an application program for viewing a web page (a game screen), and performs display control by downloading an HTML file, an image file, or the like from the web server (the server 10) and analyzing a layout of the downloaded file. In addition, the web browser 211 transmits data to the web server (the server 10) using an input form (a link, a button, a text box, or the like).

The web browser 211 is also capable of realizing a browser game. For example, the web browser 211 may execute a program which is received from the web server (the server 10) and which is written in JavaScript (registered trademark), FLASH. Java (registered trademark), or the like.

The terminal device 20 can cause the web browser 211 to display information from a web server designated by an URL via the Internet. For example, the terminal device 20 can cause the web browser 211 to display a game screen (data such as HTML) received from the server 10.

The game processing unit 212 performs various types of game calculation processing. Examples thereof include processing for starting a game when game start conditions are satisfied, processing of executing the game, and processing of ending a game when game end conditions are satisfied.

The game processing unit 212 may perform processing for arranging and setting various objects (objects constituted by primitives such as polygons, free-form surfaces, and subdivision surfaces) representing a displayed article such as a player character, a building, a stadium, a vehicle, a tree, a pillar, a wall, or a map (land form) in an object space.

In this case, an object space refers to a virtual space and includes both a two-dimensional space and a three-dimensional space. A two-dimensional space is a space in which, for example, an object is arranged on a two-dimensional coordinate (X, Y), and a three-dimensional space is a space in which, for example, an object is arranged in a three-dimensional coordinate (X, Y, Z).

In addition, the game processing unit 212 sets game cards as deck data, performs transmission/reception control on various types of information at the time of login, executes game processing based on an operation by the player when executing the game in real time by cooperating with the server 10, and executes game processing including reproduction of received automatic calculation data when the game is executed by automatic calculation.

The display control unit 213 executes display processing on the display 290. For example, the display control unit 213 may execute the display processing using the web browser 211.

The rendering unit 220 performs an image rendering process based on a variety of processing (for example, game processing) performed by the processing unit 200 to generate an image, and outputs the generated image to the display 290 through the display control unit 213 The image generated by the rendering unit 220 may be a so-called two-dimensional image or a so-called three-dimensional image.

The sound processing unit 230 performs sound processing based on results of a variety of processing performed by the processing unit 200, generates game sounds including a BGM, a sound effect, and voices, and outputs the game sounds to the sound output unit 292.

1.4 Method According to First Embodiment 1.4.1 Overview

Next, an overview of a method of the first embodiment (game processing during advantage option setting including option status detection processing and specification change processing) will be described with reference to FIG. 4.

Figure 4:
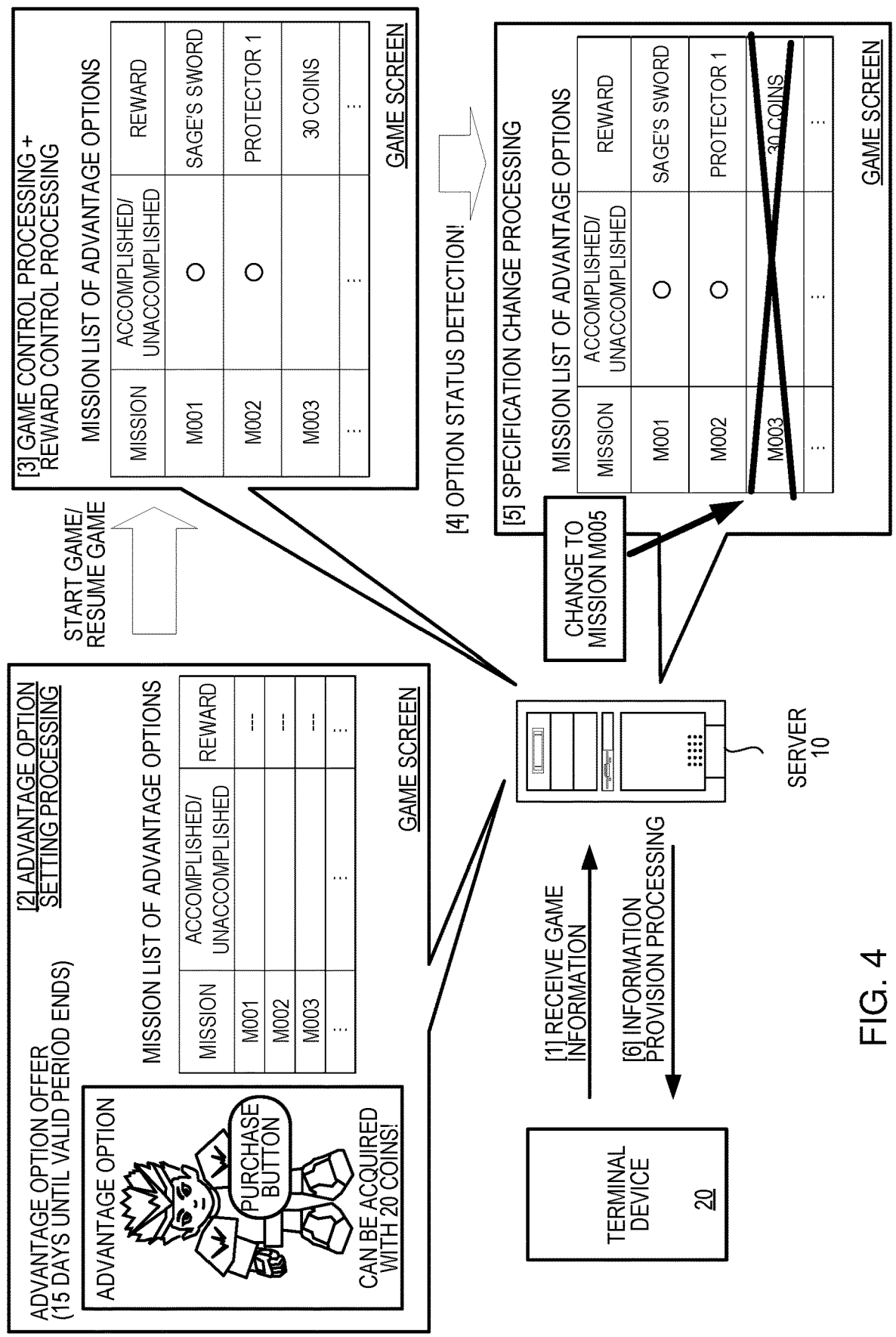
FIG. 4 is a diagram illustrating game processing during advantage option setting including option status detection processing and specification change processing according to the first embodiment.

FIG. 4 is a diagram illustrating game processing during advantage option setting including option status detection processing and specification change processing according to the first embodiment.

The server 10 is configured to cooperate with the terminal device 20 to execute a game such as a match-up game, examples of which include a combat game and fighting game, an RPG, or a simulation game, based on an operation performed by each player input using the terminal device 20, while providing the terminal device 20 with game information such as a player character and other characters, game space or a part thereof, game parameter, BGM, and game scenario for each player.

Specifically, the server 10 is configured to set a plurality of missions, in an incremental (tiered) manner, to each option set player for which the advantage option has been set, and when it is determined that a given condition (hereinafter, referred to as a "mission accomplishment condition") of each mission is satisfied within a predetermined valid period, sets a reward, as the content of the advantage associated with the mission, to be at least acquirable (including giving the reward to the player unconditionally).

Furthermore, the server 10 is configured to detect the option element of the advantage option of each option set player and customize the specification of the advantage option that has been set or is to be set in the future, based on the option element thus detected, to increase the attractiveness of the advantage option so that each player will be more motivated to actively obtain the advantage option.

Specifically, the server 10 configures a server system that performs game control for executing a given game for the terminal device 20 that is connected via a network and is controlled by the player.

Furthermore, as illustrated in FIG. 4, the server 10 is configured to execute reception processing ([1] in FIG. 4) of receiving game information such as an operation instruction from the player via the terminal device 20, and execute game processing of executing a game using a player character (that is, an option player's player character) that is an operation target of the player, based on the operation instruction from the player that has been received.

The server 10 is configured to manage, when the advantage option is set for a player, various types of data including advantage option information which is information about the advantage option defined as the advantage content of the advantage in the game within a given valid period.

Furthermore, as illustrated in FIG. 4, the server 10 is configured to execute
(A1) advantage option setting processing of setting, based on an instruction from a player that has been received, an advantage option for the player ([2] in FIG. 4),
(A2) game control processing of executing, when a game starts or is resumed with the advantage option set, the game based on an operation instruction from an option set player for the option set player or an option player's player character that is an operation target of the option set player, and advantage option information associated with the advantage option set for the option set player ([3] in FIG. 4),
(A3) reward control processing of setting, when the option set player is determined to have satisfied a mission accomplishment condition defined for corresponding mission information within a valid period, a reward defined for the corresponding mission information to be acquired by or acquirable by the option set player ([3] in FIG. 4),
(A4) option status detection processing of detecting a given status of an option element of the option set player as an option status ([4] in FIG. 4),
(A5) specification change processing of changing one or both of a specification of the set advantage option and a specification of a to-be-set advantage option (other advantage option) based on a detection result of the option status detection processing ([5] in FIG. 4), and
(A6) information provision processing of providing game information about various games including information about a changed advantage option and a reward set to be at least obtainable (including a reward provided) to the terminal device 20 ([6] in FIG. 4).

FIG. 4 illustrates a case where
(B1) an instruction from a player is received as game information,
(B2) an advantage option offered to the player in exchange for 20 coins is set, with a purchase button for the advantage option pressed (specifically, setting each mission defined for the advantage option for the player),
(B3) a game progresses based on the operation instruction from the option set player and the advantage option information, mission M001 and mission M002 are accomplished so that a sage's sword and a protector 1 are obtained as rewards, and mission M003 is currently being challenged.
(B4) the option status detection processing of detecting a given status of the option element of the advantage option of the option set player is executed during a game with the mission M003 being challenged,
(B5) processing of changing the third mission of the set advantage option from "M003" to "M005" is executed based on the detection result of the option status detection processing, and
(B6) game information including reward information indicating the reward has been given is provided to the corresponding player, as information providing processing.

With this configuration, in the first embodiment, the specification of the advantage option can be customized based on the option status of the advantage option of the option set player, whereby the advantage option can be provided while taking the characteristics of each player into consideration.

In the first embodiment, the attractiveness of the advantage option can be increased so that the motivation of each player to actively obtain the advantage option can be increased.

The valid period according to the first embodiment is, for example, an initially set period (also referred to as a season) between a predetermined game start timing and a predetermined end timing set regardless of an event in the game, or may be a period from a predetermined game start timing or a start timing of a certain event such as a start of a battle, to a timing arriving in association with an event such as the option player's player character reaching a goal.

When a specific advantage option among a plurality of advantage options is set based on an instruction from the player, the valid period according to the first embodiment is preferably managed as a common period for the plurality of advantage options, but the period is not limited to this.

The player character according to the first embodiment includes, for example:
(C1) a character that is operated by a player;
(C2) a character that automatically operates based on instructions (commands) from the player;
(C3) a character such as an enemy character to compete with in the match-up game;
(C4) a character that cooperates in the game;
(C5) a character that is operated (including instructed) by another player; and (C6) a character (NPC) that operates based on an instruction from a computer. Note that in the following description, the character (C1) is the player character unless otherwise noted.

It should also be noted that each of the characters described above is not limited to a human-type character, and may be a robot, ride, or animal character for example.

1.4.2 Advantage Option Information 1.4.2.1 Advantage Option

Next, an advantage option according to the first embodiment will be described with reference to FIG. 5. Note that FIG. 5 is a diagram illustrating an example of the advantage option information stored in the advantage option information storage 148.

The advantage option is an option acquirable (to be possessed) by the player within a determined period (that is, the valid period) during the game.

Specifically, the advantage option may be acquired by the player as a game item such as a ticket, or may be acquired by the player as "a right to be advantageous" without involving a game item such as a ticket. In the latter case, only the information indicating whether the player has the right may be stored in association with the player information.

The advantage option is an option to be acquired by and set for a player, through billing including payment using game currency and points or free of charge (obtained from another player or obtained through gacha).

The advantage option is automatically set for the player based on the player's instructions or at a certain timing. When the advantage option is set for a player, the player can enjoy various advantageous contents for a player character that is the operation target of the player.

In the first embodiment, the advantage option setting includes using (consuming) the possessed ticket for the advantage option and exerting the given right. In such a case, when the ticket or the right for the advantage option is acquired, the advantage option may be set for the player at the timing of the acquisition.

Furthermore, in the first embodiment, the advantage option functions as an effective option within the valid period (also referred to as a season) indicating a phase in the game, set in advance from the predetermined game start timing to the predetermined end timing, regardless of the event in the game.

The option set player that is a player having the advantage option (player for which the possessed advantage option is set) is, for example, provided with an advantage in the game, over a non-option set player not having the advantage option, regarding the same game action and game processing during the game, as well as a result of such an action and processing.

Specifically, the effect provided by the advantage option according to the first embodiment to be advantageous in the game includes setting a given reward to be acquirable by the option set player or the option player's player character that is the operation target of the player, assuming that a predetermined mission is accomplished.

Various types of information about the specification of the advantage option are stored in the advantage option information storage 148 as the advantage option information.

The advantage option information includes mission information that has a plurality of missions defined in a tiered manner (incremental manner) and option specification information defining specifications for other options.

Specifically, the mission information defines a mission accomplishment condition for accomplishing each mission, and a reward that is associated with each mission accomplishment condition and is acquired by the option set player when the mission is determined to be accomplished with the mission accomplishment condition satisfied.

Moreover, the mission information and the option specification information are information to be changed in the specification change processing.

Specifically, as illustrated in FIG. 5, (A1) mission information defining a plurality of missions;

(A2) option specification information defining a specification for the advantage option itself other than the mission information; and (A3) information about the option set player for which the advantage option is set are stored as the advantage option.

The option specification information includes:

(A2-1) the number of advantage options provided to the player;

(A2-2) a category of the advantage option such as a level and an attribute;

(A2-3) a period (that is, a valid period) during which the function of the advantage option set is exerted;

(A2-4) whether setting the advantage option for the player involves billing, and a billing amount when the billing is involved; and (A2-5) a condition and a status (level, experience points, points, type and quantity of possessed item, and task that has been cleared) of a player or a player character that is the operation target of the player, which are required for setting each advantage option.

As the information about the option set player, (A3-1) a player ID of each player, (A3-2) flag information (hereinafter, referred to as "advantage option setting flag information") indicating whether the advantage option is set for each player, (A3-3) information (hereinafter, referred to as "mission progress flag information") indicating the mission progress status of each option set player, and (A3-4) history information indicating past history of each option set player regarding (A2-1) to (A2-5).

Note that the mission information according to the first embodiment will be described later together with the description of the mission.

In the first embodiment, a plurality of advantage options may be set for the player. In such a case one advantage option is selected from the plurality of advantage options to be set by an instruction from the player or the like.

1.4.2.2 Mission

Next, the mission according to the first embodiment will be described with reference to FIG. 5 described above.

The mission according to the first embodiment is one of a plurality of missions that are accomplished in an incremental manner by a player for which the advantage option is set (that is, an option set player), by satisfying a predetermined condition (hereinafter, referred to as "mission accomplishment condition").

In the first embodiment, when the advantage option is set, a plurality of missions defined in the mission information included in the advantage option are set in an incremental manner to the option set player.

Note that the expression "set in an incremental manner" means that when one mission is accomplished, the next mission is set, so that the missions are set from the first one defined to the last one defined, in a predetermined order in accordance with levels (degrees of difficulty) for example.

For example, the mission according to the first embodiment includes:

(A1) a mission accomplished when a predetermined parameter (such as a game level, experience points, points, game currency, or ability value of a player character) of a player or a player character reaches a value set in advance, and (A2) a mission accomplished when an action in the game set in advance (that is, a game action) such as a competition with an enemy character or an achievement of a certain task is executed by the player or the player character.

Specifically, the mission related to the game action includes, for example:

(A2-1) the player character acquiring a specific item in the game;

(A2-2) the player character defeating a specific enemy character such as a boss character (including a specific type or number of such characters, and accomplishing within a predetermined time limit);

(A2-3) clearing a specific stage such as a bonus stage or a predetermined number of stages (including clearing the stage(s) within a time limit); and (A2-4) executing healing (self-healing or healing for a player character in a specific relationship such as an ally) or resting for a predetermined number of times.

Each mission is associated with a mission accomplishment condition for accomplishing the mission, and a reward set to be acquirable by the option set player that has satisfied the mission accomplishment condition.

The mission information defining each mission defines order information indicating an order of missions to be set in the game, as well as the mission accomplishment condition for each mission and a reward obtained by the player that has accomplished each mission.

For example, as illustrated in FIG. 5, the mission information defines, for each mission:

(B1) a mission ID;

(B2) an executed order of the missions;

(B3) a mission type indicating a mission of defeating an enemy character, a mission of clearing a stage, a mission of acquiring a specific item, or the like for example;

(B4) information about the content of the mission such as text information for notification to the player and visualization information (hereinafter, may be simply referred to as "content information") for example;

(B5) an accomplishment condition of the mission such as the time limit, the number and/or the type of the enemy character(s) to be defeated, the number and/or the type of specific item(s) to be acquired, a use condition (required/unrequired or the number of times) of the tool item being used, and the like; and (B6) a reward ID of a reward set to be acquirable by the corresponding option set player that has satisfied the mission accomplishment condition.

1.4.2.3 Reward

Next, a reward according to the first embodiment will be described with reference to FIG. 6. Note that FIG. 6 is a diagram illustrating an example of the reward information stored in the game data storage 144.

The reward according to the first embodiment is acquired as an advantage content by the option set player for which the advantage option is set, when the mission is accomplished (that is, when the mission accomplishment condition is satisfied).

For example, reward according to a first embodiment includes rewards making the player advantageous in the game or increasing the motivation to acquire the reward, such as (A1) making a change in a parameter changing in accordance with game progress (experience points, ability value, points, game currency, specific items, or an encounter rate/matching probability/encounter order of a matching opponent (player character or enemy character)) advantageous, (A2) making a specific item, new player character, or a parameter such as game currency/points/strength value acquired, easy to be acquired (for example, increasing the possibility of winning this in gacha, reducing the cost for purchasing or exchanging this, changing a possessed item to an item of the same type with a higher ability or the like, and making this easier to be found or obtained), or increasing the option of this, (A3) making the task more difficult or easier, (A4) making the possibility of winning the gacha in the game advantageous for the player, including increasing the possibility of winning a rare item or reducing the possibility of not winning anything.

(A5) reducing consumption of a parameter (billing amount, consumed points, or a strength value (energy value) of a player character) in the game, (A6) changing an outer appearance (that is, looks)/ability/attribute/quantity/value (including a selling price in a game or when selling to another player and impact on a combining material)/restriction release (such as making the usable time longer or unlimited) of an item usable for a player character, (A7) giving a trophy/medal/emote, (A8) changing the outer appearance/ability/attribute of a player character, (A9) enabling a reward failed to be acquired at a determined timing in a game such as a reward (daily bonus, for example) failed to be acquired due to failure to satisfy a predetermined condition or a reward that was available before the game starts, or changing the reward (that is, the unacquired reward) to a reward providing an advantageous effect to the player when such a reward is acquired, and (A10) changing an order of a plurality of rewards acquired one by one along the progress of the game (with the grade of the reward gradually increasing) to be advantageous for the player.

The reward as the advantage content according to the first embodiment changes in accordance with the option status of the option set player.

Specifically, when the advantage option is set, a mission (a mission accomplishment condition in particular) is set for the option set player, and the reward is obtained when the mission is accomplished is set.

For example, the set reward is changed in accordance with the option status of the option set player before the mission is accomplished.

For example, as illustrated in FIG. 6, for example, the reward information indicating a reward includes:

(B1) a reward ID;

(B2) content information indicating the content of the reward (including text information for notification to the player, visualization information for forming an object related to the reward in the game, for example); and (B3) reward change information for changing the reward in accordance with the option status.

For example, the reward change information defines a condition of an option status for changing the reward, and a rule for changing the reward (including the ID of a reward as a target of the change).

The condition of the option status for changing the reward includes, for example, conditions such as: a reward (reward ID is designated) with one rank higher is set to be acquirable each time the level of the player increases by two; an ability defined by the reward is doubled each time the experience points increase by 100; and n daily bonuses (reward obtainable by logging into the game every day) (n is the number of daily bonuses and increases by one for every 20 hours) that have failed to obtained to be no longer obtainable become obtainable, in addition to obtaining a predetermined reward, each time the access time increases by 20 hours.

1.4.3 Advantage Option Setting Processing

Next, the advantage option setting processing according to the first embodiment will be described.

For each player, the option management unit 105 executes the advantage option setting processing of setting the advantage option to the corresponding player based on an instruction from the player.

When there is a plurality of advantage options, the option management unit 105 sets, for each player, an advantage option designated based on an instruction from the player, from among the plurality of advantage options, and registers the type (for example, the option ID) of the advantage option thus set in the advantage option information storage 148 in association with the player.

Upon setting the advantage option, the option management unit 105 causes the information provision unit 110 to generate display control information for displaying information indicating that the advantage option is set for the corresponding player, and to provide the information to the terminal device 20.

When setting the advantage option, the option management unit 105 may execute the advantage option setting processing based on an instruction from the player in a case of obtaining through purchasing and gacha, and may also execute the advantage option setting processing of setting the advantage option for the player, through automatic setting (selection when there are a plurality of advantage options) such as random or program based setting among items prepared by or on the game administrator or a game system for example.

The advantage option may be set before the valid period of the advantage option. In such a case, the game management unit 103 executes various types of game control so that the option set player can enjoy the advantage from the beginning of the valid period.

Specifically, when the advantage option is set before the valid period of the advantage option, the game management unit 103 executes game control processing of executing the game based on the operation instruction from the option set player and the advantage option information associated with the advantage option set for the option set player, for the option set player or the option player's player character, after the valid period starts and until the valid period ends.

When the advantage option is set after the valid period has already started, the game management unit 103 executes various types of game control so that the option set player can enjoy the advantage after the advantage option has been set.

Specifically, when the advantage option is set with the valid period of the advantage option already started, the game management unit 103 resumes the game and executes game control processing of executing the game based on the operation instruction from the option set player and the advantage option information associated with the advantage option set for the option set player, for the option set player or the option player's player character that is the operation target of the option set player as described above, from the timing of the resumption and until the valid period ends.

1.4.4 Mission Determination Processing

Next, the mission determination processing according to the first embodiment will be described.

The mission management unit 107 executes the mission determination processing of determining whether the mission that is currently set, among the plurality of missions that are set in an incremental manner to the advantage option, is accomplished, for each option set player during the valid period.

Specifically, the mission management unit 107 identifies an accomplished mission currently being challenged and identifies the mission accomplishment condition of the mission thus identified, based on the advantage option information for each option set player.

Then, the mission management unit 107 executes the mission determination processing of managing the option status of the corresponding option set player and determining whether the mission accomplishment condition is satisfied based on the mission accomplishment condition identified.

When the mission accomplishment condition is determined to be satisfied, the mission management unit 107 that has determined that the mission is accomplished registers, for each option set player, flag information indicating accomplishment for the corresponding mission information in the advantage option information storage 148.

For example, a case is considered where a mission A with a mission accomplishment condition "defeat five enemy characters" is currently challenged by an option set player A.

In this case, the mission management unit 107 counts the number defeated enemy characters, each time the option set player A fights and competes with an enemy character. When the count finally reaches "5", the mission management unit 107 registers flag information indicating that the option set player A has satisfied the mission accomplishment condition, in the mission information of the advantage option information about the mission A.

For example, a case is considered where a mission B with a mission accomplishment condition "achieving 100 experience points" is currently challenged by an option set player B.

In this case, when the option set player B executes various game actions each enabling the experience points to be obtained, the mission management unit 107 makes the option set player A sequentially obtain the experience points set for each game action so that the experience points are summed up. The game actions include competing with and defeating an enemy character (experience points "+10"), using a spell for healing another player character (experience points "+5"), or finding a specific item (experience points "+3").

When the experience points of the option set player B reach "100", the mission management unit 107 registers flag information indicating that the mission accomplishment condition is satisfied by the option set player B, in the advantage option information about the mission B.

The mission management unit 107 executes mission switching processing of switching, when a given special condition in a game is satisfied in a case where game processing is executed for an option set player based on a specific mission accomplishment condition in the mission information, the mission accomplishment condition of a mission executed by the option set player to the mission accomplishment condition defined as the mission defined to be executed first in the mission information.

Specifically, when it is determined that the special condition (for example, clearing all the missions (satisfying all the mission accomplishment conditions)), clearing a specific mission, or showing an intention to forcibly transition to the mission set first in the mission information to be the mission executed first by the option set player (that is, reset), the mission management 107 executes the mission switching processing of switching to the mission accomplishment condition for the mission defined to be executed first in the mission information.

1.4.5 Reward Control Processing

Next, the reward control processing according to the first embodiment will be described.

When mission is determined to be accomplished (that is, when the corresponding mission accomplishment condition is determined to be satisfied) by the mission determination processing, the reward control unit 108 executes, for each option set player or for each option player's player character, reward control processing of setting a given reward to be at least acquirable by the player (that is, the terminal device 20) (including giving the reward to the player unconditionally).

Specifically, as described above, the reward control unit 108 sets to be at least acquirable, the reward making the player advantageous in the game or the reward increasing the motivation for acquisition, such as (A1) a reward making a change in a parameter, changing along a game progress, advantageous, (A2) a reward making an item used in the game easier to be obtained, (A3) a reward making an enemy character weaker or stronger, (A4) a reward making a task easier or more difficult, (A5) a reward making a possibility of winning a gacha advantageous for the player.

(A6) a reward reducing the consumption of a parameter in the game, (A7) a reward changing the outer appearance/ability/quantity/value/restriction release of an item, (A8) a reward of giving an item, a player character, or a parameter such as game currency/points/strength value, (A9) a reward of giving a trophy/medal/title/emote, and (A10) a reward of changing the outer appearance/ability/attribute of the player character.

Specifically, when the corresponding mission accomplishment condition is determined to be satisfied by the mission determination processing, the reward control unit 108 identifies the reward ID included in the mission information in which the mission accomplishment condition is defined.

Then, the reward control unit 108 searches the reward information based on the identified reward ID, and executes the reward control processing of setting the reward to be acquired or acquirable by the corresponding option set player based on the reward information with the corresponding reward ID.

Note that when the mission is accomplished (that is, when the mission accomplishment condition is satisfied), the reward control unit 108 may make the reward acquired based on an intention of the player (an operation instruction indicating an intention to acquire the reward for example) or assuming a payment based on consumption or billing of the game currency or points (also including strength parameter or the like) (assuming that the mission with such a specification is identified and registered in the mission information).

Specifically, the reward control unit 108 may execute the reward control processing of unconditionally giving the reward to the player, and may also make the reward acquired assuming that the billing or consumption of the game currency or the points are involved, suspend the provision of the reward if the player does not show an intention to acquire the reward (for example, an operation instruction), or determine whether the reward is to be provided based on determination processing of determining whether the reward is actually provided in a lottery event such as gacha.

When the mission is accomplished, the reward control unit 108 may set the reward with an available period to be acquired or to be acquirable (assuming that a mission defining such a specification is identified and registered in the mission information as in the case described above).

1.4.6 Option Status Detection Processing

Next, the option status detection processing according to the first embodiment will be described.

Basic Principle of Option Status Detection Processing

For changing the specification of the set advantage option and the specification of the to-be-set advantage option for each option set player (that is, for executing the specification change processing), the status detection unit 106 executes, at a predetermined timing, the option status detection processing of detecting the option status in the option element of the advantage option set for the option set player.

Specifically, the status detection unit 106 determines the advantage of the option element under the option status relative to a reference set in advance, and based on the determination, uses the reference to detect the option status of the option element of the advantage option set for the option set player to change the specification of the advantage option to a specification advantageous to the option set player.

Specifically, in the first embodiment, a configuration is adopted where the predetermined reference is used for detecting the option status, so that the advantage option is used advantageously when the advantage option is more advantageous than the reference.

In this case, in addition to the specification change processing executed by the option management unit 105, an incentive regarding the advantage option is set to be higher for a player using the advantage option more effectively, so that a motivation of each player to actively obtain the advantage option can be increased.

Specifically, for each option set player, the status detection unit 106 detects, as the option status, a status of an option element such as:

(A1) an element related to the advantage option itself such as a valid period;

(A2) a mission or a mission accomplishment condition defined for the advantage option;

(A3) a reward defined for the advantage option;

(A4) billing related to the advantage option;

(A5) another player related to each option set player;

(A6) a history of (A1) to (A4).

Furthermore, for a numerical element among such option elements, the status detection unit 106 may detect as the option status, a result of comparison between the element and a given reference value.

The given reference according to the first embodiment may be one or more reference that can be compared with the option status.

Specific Example 1 of Option Status Detection Processing: Advantage Option Setting Status The status detection unit 106 may use a timing determined based on the valid period set for the advantage option to detect as the option status, an advantage option setting status in a case where the advantage option is set by a detection target option set player.

Specifically, the status detection unit 106 may detect, as the option status, a timing at which the advantage option is set for an option set player that is a target of the detection (hereinafter, referred to as "detection target option set player").

Specifically, in this case, the status detection unit 106 may detect, as the option status, a result of comparison between the timing at which the advantage option for the option set player that is a target of the detection (hereinafter, referred to as "detection target option set player") is set and a timing determined based on the predetermined valid period set for the option set player (hereinafter, referred to as "reference timing").

For example, a case is assumed where the set status of the advantage option of the detection target option set player is detected as the option status based on the reference timing and a timing at which the advantage option is set.

In this case, the status detection unit 106 detects, as the option status, the length of a period (the length of time) between the timing at which the advantage option is set and the reference timing.

Here, the option status of the detection target option set player is determined to be advantageous in the specification change processing when the timing at which the advantage option is set earlier than the reference timing, and the length of the period is long. However, this should not be construed in a limiting sense.

For example, in the specification change processing, a timing closer to the end timing of the valid period may result in the option status of the detection target option set player being determined to be more advantageous.

Furthermore, the status detection unit 106 may detect the option status, also when the advantage option is set before the valid period.

In this case, in the specification change processing, a timing earlier than the valid period results in the option status of the detection target option set player being determined to be more advantageous.

Specific Example 2 of Option Status Detection Processing: Mission Information Progress Status The status detection unit 106 may detect the progress status of the detection target option set player regarding the mission information as the option status.

That is, the status detection unit 106 may detect, for each option set player, a progress status of the mission defined in the mission information of the advantage option set in the option set player, as an option status for the advantage option.

Specifically, the status detection unit 106 may detect as the option status, an option element indicating the progress status of mission information such as
(B1) the number or types of rewards acquired by a detection target option set player while the advantage option is set,
(B2) the number and type of missions to be accomplished,
(B3) a level of a mission accomplished,
(B4) a condition or an element lacking for accomplishing a mission, or
(B5) an element (the number of times the last mission is accomplished (hereinafter, referred to as "the number or loops" in a case where missions defined in the mission information can be repeatedly challenged from the first one to the last one, or a frequency (the number of loops within a predetermined period such as a day for example) of such accomplishment) detected by mission switching processing of switching to the first mission defined in the mission information of the advantage option as a result of accomplishment of all the missions defined in the mission information of the advantage option.

Specifically, in this case, when among such option elements, an option element (hereinafter, referred to as "mission progress value") indicating a progress of a mission that can be expressed using a numerical value such as the number of rewards, a reward with a numerical property such as rarity, the number of missions accomplished, a mission with a numerical property such as a level of the mission accomplished or the number or frequency of loops of missions, the status detection unit 106 makes a comparison among the mission progress value, a predetermined reference for the progress of the mission, and the actual mission progress value such as the number of rewards that have been acquired by the detection target option set player so far, and detect the result of the comparison as the option status.

Note that in this case, in the first embodiment, in a case where the mission progress value is greater than the reference value, the specification change processing determines that the setting timing for the advantage option is more advantageous.

For an option element that cannot be expressed using numerical values, the status detection unit 106 detects, as the option status, obvious elements such as the type of the reward, the type of the mission accomplished, or the condition or the element that is lacking for accomplishing the mission.

Specific Example 3 of Option Status Detection Processing: Status Based on Temporal Element of Mission.

The status detection unit 106 may detect, as the option status, a temporal element related to the mission defined by the mission information for the detection target option set player.

Specifically, the status detection unit 106 may detect, as the option status, a temporal element in the mission information such as
(C1) the time required for accomplishing each mission and obtaining the reward,
(C2) the time required for accomplishing all the missions defined by the mission information, or obtaining all the rewards (hereinafter, also referred to as "mission completion time" or "reward acquisition completion time") or
(C3) a length of time between the timing at which all the missions are accomplished or all the rewards are obtained and the end timing of the valid period.

Specifically, in such a case, the status detection unit 106 may detect, as the option status, a result of comparing the temporal element in the mission information of the detection target option set player and a predetermined reference value of the same temporal element.

For example, in this case, the status detection unit 106 compares the mission completion time by the detection target option set player with the reference value, and detects, as the option status, whether the mission completion time is longer or shorter than the reference value, or how much longer or shorter the mission completion time is than the reference value.

In this case, in the first embodiment, the option status of the detection target option set player is preferably determined to be more advantageous in the specification change processing, when a difference between the mission completion time and the reference value is larger with the mission completion time being shorter than the reference value.

Specific Example 4 of Option Status Detection Processing: Advantage Option Setting Status The status detection unit 106 may detect as the option status, the status of the contribution, in the game, of the option element related to the advantage option of the detection target option set player.

Specifically, the status detection unit 106 may detect as the option status, the status of the contribution of the advantage option indicating the number of times the reward obtained by the detection target option set player is used or consumed or the usage frequency, usage time, or the consumption time of the reward with the advantage option set, the record (game result such as win-loss record, and points obtained) of the player with the advantage option set, or the level of contribution of the advantage option, obtained so far, in the game (that is, the contribution level) including the level and the win-loss record improved after the advantage option has been set.

Specifically, in this case, when the status of the contribution of the advantage option can be expressed with a numerical value indicating the contribution level, the status detection unit 106 may compare the status with a predetermined reference value, and detect the result of the comparison (specifically, the contribution level) as the option status.

In this case, the status detection unit 106 may detect as the contribution level, a numerical value related to the use of the reward obtained by the detection target option set player by accomplishing the mission.

Specifically, in this case, the status detection unit 106 may detect as the option status, the contribution level indicating the contribution of the option element in the game, and may detect a numerical value related to the use of the reward obtained by accomplishing a mission for example.

For example, the status detection unit 106 detects the contribution level as a value indicating the contribution to the option set player playing the game, such as (D1) the number of times of usage, usage frequency, or usage time of the reward obtained with the advantage option set, or (D2) the record (a game record such as a win-loss record and points obtained after the advantage option has been set) changed as a result of setting the advantage option, or the level and win-loss record improved after the advantage option has been set.

In this case, in the first embodiment, the option status of the detection target option set player is preferably determined to be more advantageous in the specification change processing, with a higher contribution level or with a larger difference between the contribution and a reference value smaller than the contribution.

Specific Example 5 of Option Status Detection Processing: Advantage Option Reset Status The status detection unit 106 may detect as the option status, a status (hereinafter, referred to as "reset status") of an option element related to the advantage option of the detection target option set player returning (hereinafter, referred to as "reset") to the initial state (that is, the state at the time of setting ben the advantage option has been set) defined in the game.

Specifically, the status detection unit 106 may detect as the option status, the reset status of the advantage option such as the number of times (hereinafter, referred to as "reset count") the advantageous option set for the detection target option set player has been reset, or the frequency of reset (hereinafter, referred to as "reset frequency") indicating the reset count within a predetermined period.

Specifically, when the option set player shows an intention to forcibly transition to the mission set as the mission executed first in the mission information and the mission switching processing of switching to the mission accomplishment condition defined in the mission information as the first mission to be executed is executed by the option management unit 105, the status detection unit 106 detects the number of executed times of the switching processing.

The status detection unit 106 detects as the reset count or the reset frequency, the number of execution times of the switching processing, or the number of such times within a predetermined period.

In such a case, the status detection unit 106 may detect, as the option status, a result of comparing the reset status in the mission information of the detection target option set player with a predetermined reference value of the same reset status.

For example, in such a case, the status detection unit 106 compares the reset count of the detection target option set player with a reference value, and detects as the option status, whether the reset count is larger or smaller than the reference value.

In this case, in the first embodiment, the option status of the detection target option set player is preferably determined to be more advantageous in the specification change processing, when a difference between the reset count and the reset frequency and the reference value is larger with the reset count and the reset frequency being smaller than the reference value.

Specific Example 6 of Option Status Detection Processing: Billing Status of Option Set Player The status detection unit 106 may detect as the option status, a status related to billing of the detection target option set player.

Specifically, the status detection unit 106 may detect as the option status, a status (hereinafter, referred to as "billing related status") of billing amount, the billing count, or the number of times the advantage option is changed based on the billing (when there are a plurality of advantage options) while the advantage option is set or during the entire or certain period of the game.

Specifically, in this case, the status detection unit 106 may compare the billing related status of the detection target option set player while the advantage option is set or during the entire or certain period of the game with a reference value of the same predetermined billing element, and detect the result of the comparison as the option status.

In this case, in the first embodiment, the option status of the detection target option set player is preferably determined to be more advantageous in the specification change processing, when a difference between the billing amount or the billing count and the reference value is larger with the billing amount and the billing count being larger than the reference value.

1.4.7 Specification Change Processing

Figure 7:
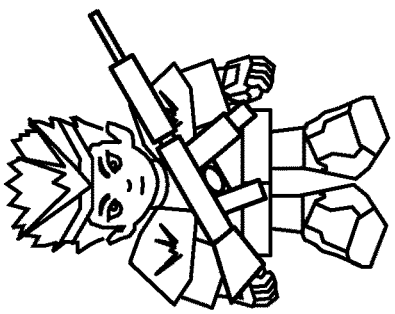
FIG. 7 is a diagram illustrating specification change processing executed by an option management unit according to the first embodiment.
Figure 8:
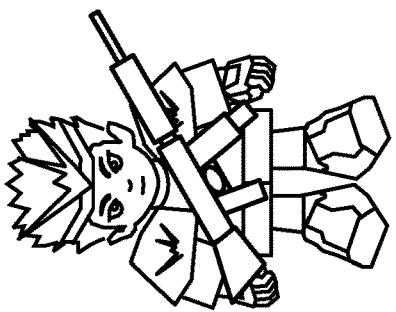
FIG. 8 is a diagram illustrating specification change processing executed by the option management unit according to the first embodiment.

Next, specification change processing according to the first embodiment will be described with reference to FIG. 7 and FIG. 8. FIG. 7 and FIG. 8 are diagrams illustrating the specification change processing according to the first embodiment.

The option management unit 105 executes specification change processing of changing the specification of the set advantage option which is the advantage option that has already been set for the option set player, based on the detection result of the option status detection processing.

Specifically, the option management unit 105 has control information for changing the specification of the advantage option in accordance with the content of each of various option statuses, and changes each specification of the advantage option information stored in the option information storage 148.

The option management unit 105 executed the specification change processing including:

(A1) adding or reducing the reward, or changing the content of the reward (including changing the acquisition order);

(A2) adding or reducing the mission accomplishment condition for one mission, or changing the type or the executed order of the missions;
(A3) changing the degree of difficulty of the mission (that is, the degree of difficulty of the mission accomplishment condition);
(A4) changing the mission accomplishment condition itself; or
(A5) changing (extending or shortening) the valid period.

Specifically, the option management unit 105 executes the specification change processing of determining, based on an option status detected, the advantage in the game under the option status, and changing the specification of the advantage option to the specification advantageous for the option set player based on the determination.

When the option status detection processing is executed using the reference and when the reference is satisfied, the option management unit 105 executes the specification change processing described above to give advantage to the option set player, upon determining that the option status is advantageous in the game.

When the option status detection processing is executed using the reference and when whether the option status is advantageous in the game is determined in an incremental manner based on the reference, the option management unit 105 executes the specification change processing described above to give more advantage to the option set player as the advantageousness increases.

For example, a case is assumed where when the reference of the option status which is three or more missions being accomplished using the player character is satisfied, the degree of difficulty of the mission is changed with the valid period extended by a day.

In this case, when the status detection unit 106 detects option information indicating that two missions have been accomplished by the option set player, the option management unit 105 executes specification change processing of extending the valid period of the advantage option from seven days to eight days as illustrated in FIG. 7.

For example, a case is assumed where when the reference of the option status that is three or more missions accomplished using the player character and each time two missions are additionally accomplished is satisfied, the degree of difficulty of the mission is changed with the valid period extended by a day.

In this case, when the status detection unit 106 detects option information indicating that three missions have been accomplished by the option set player, the option management unit 105 extends the valid period of the advantage option from seven days to eight days as illustrated in FIG. 7, as in the case described above.

Then, when the status detection unit 106 detects option information indicating that two more missions (five in total) have been accomplished by the option set player, the option management unit 105 extends the valid period of the advantage option from eight days to nine days as illustrated in FIG. 7.

FIG. 7 illustrates an option status in a case where the player character A has accomplished two missions and then accomplished two more mission thereafter, and the specification change is implemented to change the valid period of the advantage option information.

When the status detection unit 106 detects the contribution level indicating the option element in the game as the option status, the option management unit 105 may execute the specification change processing of changing the specification of the set advantage option based on the contribution level of the option element.

Specifically, when the status detection unit 106 detects a numerical value related to the use of the reward obtained by accomplishing the mission, as the contribution level, the option management unit 105 may execute the specification change processing of changing the specification related to the reward of the set advantage option set for the option set player.

For example, a case is assumed where the reference of the option status which is using the reward obtained from the mission five times is satisfied, the number of rewards to be obtained thereafter is doubled.

In this case, when the status detection unit 106 detects as the option status that the reward (protector 1) obtained by the option set player from the mission is used five times while the third mission is being challenged, the option management unit 105 executes the specification change processing of changing the reward of the mission being challenged from 30 coins to 60 coins as illustrated in FIG. 8.

In the above case, when the status detection unit 106 detects as the option status that the reward (protector 1) obtained by the option set player from the mission is used five times and then detects that the reward (protector 1) has been further used five times while the third mission is being challenged, the option management unit 105 executes the specification change processing of changing the reward of the mission being challenged from 30 coins to 60 coins and of further changing the reward from 60 coins to 120 coins as illustrated in FIG. 8.

FIG. 8 illustrates the option status in a case where the player character A has used the protector 1 five times and then has further used five times thereafter, and the specification change is implemented to change the reward of the third mission being challenged.

When changing the degree of difficulty to change the specification of the set advantage option, the option management unit 105 may execute the specification change processing of changing the valid period as described above, as well as changing the number of mission accomplishment conditions, easing the requirement of the mission accomplishment condition, changing the mission to one the corresponding player is good at, or when there is an unaccomplished mission before the valid period, lowering the degree of difficulty of the mission accomplishment condition of the unaccomplished mission.

When the degree of difficulty of the mission accomplishment condition is changed, the option management unit 105 may change the content of the reward associated with the mission accomplishment condition in accordance with the degree of difficulty changed.

Specifically, for example, the option management unit 105 may change the reward to one more advantageous to the corresponding player, as a higher degree of difficulty increases as a result of the change.

In the first embodiment, for example, the mission the player is good or bad at is assumed to be identified in advance based on the accomplishment time of the mission of the same type in the past, based on the accomplishment time and accomplishment times of other players, based on an accomplishment rate of each type of mission, or based on the number of missions of the type that have been accomplished so far.

In the first embodiment, where there is an advantage regarding the mission accomplishment status, or when the advantage increases, the degree of difficulty of the mission is reduced. Alternatively, where there is an advantage regarding the mission accomplishment status, or when the advantage increases, the degree of difficulty of the mission is increased.

In addition to/instead of the specification change processing described above, the option management unit 105 may execute the specification change processing of changing the specification of the to-be-set advantage option indicating the advantage option to be set for the option set player in the future after the valid period has ended, based on the detection result of the option status detection processing.

In this case, for example, the option management unit 105 may execute, for the advantage option to be obtained in the future (next or one after the next), the specification change processing of changing whether the advantage option involves billing or changing the billing amount, changing (increasing or reducing) the number of advantage options selectable when a plurality of advantage options are presented at the time of setting the previous advantage option, and changing the element that is the same as that in the specification change processing for the set advantage option.

1.4.8 Information Provision Processing Related to Display Control

Next, information provision processing related to display control according to the first embodiment will be described.

The information provision unit 110 provides to the corresponding terminal device 20 during the game, various types of game information related to control and display for the game, as well as information related to a reward such as advantage option information, mission information, or reward information set for each player, at a given timing (when the game starts, during the game, or when the game ends) as display control information displaying the information on an image related to the game being executed by the terminal device 20.

Specifically, the information provision unit 110 provides to the terminal device 20, the information related to the obtainable advantage option, set advantage option, and set mission or the information related to the reward acquirable from the mission, as the display control information, at a given timing including:

(A1) a timing when the advantage option is started to be provided;
(A2) a timing when the advantage option is set;
(A3) a timing when a new mission is set;
(A4) a timing when the reward is obtained; and
(A5) a timing when the reward is changed.

The information provision unit 110 provides to the corresponding terminal device 20, the game information as a display related to the mission, which is information including, for example:

(B1) the content of the mission (the type of the mission, the type and the number of enemy characters to be defeated, or a description on a stage and a specific item obtained);
(B2) the fact that the mission is set and the content of the reward obtained when the mission is accomplished;
(B3) mission accomplishment condition;
(B4) reward changed by the reward change processing; and
(B5) a condition for changing the reward (condition to be satisfied as the option status).

For the option set player for which the advantage option is set, the information provision unit 110 may generate the display control information for displaying a list of rewards that have been acquired and rewards to be acquirable, and provide the display control information thus generated to the corresponding terminal device 20.

In this case, the information provision unit 110 may generate display control information for displaying an item name and an image of each reward, when the list of rewards that have been obtained and rewards to be obtained is displayed.

When the mission accomplishment status is displayed, the information provision unit 110 may generate display control information for displaying information indicating that each mission is unaccomplished or accomplished for each option set player or player or character that is the operation target of the option set player, and provide the display control information thus generated to the corresponding terminal device 20.

The information provision unit 110 may generate display control information for displaying various option statuses detected in the option status detection processing described above, the information related to the option element, or the information about the specification of the set advantage option changed by the specification change processing described above, and provide the display control information thus generated to the corresponding terminal device 20.

1.4.9 Modification 1.4.9.1 First Modification

Next, a first modification of the option status detection processing according to the first embodiment will be described (change status of the specification change processing).

The status detection unit 106 may detect as the option status, a change status of the specification change processing of the set advantage option for the advantage option of the detection target option set player or the option element (such as mission or reward) related to the advantage option.

Specifically, when the specification change processing for the set advantage option is executed, the status detection unit 106 may detect as the option status, a change status of the advantage option such as the number of changes made in the specification change processing (hereinafter, referred to as "change count"), a change count within a predetermined period (hereinafter, referred to as "change frequency"), or the number of specifications changed.

Specifically, in this case, the status detection unit 106 detects as the option status, which specification of the advantage option of a predetermined reference or mission has changed, how many times the specification of the advantage option has been changed, how much change has been made on the specification of the advantage option, or billing count, billing amount, or the like related to the change.

In this case, the status detection unit 106 may compare the change count and the change frequency of the advantage option with a predetermined reference value of the same option element, and detect a result of the comparison as the option status.

For example, in such a case, the status detection unit 106 compares the change count in the specification change processing for the detection target option set player with a reference value, and detects as the option status, whether the change count is larger or smaller than the reference value.

In this case, in the first embodiment, the option status of the detection target option set player is preferably determined to be more advantageous, when a difference between the change count and the change frequency and the reference value is larger with the change count and the change frequency being larger than the reference value.

1.4.9.2 Second Modification

Next, a second modification (option status of a player in a certain relationship with the option set player) of the option status detection processing according to the first embodiment will be described.

The status detection unit 106 may detect as the option status, the status of the option element related to the advantage option of another player in a certain relationship with the detection target option set player such as a player who is a friend or in the same team.

Specifically, as the option status detection processing, the status detection unit 106 may detect, (A1) an advantage option setting status at the time when the advantage option is set,
(A2) mission progress status,
(A3) a status based on temporal element of the mission,
(A4) a contribution status indicating the contribution level of the advantage option in the game,
(A5) a reset status of set advantage option set for the player for which the advantage option is set, or
(A6) a billing status of another player in a certain relationship.

The other player is preferably a player in a certain relationship with the option set player, such as a player who is in the same team as described above, a player who played together, a friend, or a follower. However, this should not be construed in a limiting sense, and the other player may be a player who gave the advantage option to the option set player as a present, a player who received the advantage option from the option set player as a present, a player who executed to the game together, all players, or one or more players having a certain attribute for example.

For example, the player having a certain attribute includes a player with the same player level as the option set player, a player ranked high in a score ranking, and a player in the same region (including actual space and virtual space) or using the same player character.

When using option elements of a plurality of other players in the option status detection processing, the status detection unit 106 preferably uses a statistical value such as an average value.

1.4.9.3 Third Modification

Next, a third modification (option status of each attribute of option element) of the option status detection processing according to the first embodiment will be described.

As the option status detection processing, the status detection unit 106 may detect the option status of a given option element for each attribute of the option element.

In this case, as the specification change processing, the option management unit 105 may execute specification change processing of changing the specification of the set advantage option based on the option status of each attribute.

Specifically, when there are a plurality of advantage options, the status detection unit 106 may detect as the option status of each attribute such as the type (category) of the advantage option itself, the type of the mission (such as a mission based on the game action, a mission as a result of a game action, a type of the game action series, or the like), the type of the reward, and the rarity of the reward, (A1) an advantage option setting status at the time when the advantage option is set.
(A2) mission progress status,
(A3) a status based on a temporal element of the mission,
(A4) a contribution status indicating the contribution level of the advantage option in the game,
(A5) a reset status of a set advantage option set for the player for which the advantage option is set, or
(A6) a billing status of the option set player.

As the specification change processing, the option management unit 105 may change a specification unrelated to the attribute involved in the option status detection, or change the specification related to the attribute for example.

For example, when the status detection unit 106 detects the progress status of a certain type of mission as the option status as the specification change processing, the specification of the reward that can be acquired in the future may be changed regardless of the attribute of the option status detected, or the specification of the reward of the mission of the certain type may be changed as the specification related to the attribute of the option status detected, by the option management unit 105.

1.4.9.4 Fourth Modification

Next, a fourth modification (option status of option element of advantage option in the past) of the option status detection processing according to the first embodiment will be described.

As the option status detection processing, the status detection unit 106 may detect as the option status, a given status of the option element of the advantage option with the valid period already ended that has been acquired by the option set player in the past.

In this case, for the past advantage option, the status detection unit 106 may detect as the option status, the number of advantage options, the number of advantage options that have been consecutively set in the past, or the like, in addition to or instead of (A1) an advantage option setting status at the time when the advantage option is set,
(A2) a mission progress status,
(A3) a status based on a temporal element of the mission,
(A4) a contribution status indicating the contribution level of the advantage option in the game,
(A5) a reset status of set advantage option set for the player for which the advantage option is set, or
(A6) a billing status of the option set player.

The status detection unit 106 may use the option element of a certain advantage option in the past such as the advantage option set immediately before or initially set, or may use the option element in a plurality of past advantage options (including a case where the advantage options are continuously set or intermittently set).

In this case, the status detection unit 106 uses history information about the advantage option set in the past, stored in the advantage option information.

1.4.9.5 Fifth Embodiment

Next, a modification of the specification change processing according to the first embodiment (specification change processing of changing the specification of an advantage option to be acquired in the future).

When an advantage option is set in the future in addition to or instead of the advantage option currently set for the option set player, the option management unit 105 may execute the specification change processing of changing the specification of such an advantage option (that is, the to-be-set advantage option).

In this case, the option management unit 105 executes the specification change processing including:

(B1) changing whether the billing is involved or the billing amount; or
(B2) changing the specification such as changing (increasing or reducing) the number of selectable advantage options, in addition to or instead of (A1) adding or reducing the reward, or changing the content of the reward (including changing the acquisition order);
(A2) adding or reducing the mission accomplishment condition for one mission, or changing the type or the executed order of the mission;

(A3) changing the degree of difficulty of the mission (that is, the degree of difficulty of the mission accomplishment condition);
(A4) changing the mission accomplishment condition itself; or
(A5) changing (extending or shortening) the valid period.

1.5 Operation According to First Embodiment

Next, operations related to the game processing during the advantage option setting, including the option status detection processing and the specification change processing executed by the server 10 will be described with reference to FIG. 9 and FIG. 10.

Figure 9:
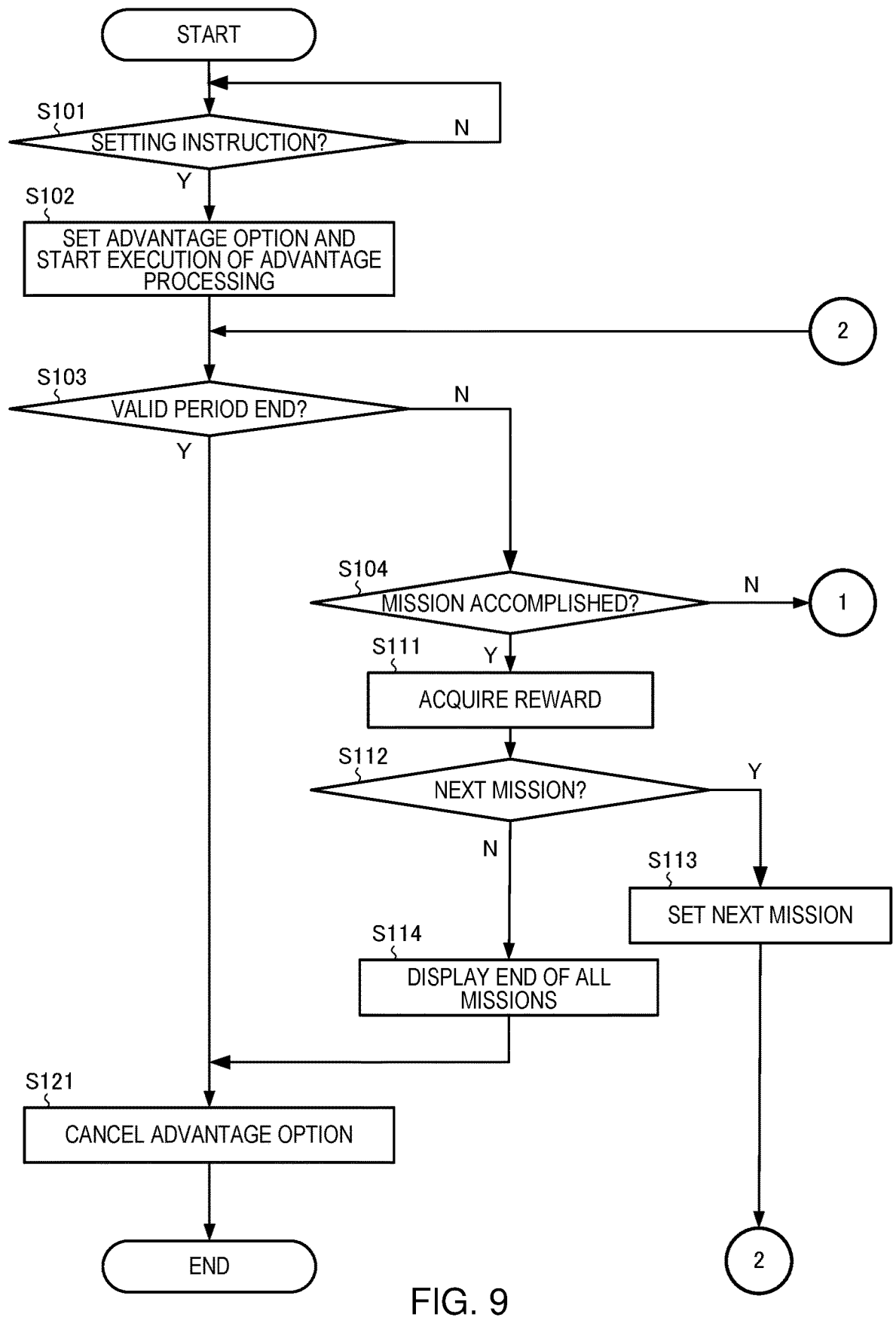
FIG. 9 is a flowchart illustrating operations related to game processing executed with an advantage option set, by the server according to the first embodiment, including option status detection processing and specification change processing.
Figure 10:
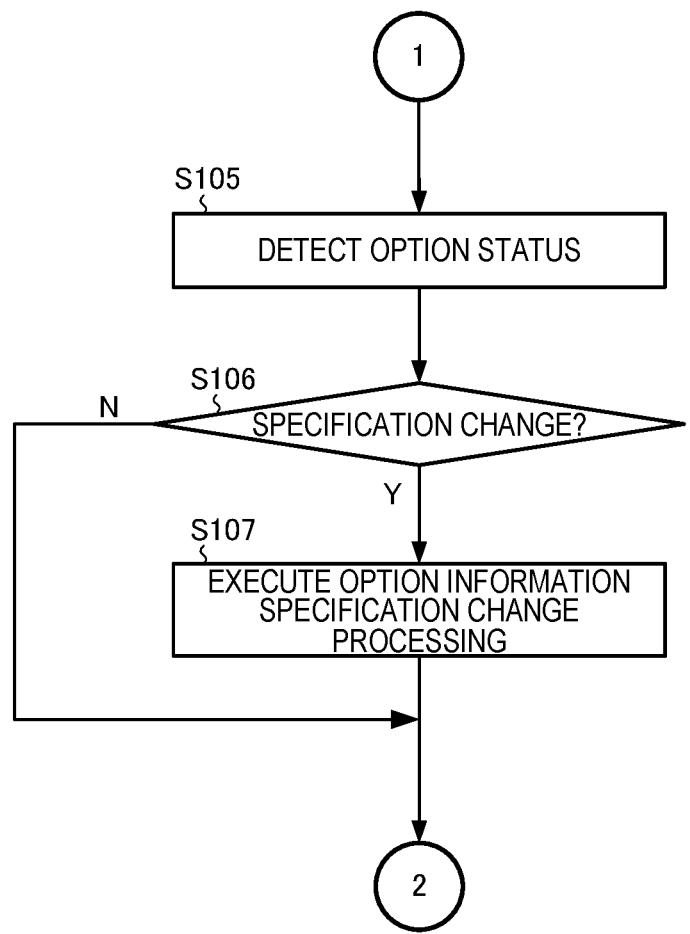
FIG. 10 is a flowchart illustrating operations related to game processing executed with an advantage option set, by the server according to the first embodiment, including option status detection processing and specification change processing.

FIG. 9 and FIG. 10 are flowcharts illustrating operations related to game processing executed with the advantage option set, by the server 10, including option status detection processing and specification change processing.

The operations are operations in a case where the advantage option is set including the option status detection processing and the specification change processing, and related to setting of a mission and automatic acquisition of the reward in response to the accomplishment of the mission.

The operations are executed for each player, and are executed in particular for the option set player for which the advantage option is set.

The operations assume that the player has already registered and logged in to the game, and that the valid period of the advantage option has started.

Specifically, the operations assume that for the advantage option, a plurality of missions with different levels are defined in an incremental manner meaning that missions are cleared one by one in an ascending order of the level, and each time a mission is cleared, the reward corresponding to a mission is automatically acquired and the next mission is set.

In the operations, the option status detected to be used in the specification change processing is assumed to be the number of rewards acquired.

First, when the communication control unit 101 receives a setting instruction for the advantage option from the player transmitted from the terminal device 20 (step S101), the option management unit 105 executes the advantage option setting processing of setting an advantage option to a corresponding player based on the instruction from the player, and initiates execution of processing (hereinafter, referred to as "advantage processing") related to an advantage corresponding to the advantage option (step S102).

In this process, the mission management unit 107 sets the first mission defined in the advantage option to the corresponding player and sets the reward corresponding to the mission and set to be acquirable when the mission is accomplished, based on the mission information and the reward information.

Then, the game management unit 103 determines whether the end timing of the valid period of the advantage option has arrived (step S103), and when it is determined that the end timing of the valid period has arrived, cancels the advantage option of the corresponding player (step S121) and terminates the operations.

The game management unit 103 cancels the advantage option of the corresponding player, by deleting the player ID of the corresponding player from the advantage option information.

The game management unit 103 may set the valid period of the advantage option for each option set player, but basically sets the unified valid period for all the players.

Thus, the game management unit 103 cancels the advantage option of all the option set players in the processing in step S121.

On the other hand, when the game management unit 103 determines that the end timing of the valid period has not arrived yet, the mission management unit 107 determines whether the mission accomplishment condition of the set mission is satisfied (step S104).

In this process, when the mission management unit 107 determines that the mission accomplishment condition of the set mission is satisfied, the processing proceeds to step S111. When the mission accomplishment condition is determined to be not satisfied, the processing proceeds to step S105.

Next, when the mission management unit 107 determines that the set mission accomplishment condition is not satisfied, the status detection unit 106 detects the number of predetermined option statuses (the number of rewards) (step S105).

Next, the option management unit 105 determines whether to change the specification of the currently set advantage option (which reduces the degree of difficulty, such as extending the valid period) depending on the option status detected, based on the reward change information (step S106).

In this process, upon determining that the specification of the currently set advantage option is to be changed, the option management unit 105 changes the specification of the corresponding advantage option (step S107), and the processing proceeds to step S103. When the specification of the currently set advantage option is determined not to be changed, the processing directly proceeds to step S103.

On the other hand, when the mission management unit 107 determines that the mission accomplishment condition of the currently set option is satisfied, the reward control unit 108 sets the set reward to be acquirable by the corresponding option set player (step S111).

The mission management unit 107 determines whether there is a mission to be set next (step S112). When it is determined that there is the mission to be set next, the corresponding mission is set for the option set player (step S113), and the processing proceeds to step S103.

Upon determining that there is no mission to be set next, the mission management unit 107 notifies the terminal device 20 of the player of the accomplishment of all the missions (step S114), cancels the advantage option of the corresponding player (step S121), and terminates the operations.

1.6 Others

The invention is not limited to the embodiment described above, and various modifications can be made. For example, any term cited with a different term having a broader meaning or the same meaning in the specification and the drawings may be replaced by the different term in any place in the specification and the drawings.

The terminal devices 20 may be provided with each game by a single server 10 or a plurality of servers 10 may operate in conjunction with one another to construct a server system to provide the terminal devices 20 with each game.

In the first embodiment, the game provided by the server 10 is executed by the terminal device 20. Alternatively, an operation input may be omitted, and the functions of the processing unit 200 and execution of the game program by the terminal device 20 described above may be executed by the server 10, and the terminal device 20 may implement the game described above by executing image display through an operation input and streaming.

Furthermore, the first embodiment may be implemented by a single game device having the functions of the server 10, that is, a (standalone) device that operates independently without depending on other devices such as the server. In this case, a plurality of input terminal devices may be provided.

Such a plurality of game terminal devices may be connected to each other in a wired or wireless manner, and one game device may function as the server 10, and a plurality of game devices may implement the game.

In the first embodiment, the game system according to the invention is applied to the server 10 that executes the game while cooperating with the terminal device 20 via the network. Alternatively, the invention can be applied to a tablet type information terminal device, a personal computer, or a game device installed in an amusement park.

The invention includes substantially identical configurations (for example, configurations having identical functions, methods, and results, or configurations having identical objects and advantageous effects) as in the configuration described in the first embodiment. Further, the invention includes configurations in which non-essential portions of the configurations described in the first embodiment are replaced. Further, the invention also includes configurations that achieve identical advantageous effects and configurations capable of achieving identical objects as in the configurations described in the first embodiment. Further, the invention includes configurations in which a publicly known technology is added to the configurations described in the first embodiment.

The first embodiment of the invention has been described in detail above, but those skilled in the art will readily appreciate that various modifications can be made from the embodiment without materially departing from the novel teachings and effects of the invention. Accordingly, all such modifications are assumed to be included in the scope of the invention.

2. Second Embodiment

Next, a game system according to a second embodiment of the invention will be described with reference to FIGS. 10 to 18.

2.1 Game System

The game system 1 according to the second embodiment has the same configuration as that in the first embodiment illustrated in FIG. 1, and thus the common members are denoted with the same reference numerals, and the description thereof will be omitted.

2.2 Server

The server 10 according to the second embodiment illustrated in FIG. 2 is different from that in the first embodiment only in functions of some of the members, meaning that the other members and their functions are the same between the embodiments. Thus, the same members or the members with the same functions (including members having the same functions as well as other functions) are denoted with the same reference numerals and the description thereof will be omitted. The functions different from those in the first embodiment will be described below.

The option management unit 105 manages each option information stored in the advantage option information storage 148 and manages a player having the advantage option set, as in the first embodiment.

Meanwhile, the option management unit 105 executes option selection setting processing of selecting an advantage option to be set for the player from a plurality of advantage options, and setting the advantage option for the player.

The option management unit 105 switches from the currently set advantage option (hereinafter, referred to as, "selected advantage option") to another advantage option, and newly sets a new advantage option (hereinafter, referred to as "new advantage option") in accordance with the accomplishment status of the mission accomplishment condition and the reward acquisition status of each option set player, for each player (hereinafter, also referred to as "option set player") to which the advantage option is set.

The status detection unit 106 executes, for each option set player for which the advantage option has been selected and the mission information has been set, status determination processing of determining whether a given status determination condition is satisfied by the accomplishment status of the mission accomplishment condition defined in the mission information or the reward acquisition status defined in the mission information, and determining a condition for switching the advantage option to another advantage option.

For each option set player for which the advantage option is set, the mission management unit 107 manages the accomplishment status of each mission accomplishment condition and the acquisition status of each reward, of the option set player or the option player's player character as the operation target of the option set player.

2.3 Terminal Device

The terminal device 20 according to the second embodiment has the same configuration as that in the first embodiment illustrated in FIG. 3, and thus the common members are denoted with the same reference numerals, and the description thereof will be omitted.

2.4 Method According Second Embodiment

2.4.1 Overview

Figure 12:
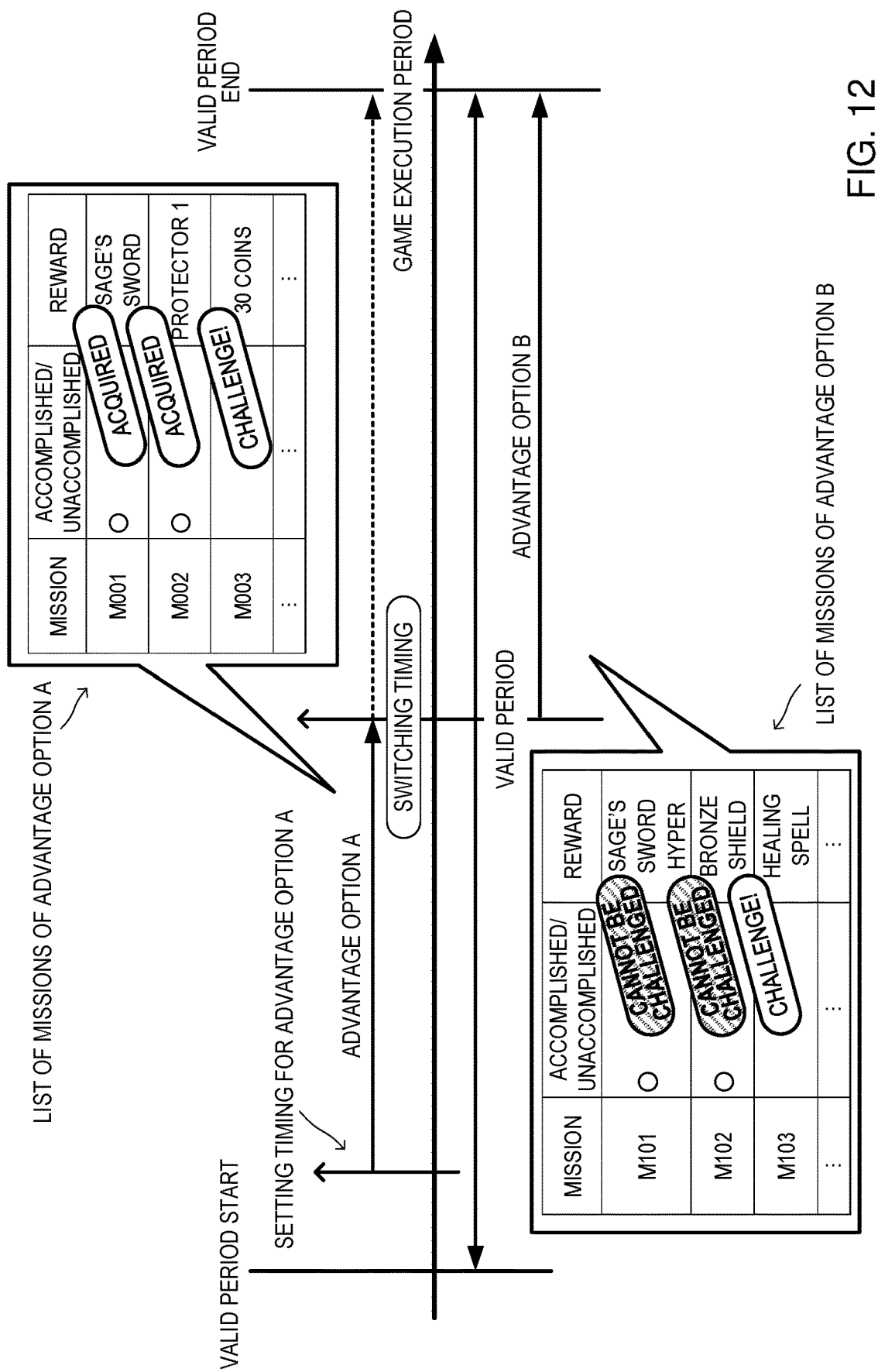
FIG. 12 is a diagram illustrating game processing involved in the advantage option setting including the option selection setting processing and the reward control processing according to the second embodiment.

Next, an overview of a method according to the second embodiment (game processing involved in the advantage option setting including the option selection setting processing and the reward control processing) with reference to FIG. 1I and FIG. 12.

Figure 11:
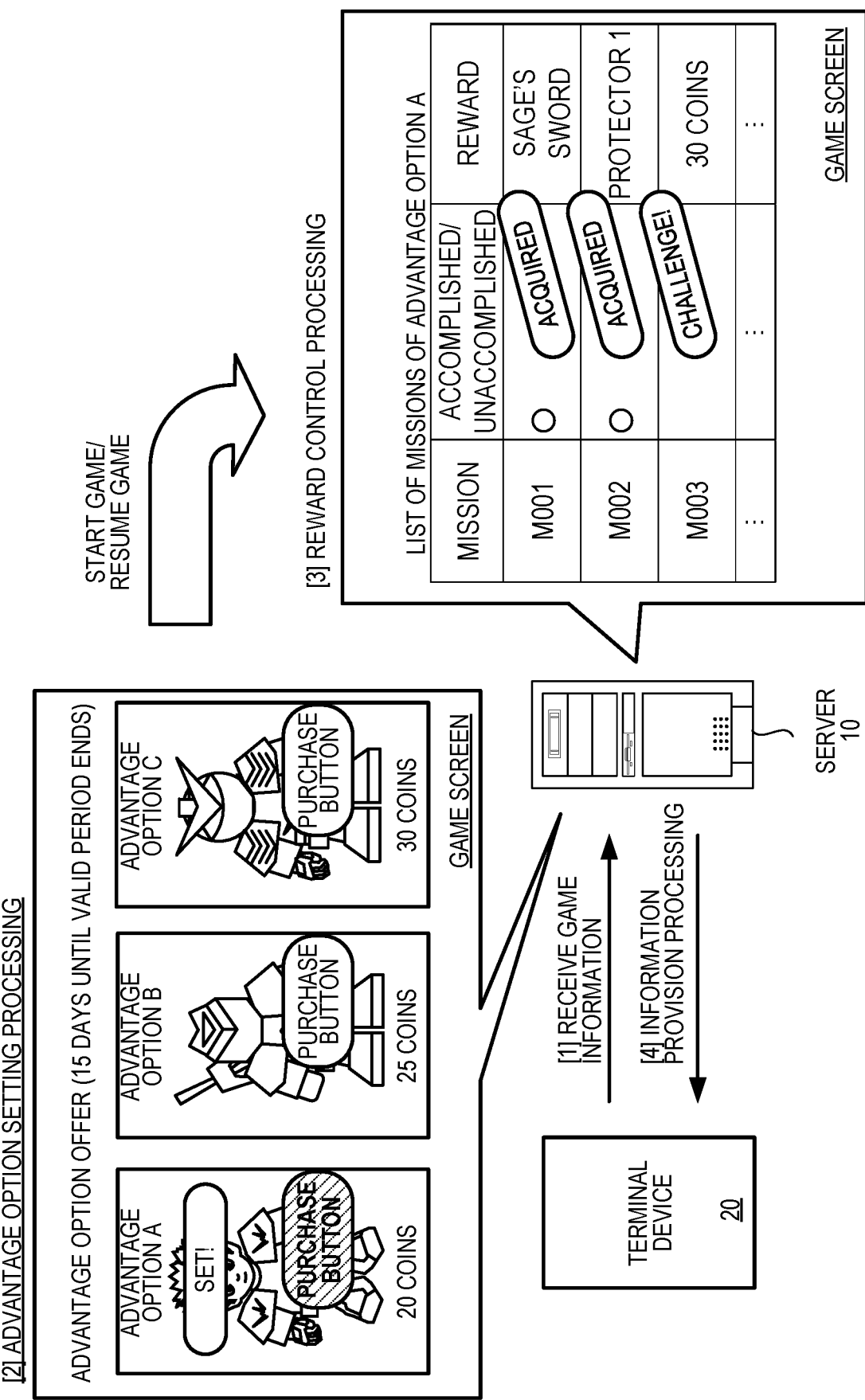
FIG. 11 is a diagram illustrating game processing involved in the advantage option setting including the option selection setting processing and the reward control processing according to the second embodiment.

FIG. 11 and FIG. 12 are diagrams illustrating game processing involved in the advantage option setting including the option selection setting processing and the reward control processing according to the second embodiment.

The server 10 according to the second embodiment is configured to cooperate with the terminal device 20 to execute a game such as a match-up game, examples of which include a combat game and fighting game, an RPG, or a simulation game, based on an operation performed by each player input using the terminal device 20, while providing the terminal device 20 with game information such as a player character and other characters, game space or a part thereof, game parameter, BGM, and game scenario for each player.

Specifically, the server 10 according to the second embodiment is configured to execute, while the game is executed, (A1) setting, when an advantage option associated with the player is selected from a plurality of advantage options based on a given selection instruction, mission information stored in association with the advantage option information about the advantage option thus selected, to the player, and (A2) setting, for each option set player for which the advantage option is set, a plurality of missions set in an incremental (tiered) manner, and when a given condition of each mission (hereinafter, referred to as "mission accomplishment condition") is determined to be satisfied within a predetermined valid period, setting the reward that is the content of the advantage associated with the mission to be at least acquirable (including giving the reward to the player unconditionally).

When a motivation to accomplish a mission set by the advantage option is low (such as a case where a mission difficult for the option set player is set or a case where a reward acquired when the mission is accomplished is an unwanted reward), the server 10 according to the second embodiment is configured to switch the advantage option that has been set for another advantage option and execute accomplishment of the mission and acquisition of the reward based on the mission information defined in the advantage option information of the switched advantage option.

Specifically, the server 10 configures a server system that performs game control for executing a given game for the terminal device 20 that is connected via a network and is controlled by the player.

The server 10 is configured to manage, for each type of advantage option indicating an option for giving an advantage in the game to the player, various types of data stored in association with the mission information defining a mission accomplishment condition indicating a condition of a mission to be accomplished within a given valid period by each player and a reward to be acquired by the player when each mission is accomplished.

Furthermore, as illustrated in FIG. 11, the server 10 is configured to execute reception processing ([1] in FIG. 11) of receiving game information such as an operation instruction from the player via the terminal device 20, and execute game processing of executing a game using a player character (that is, an option player's player character) that is an operation target of the player, based on the operation instruction from the player that has been received.

As illustrated in FIG. 11, the server 10 is configured to execute:

(B1) advantage option selection setting processing of setting, when an advantage option to be associated with the player is selected from the plurality of advantage options based on a given selection instruction, the mission information stored in association with the advantage option information about the advantage option thus selected for the player (FIG. 11);

(B2) (a) given game processing on the game executed by the player associated with the mission information set, or (b) reward control processing of setting the reward defined in the mission information to be acquired or acquirable by the player when a result of the game processing is determined to have satisfied the mission accomplishment condition defined in the mission information set, within a valid period (FIG. 11); and (B3) information provision processing of providing the game information about the game including the information about the reward (including the acquired reward) at least set to be acquirable, to the terminal device 20 (FIG. 11).

As illustrated in FIG. 12, the server 10 is configured to:
(C1) switch, as a timing of switching the advantage option (hereinafter, referred to as "switching timing"), to an advantage option (that is, a new advantage option) different from the advantage option (that is, selected advantage option) that has been set, when a given status determination condition is determined to be satisfied by the accomplishment status of the mission accomplishment condition defined in the mission information (hereinafter, referred to as "set mission information") or the reward acquisition status defined in the set mission information, for the option set player for which the mission information has been set;

(C2) execute advantage option selection setting processing of setting mission information (hereinafter, referred to as "new mission information") stored in association with the advantage option information about the switched new advantage option, to the option set player; and
(C3) execute reward control processing of setting the reward defined in the new mission information to be acquired or acquirable by the player, when the mission accomplishment condition of the new mission information set for the option set player is determined to be satisfied.

FIG. 11 illustrates a case where
(D1) an instruction from a player is received as game information,
(D2) an advantage option A, among advantage options A. B. and C offered to the player, is set, with a purchase button for the advantage option A pressed (specifically, setting each mission defined for the advantage option A to the player),
(D3) then a game is started or resumed and progresses based on the operation instruction from the option set player and the advantage option information, mission M001 and mission M002 are accomplished and a sage's sword and a protector 1 are obtained as rewards, and mission M003 is currently being challenged, and
(D4) game information including reward information indicating that the reward has been given is provided to the corresponding player as information providing processing.

FIG. 12 illustrates a case where
(E1) the advantage option A is first set after the valid period has started,
(E2) when the accomplishment status of the mission accomplishment condition or the reward acquisition status defined in the set mission information is determined to have satisfied the given status determination condition and when the advantage option switching timing arrives, the advantage option A that has been set is switched to the advantage option B. and
(E3) after the switching timing, the game progresses with the advantage option B until the valid period ends.

In particular, FIG. 12 illustrates a case where the first and the second missions M001 and M002 are accomplished while the advantage option A is set, and the switching timing arrives while the third mission M003 is being challenged, and for the advantage option B, the status of the mission with the advantage option A is inherited, so that the challenge can start from a third mission M103.

With this configuration, in the second embodiment, the mission to be accomplished by the player and the executed timing can be flexibly set within a valid period of the advantage option, and the game can be more entertaining, and the motivation to obtain the special option for acquiring the reward can be increased.

Similarly, the valid period according to the second embodiment is, for example, an initially set period (also referred to as a season) between a predetermined game start timing and a predetermined end timing set regardless of an event in the game, or may be a period from a predetermined game start timing or a start timing of a certain event such as a start of a battle, to a timing arriving in association with an event such as the option player's player character reaching a goal, as in the first embodiment.

As in the first embodiment, the player character according to the second embodiment includes, for example:
(F1) a character that is operated by a player;
(F2) a character that automatically operates based on instructions (commands) from the player;
(F3) a character such as an enemy character to compete with in the match-up game;

(F4) a character that cooperates in the game;
(F5) a character that is operated by another player (including instruction); and
(F6) a character (NPC) that operates based on an instruction from a computer. Note that in the following description, the character (F1) is the player character unless otherwise noted.

It should also be noted that each of the characters described above is not limited to a human-type character, and may be a robot, ride, or animal character for example.

2.4.2 Advantage Option Information
2.4.2.1 Advantage Option

Next, an advantage option according to the second embodiment will be described with reference to FIG. 13. Note that FIG. 13 is a diagram illustrating an example of the advantage option information stored in the advantage option information storage 148 according to the second embodiment.

The advantage option is an option acquirable (to be possessed) by the player within a determined period (that is, the valid period) during the game, as in the first embodiment.

Specifically, the effect provided by the advantage option according to the second embodiment to be advantageous in the game includes setting a given reward to be acquirable by the option set player or the option player's player character that is the operation target of the player, assuming that a predetermined mission is accomplished as in the first embodiment.

In the second embodiment, various types of information about the advantage option are stored in the advantage option information storage 148 as the advantage option information.

The advantage option information includes mission information that has a plurality of missions defined in a tiered manner (incremental manner).

Specifically, the mission information defines a mission accomplishment condition for accomplishing each mission, and a reward that is associated with each mission accomplishment condition and is acquired by the option set player when the mission is determined to be accomplished with the mission accomplishment condition satisfied.

For example, as the advantage option, as illustrated in FIG. 13,
(A1) mission information defining a plurality of missions; and
(A2) information about the option set player for which the advantage option is set are stored.

Specifically, the information about the option set player stored includes,
(B1) a player ID of each player.
(B2) flag information (hereinafter, referred to as "advantage option setting flag information") indicating whether the advantage option is set for each player, and
(B3) information (hereinafter, referred to as "mission progress flag information") indicating the mission progress status of each option set player.

Note that the mission information according to the second embodiment will be described later together with the description of the mission.

In the second embodiment, a plurality of advantage options is prepared, and each advantage option includes at least one mission different from those in the other advantage options, and the advantage option set for the player is selected from the plurality of advantage options, based on an operation instruction from the player and an instruction from a program issued as the game progresses.

In the second embodiment, among the advantage options,
(C1) the category of the mission to be accomplished (specifically, the mission accomplishment condition) defined in the mission information of each advantage option information may be different, and
(C2) the degree of difficulty of the mission to be accomplished (specifically, the mission accomplishment condition) in the game defined in the mission information of each advantage option information may be different.

For example, a case where the category of the mission differs among the advantage options includes:
(C1-1) a case where the type of rewards acquired by accomplishing the respective mission defined by the respective advantage options is unified, and the unified type differs among the advantage options, or
(C1-2) a case where the type of the mission accomplishment conditions defined by the respective advantage options is unified, and the unified type differs among the advantage options. Note that this case includes a case where the mission accomplishment condition or the reward of only one mission defined by the advantage options differ among the advantage options, and the mission accomplishment condition and the score of other missions are the same among the advantage options.

The case where the type of the rewards is unified means that, in a case where a plurality of missions is defined in the mission information of the advantage option information, the type of the score (such as the game currency, item, or experience points) acquired when the mission is accomplished is always the same.

The case where the type of the mission accomplishment condition is unified means that, in a case where a plurality of missions are defined in the mission information of the advantage option information, an item for determination for given game processing (such as a mission for increasing experience points, a mission for winning the competition against an enemy character, and a mission for acquiring an item within a time limit) executed by the player in the game or a result of the game processing is the same.

The unification of the type of the reward or the unification of the type of the mission accomplishment condition also include a case where, when a plurality of rewards is obtained with one mission information or when a plurality of conditions is defined, the main common reward and condition are the same.

For example, the case where the degree of difficulty of the mission accomplishment condition in the game to be accomplished defined in the mission information for each advantage option includes:
(C2-1) a case where the degree of difficulty based on a parameter or threshold is different among advantage options, or
(C2-2) a case where the degree of difficulty based on a set of specialties and weak points of the option set player to accomplish the mission differs among the advantage options.

The second embodiment includes a case where the degree of difficulty different of all the missions defined in the mission information is different, and also includes a case where at least one mission (that is, mission accomplishment condition) included in the mission information is different.

2.4.2.2 Mission

Next, the mission according to the second embodiment will be described with reference to FIG. 13 described above.

The mission according to the second embodiment is one of a plurality of missions that are accomplished in an incremental manner by a player for which the advantage option is set (that is, an option set player), by satisfying a predetermined mission accomplishment condition, as in the first embodiment.

Note that in the second embodiment, the order in which the determination processing is performed for the plurality of mission accomplishment conditions is defined in each mission information in advance.

For example, as illustrated in FIG. 13, the mission information defines, for each mission:

(B1) mission ID;
(B2) an executed order of the mission;
(B3) a mission type indicating a mission of defeating an enemy character, a mission of clearing a stage, a mission of obtaining a specific item, or the like for example;
(B4) information about the content of the mission such as text information and visualization information to be notified to the player (hereinafter, may be simply referred to as "content information") for example;
(B5) an accomplishment condition of the mission such as the time limit, the number and/or the type of the enemy character(s) to be defeated, the number and/or the type of specific item(s) to be obtained, a use condition (required/unrequired or the number of times) of the tool item being used, and the like; and
(B6) a reward ID of a reward set to be obtainable by the corresponding option set player that has satisfied the mission accomplishment condition.

2.4.2.3 Reward

Next, a reward according to the second embodiment will be described with reference to FIG. 6. Note that FIG. 6 is a diagram illustrating an example of the reward information stored in the game data storage 144.

The reward according to the second embodiment is obtained as an advantage content by the option set player for which the advantage option is set, when the mission is accomplished (that is, when the mission accomplishment condition is satisfied) as in the first embodiment.

For example, reward according to a second embodiment includes rewards making the player advantageous in the game or increase the motivation to acquire the reward, such as (A1) making a change in a parameter changing in accordance with game progress (experience points, ability value, points, game currency, specific item, or an encounter rate/matching probability/encounter order of a matching opponent (player character or enemy character)) advantageous,
(A2) making a specific item, new player character, or a parameter such as game currency/points/strength value acquired, easy to be acquired (for example, increasing the possibility of winning this in gacha, reducing the cost for purchasing or exchanging this, changing a possessed item to an item of the same type with a higher ability or the like, and making this easier to be found or obtained), or increasing the option of this.
(A3) making the task more difficult or easier,
(A4) making the possibility of winning the gacha in the game advantageous for the player, including increasing the possibility of winning a rare item or reducing the possibility of not winning anything,
(A5) reducing consumption of a parameter (billing amount, consumed points, or a strength value (energy value) of a player character) in the game,
(A6) changing an outer appearance (that is, looks)/ability/attribute/quantity/value (including a selling price in a game or when selling to another player and impact on a combining material)/restriction release (such as making the usable time longer or unlimited) of an item usable for a player character,
(A7) giving a trophy/medal/emote,
(A8) changing outer appearance/ability/attribute of a player character,
(A9) enabling a reward failed to be acquired at a determined timing in a game such as a reward (daily bonus, for example) failed to be acquired due to failure to satisfy a predetermined condition or a reward that was available before the game starts, or changing the reward (that is, the unacquired reward) to a reward providing an advantageous effect to the player when the reward is acquired, and
(A10) changing an order of a plurality of rewards acquired one by one along the progress of the game (with the grade of the reward gradually increasing) to be advantageous for the player.

The reward as the advantage content according to the second embodiment changes in accordance with the game status of the option set player.

Specifically, when the advantage option is set, a mission (a mission accomplishment condition in particular) is set for the option set player, and the reward is obtained when the mission is accomplished is set.

For example, the set reward is changed in accordance with the game status of the option set player before the mission is accomplished.

For example, as illustrated in FIG. 6, for example, the reward information indicating a reward includes:

(B1) a reward ID;
(B2) content information indicating the content of the reward (including text information for notification to the player, visualization information for forming an object related to the reward in the game, for example); and
(B3) reward change information for changing the reward in accordance with the option status.

For example, the reward change information defines a condition of a game status for changing the reward, and a rule for changing the reward (including the reward ID as a target of the change).

The condition of the game status for changing the reward includes, for example, conditions such as: a reward (reward ID is designated) with one rank higher is set to be obtainable each time the level of the player increases by two; an ability defined by the reward is doubled each time the experience points are increased by 100; and n daily bonuses (reward obtainable by logging into the game every day) (n is the number of daily bonuses and increases by one for every 20 hours) that have failed to obtained to be no longer obtainable is acquired, in addition to obtaining a predetermined reward, each time the access time increases by 20 hours.

2.4.3 Advantage Option Selection Setting Processing

Figure 14:
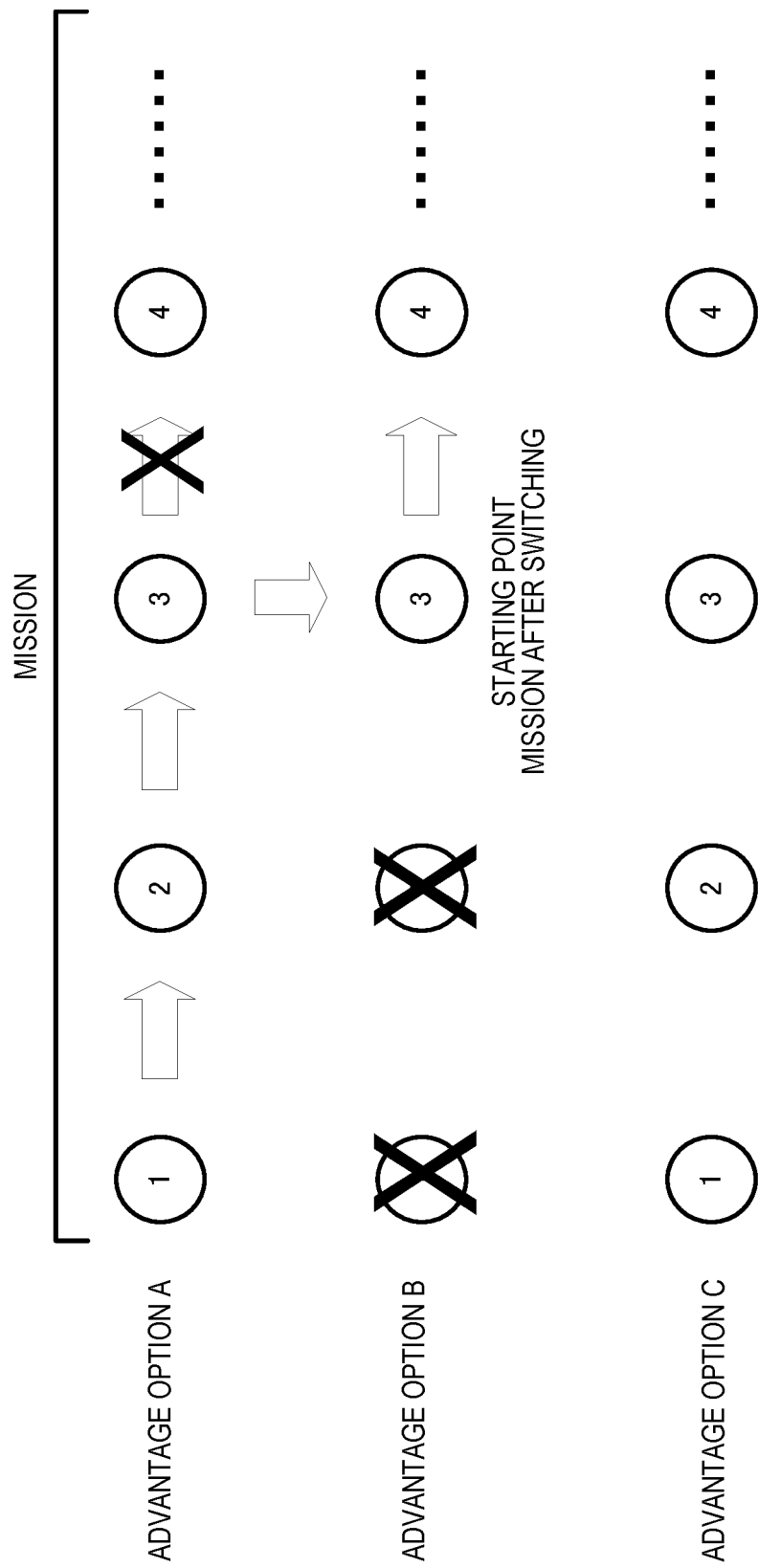
FIG. 14 is a diagram illustrating advantage option selection setting processing according to the second embodiment, and determination of a mission when the advantage option is switched.

Next, advantage option selection setting processing according to the second embodiment will be described with reference to FIG. 14 and FIG. 15. FIG. 14 and FIG. are diagrams illustrating the advantage option selection setting processing according to the second embodiment, and determination of a mission when the advantage option is switched.

Advantage Option Selection Setting Processing (New)

The option management unit 105 executes the advantage selection setting processing of (A1) for each player, setting an advantage option instructed based on a given selection instruction such as an instruction from the player among a plurality of advantage options, to a corresponding player, and registering the player for which the advantage option is set (the player ID in particular) in the advantage option information storage 148 in association with the type (for example, option ID) of the corresponding advantage option, and (A2) setting mission information stores in the advantage option information storage 148 in association with the advantage option information of the advantage option thus set, to the option set player for which the advantage option is set.

The option management unit 105 manages the mission information defined by the advantage option set for the option set player.

Specifically, an instructed advantage option among a plurality of advantage options is newly set for a player with no advantage option set yet by the option management unit 105, based on a given selection instruction such as an instruction from the player.

The option management unit 105 makes each mission defined in the mission information effectively function (activated) or makes the mission function in response to an instruction from the player, in the game, for example.

The option management unit 105 causes the information provision unit 110 to generate display control information for displaying information indicating that the advantage option is set for the corresponding player, and to provide the information to the terminal device 20.

When selecting the advantage option, the option management unit 105 may execute the advantage option setting processing based on an instruction from the player in a case of obtaining through purchasing and gacha, and may also execute the advantage option setting processing of setting the advantage option for the player, through automatic setting (selection when there are a plurality of advantage options) such as random or program based setting among items prepared by or on the game administrator or a game system for example.

The advantage option may be set before the valid period of the advantage option. In such a case, the game management unit 103 executes various types of game control so that the option set player can enjoy the advantage from the beginning of the valid period.

Specifically, when the advantage option is set before the valid period of the advantage option, the game management unit 103 executes game control processing of executing the game based on the operation instruction from the option set player and the advantage option information of the advantage option set for the option set player, for the option set player or the option player's player character once the valid period starts until the valid period ends.

When the advantage option is set after the valid period has already started, the game management unit 103 executes various types of game control so that the option set player can enjoy the advantage after the advantage option has been set.

Specifically, when the advantage option is set when the valid period of the advantage option has already started, the game management unit 103 resumes the game and executes game control processing of executing the game based on the operation instruction from the option set player and the advantage option information about the advantage option set for the option set player, for the option set player or the option player's player character that is the operation target of the option set player as described above, from the timing of the resumption until the valid period ends.

Advantage Option Selection Setting Processing (Switching)

When the advantage option is already set and when a given determination condition is determined to be satisfied, the option management unit 105 executes selection setting processing of selecting an advantage option different from the currently set advantage option (that is, the set advantage option), and sets the advantage option to the same option set player.

Specifically, the option management unit 105 executes the selection setting processing of switching to the other advantage option for the option set player for which the set advantage option is set, when the given determination condition is satisfied, based on an instruction from the player.

In the second embodiment, in a case where the motivation to accomplish the mission set by the set advantage option is low, such as a case where a mission difficult for the player is set or a case where the reward acquired when the mission is accomplished is a reward unwanted by the player, a mission of advantage option can be newly (that is a new advantage option) set for the player, whereby the probability of an easier mission to be executed or a reward desired by the player to be acquired can be increased.

Specifically, for the option set player for which the mission information of the advantage option information of the set advantage option is set, when the accomplishment status of the mission accomplishment condition defined in the mission information or the reward acquisition status defined in the set mission information is determined to satisfy the given status determination condition, the option management unit 105 executes the advantage option selection setting processing for switching, to select a new advantage option different from the set advantage option, and sets the new advantage option to the corresponding option set player.

When setting the mission information (hereinafter, also referred to as "set mission information") in the advantage option information (hereinafter, also referred to as "set advantage option information") about the set advantage option that has already been set for the option set player, the option management unit 105 may automatically switch from the mission information in the set advantage option information that has already been set to the mission information (hereinafter, also referred to as "new mission information") in the advantage option information (hereinafter, referred to as "new advantage option information") about the new advantage option, at a timing when the set advantage option is set, or set (switch) the mission information to the option set player through an instruction from the option set player or the like by simply setting the new advantage option.

Determination of Mission when Switching Advantage Option

When the mission information (that is, new mission information) in the new advantage option information is set for the corresponding option set player, the option management unit 105 determines a mission accomplishment condition of starting execution of mission determination processing from among mission accomplishment condition defined in the new mission information together with the order, in accordance with the accomplishment status of the mission accomplishment condition defined in the set mission information or the reward acquisition status defined in the set mission information.

Specifically, when switching the advantage option to another advantage option, the option management unit 105 is configured to be capable of changing the starting point of the mission (specifically mission accomplishment condition) among a plurality of missions defined in the mission information in the other advantage option information.

For example, in accordance with the accomplishment status of the mission accomplishment condition defined in the set mission information or the reward acquisition status defined in the set mission information, the option management unit 105

(B1) determines, when the new mission information is set for the corresponding player, the mission accomplishment condition in the new mission information with the same order as the mission accomplishment condition in the set mission information during the mission determination processing, or (B2) determines the mission accomplishment condition defined to be the first in the order in the new mission information.

With such a configuration in the second embodiment, even if it fails to reach the last one of the plurality of missions defined in the mission information of the advantage option information, the last one can be reached using another advantage option. Furthermore, when the reward defined in the mission information of the advantage option information is unrequired, the acquisition of such a reward can be avoided and another reward can be set to be at least acquirable.

The option management unit 105 determines as the accomplishment status of the mission accomplishment condition defined in the set mission information, when switching the advantage option, a mission (that is, mission accomplishment condition) from which the execution of the mission determination processing starts from among a plurality of missions defined in the new mission information, in accordance with (C1) the types or the number of missions the mission accomplishment condition of which has been satisfied, among a plurality of missions defined in the set mission information, or (C2) the degree of difficulty of the mission that has already been accomplished, among a plurality of missions defined in the set mission information, in an incremental manner in accordance with the degrees of difficulty of the missions.

For example, a case is assumed where the advantage options A, B, and C can be set, the advantage option A is first set, then, the switching to the advantage option B occurs at a certain switching timing (that is, a timing when the certain status determination condition is satisfied), and then the mission (mission as the starting point) from which the new advantage option starts is determined in accordance with the number of missions.

In this case, the switching timing arrives while the third mission is being challenged after the first two missions of the advantage option A have been completed, and thus the option management unit 105 determines the third mission to be the mission starting point for enabling the option set player of the advantage option B to enjoy the advantage as illustrated in FIG. 14.

The option management unit 105 determines as the reward acquisition status defined in the set mission information, when switching the advantage option, a mission (that is, mission accomplishment condition) from which the execution of the mission determination processing starts from among a plurality of missions defined in the new mission information, in accordance with (D1) the types or the number of rewards that have already been acquired among a plurality of missions defined in the set mission information, or (D2) the level of the reward that has already been acquired, when a plurality of missions are set in an incremental manner in accordance with the levels of the rewards, in a plurality of missions defined in the set mission information in an incremental manner in accordance with the levels of the rewards.

For example, a case is assumed where the advantage options A, B. and C can be set, the advantage option A is first set, then, the switching to the advantage option B occurs at a certain switching timing (that is, a timing when the certain status determination condition is satisfied), and then the mission (mission as the starting point) from which the new advantage option starts in accordance with the level of the reward.

Figure 15:
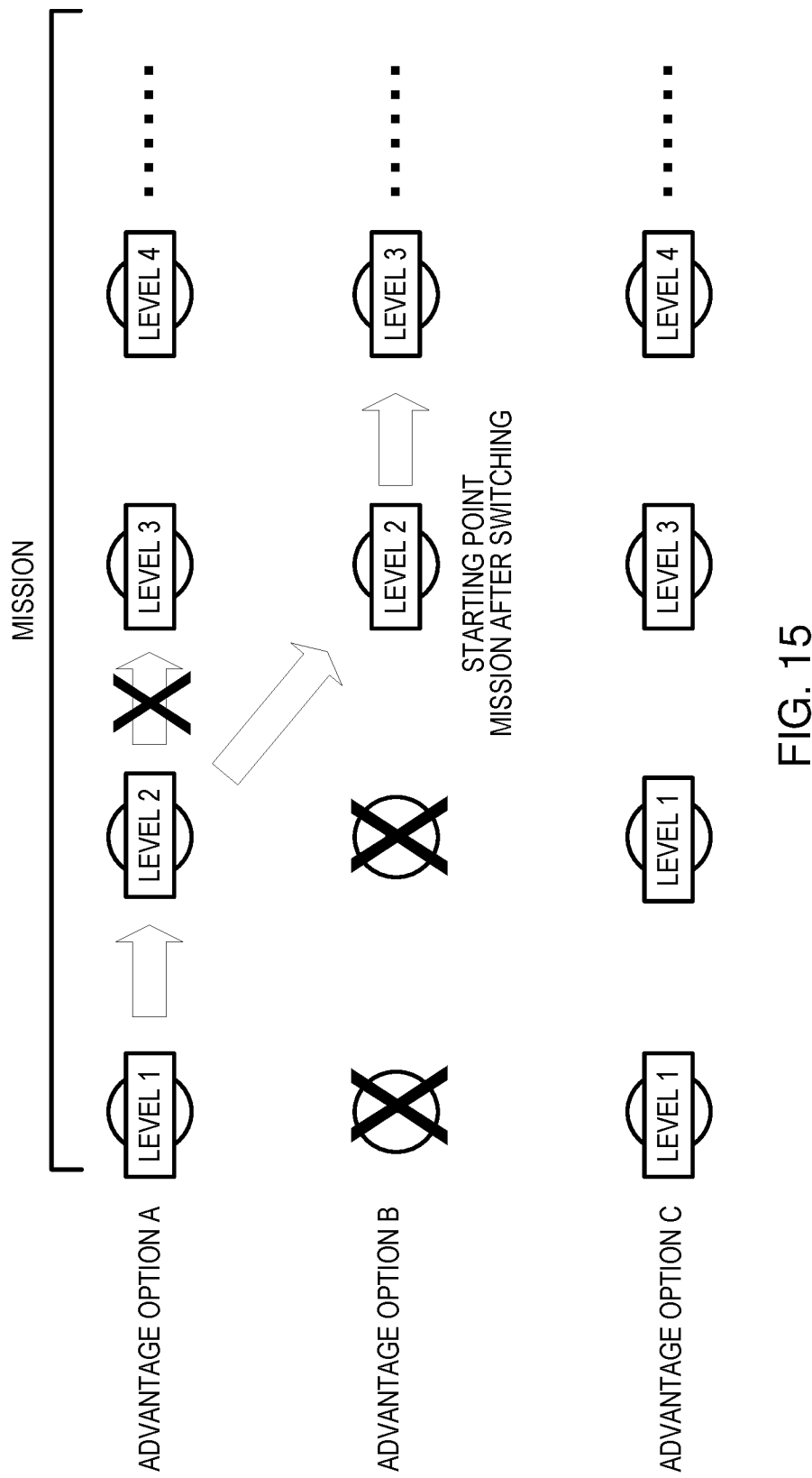
FIG. 15 is a diagram illustrating advantage option selection setting processing according to the second embodiment, and determination of a mission when the advantage option is switched.

In this case, the switching timing arrives while a mission with the reward level 2 is being challenged after a mission with the reward level 1 of the advantage option A has been completed, and thus the option management unit 105 determines the mission with the reward level 2 to be the mission starting point for enabling the option set player of the advantage option B to enjoy the advantage as illustrated in FIG. 15.

When determining a mission (that is, mission accomplishment condition) from the which the execution of the mission determination processing from among a plurality of missions defined in the new mission information, the option management unit 105 may determine the mission in the game randomly or based on a certain rule, determine the mission based on a player selection, or determine the mission to be the first mission defined in the mission information of the new advantage option information.

Furthermore, when the advantage option is set or the advantage option is switched, the information provision unit 110 may generate a map indicating whether the missions are accomplished and statuses of missions including a mission to be the starting point after the switching of the advantage option, and provides the map to the terminal device 20 of the corresponding player.

Valid Period when Switching Advantage Option

Even when the set advantage option is switched to the new advantage option during the valid period, the option management unit 105 manages the new advantage option without changing the end timing of the valid period.

Specifically, the option management unit 105 is configured to fix the period during which the option is applied without changing the period depending on whether the new advantage option is set, and manage the period as the common period for all the advantage options, so that only the mission to be accomplished by the option set player and the executed timing are flexibly set, without creating an advantageous or disadvantageous status for the player depending only on whether the new advantage option is set.

In other words, when the switching to the new advantage option occurs in the latter half of the valid period (for example, a period after the half of the valid period has elapsed), the period during which the advantage can be enjoyed is short. Still, the option management unit 105 does not change the valid period, so that the period in the set advantage option is inherited to be managed.

Specifically, the option management unit 105 manages, as a fixed valid period, (E1) an initially set period (also referred to as a season) between a predetermined game start timing and a predetermined end timing set regardless of an event in the game, or (E2) a period from a predetermined game start timing or a start timing of a certain event such as a start of a battle, to a timing arriving in association with an event such as the option player's player character reaching a goal.

For example, in a case where the valid period of "20 hours" is the common period for a plurality of advantage options, when 10 hours elapse during the game under the set advantage option, and switching to the new advantage option takes place at that timing with the mission information of the new advantage option information set, the option management unit 105 manages the valid period of the new advantage option so that its end timing arrives 10 hours later.

The option management unit 105 may manage the valid period as a common period for two or more of all of the advantage options, instead of managing the valid period as the common period for all the advantage options.

Such a common period is basically a valid period with the common length and common start and end timings. Alternatively, the common period may be a valid period with only the common length, meaning that the start timing, the end timing, or both can vary.

Specifically, the option management unit 105 may manage the valid period to have the common length with the start or the end timing varying.

For example, in this case, the option management unit 105 manages the valid period to be 20 days for all the advantage options, and manages the start timing to be February 1st for the advantage options A and B, and to be February 2nd for the advantage options C and D.

2.4.4 Mission Determination Processing

Next, the mission determination processing according to the second embodiment will be described.

The mission management unit 107 executes the mission determination processing of determining whether the mission that is currently set, among the plurality of missions that are set in an incremental manner to the set advantage option or the new advantage option, is accomplished (that is, whether the corresponding mission accomplishment condition is satisfied) for each option set player during the valid period.

The mission management unit 107 is configured to be capable of switching the advantage option that is currently set to another advantage option by executing the option selection setting processing. When the advantage option is switched to another advantage option, mission determination processing is sequentially executed in the order defined in the other advantage option, from the mission (that is, the mission accomplishment condition) determined when the mission information of the other advantage option information thus switched is set for the option set player.

Specifically, in the second embodiment, the mission management unit 107 is configured to prepare some routes with which the last one of the missions in the advantage option can be reached, to reduce hesitation in using the advantage option.

For example, in the second embodiment, when a given status determination condition is satisfied, the mission accomplishment condition or the reward defined in the mission information of the other advantage option information can be changed, (A1) when a degree of difficulty of a certain mission accomplishment condition defined in the set mission information currently set is high for the player, or (A2) when the player does not require a certain reward among rewards defined in the set mission.

Thus, with such a configuration in the second embodiment, even if it fails to reach the last one of the plurality of missions defined in the mission information of the advantage option information, the last one can be reached using another advantage option. Furthermore, when the reward defined in the mission information of the advantage option information is unrequired, the acquisition of the reward can be avoided and another reward can be set to be at least acquirable.

Specifically, regardless of whether the advantage option is switched to another advantage option or not, the mission management unit 107 determines whether the mission accomplishment condition of the mission information currently set for the option set player is satisfied during the game within a valid period by (B1) given game processing executed in the game by the player (that is, option set player) associated with the set mission information, or (B2) a result of the given game processing executed in the game by the player (similarly, option set player) associated with the set mission information.

Specifically, as the given game processing executed in the game by the player associated with the mission information, the mission management unit 107 determines whether the mission accomplishment condition of the mission information currently set for the option set player is satisfied by game processing related to an action of the player in the game and game processing based on a game action of the player character as the operation target of the player in the game, based on an instruction from the player.

For example, such game processing includes:
(C1) login to the game by the player;
(C2) billing and consumption of points for the game executed by the player;
(C3) registration of a friend or follower executed by the player or another player; and
(C4) processing based on game action such as movement, attack, defense, talk, rest, town planning, and various actions related to execution of a match with another player character, related to various games (such as match-up games, racing games, RPGs, or shooting games) performed by the player character that is an operation target of the player.

The result of the given game processing in the game executed by the player associated with the mission information includes, for example:
(D1) a result of login such as the number of login times to the game, total login time, or login timing;
(D2) a result of billing or consumption such as billing timing, or a billing amount or a point consumption amount within a certain period or a total billing amount or point consumption amount;
(D3) a result of registration of a friend relationship such as a friend or follower registration timing or registration count;
(D4) a result, related to the player, of execution of the game such as the level of the player reaching a certain level; and
(D5) a result of an action of the player character including: achievement of a certain task such as defeating a certain enemy character (boss character for example), the number of enemy characters defeated, acquisition of a certain item, clearing a certain stage; and a parameter (such as level, experience points, points, game currency, or various ability values) related to an attribute of the player character reaching a certain value.

In the mission information, the order in which the determination processing is executed on a plurality of mission accomplishment conditions is defined in advance, and as the mission determination processing, the mission management unit 107 determines whether each mission accomplishment condition is satisfied, in an order defined in association with the mission conditions.

Specifically, the mission management unit 107 identifies an accomplished mission currently being challenged and identifies the mission accomplishment condition of the mission thus identified, based on the advantage option information for each option set player in the order defined in association with the mission conditions.

When the mission accomplishment condition is determined to be satisfied, the mission management unit 107 that has determined that the mission is accomplished registers, for each option set player, flag information indicating accomplishment for the corresponding mission information in the advantage option information storage 148.

For example, a case is considered where a mission A with a mission accomplishment condition "defeat five enemy characters" is currently challenged by an option set player A.

In this case, the mission management unit 107 counts the number defeated enemy characters, each time the option set player A fights and competes with an enemy character. When the count finally reaches "5", the mission management unit 107 registers flag information indicating that the option set player A has satisfied the mission accomplishment condition, in the mission information of the advantage option information about the mission A.

For example, a case is considered where a mission B with a mission accomplishment condition "achieving 100 experience points" is currently challenged by an option set player B.

In this case, when the option set player A executes various game actions each enabling the experience points to be obtained, the mission management unit 107 sequentially makes the option set player A sequentially obtain the experience points set for each game action so that the experience points are summed up. The game actions include fighting and defeating an enemy character (experience points "+10"), using a spell for healing another player character (experience points "+5"), or finding a specific item (experience points "+3").

When the experience points of the option set player B reach "100", the mission management unit 107 registers flag information indicating that the mission accomplishment condition is satisfied by the option set player B, in the advantage option information about the mission B.

2.4.5 Reward Control Processing

Next, the reward control processing according to the second embodiment will be described.

Basic Principles of Reward Control Processing

When mission is determined to be accomplished (that is, when the corresponding mission accomplishment condition is determined to be satisfied) by the mission determination processing executed based on the currently set advantage option regardless of whether the advantage option has been switched to another advantage option, the reward control unit 108 executes, for each option set player or for each option player's player character, reward control processing of setting a given reward to be at least acquirable by the player (that is, the terminal device 20) (including giving the reward to the player unconditionally).

Specifically, in the second embodiment, as described above, a plurality of mission accomplishment conditions and rewards corresponding to the respective mission accomplishment conditions are defined in the mission information defined in each advantage option. Upon determining that the currently set mission accomplishment condition is satisfied, the reward control unit 108 sets the reward associated with the mission accomplishment condition to be at least acquirable by the corresponding player.

Specifically, as described above, the reward control unit 108 executes, in the mission determination processing during the game within a valid period, the reward control processing to make the reward defined in the mission information to be acquired or acquirable by the option set player, when the mission accomplishment condition in the set mission information set for the option set player is determined to be satisfied by (A1) given game processing executed in the game by the player (that is, option set player) associated with the set mission information set, or (A2) a result of the given game processing executed in the game by the player (similarly, option set player) associated with the set mission information set.

Specifically, as described above, the reward control unit 108 sets to be acquirable, the reward making the player advantageous in the game or the reward offering a high motivation for acquisition, such as, for example (B1) a reward making a change in a parameter changing along a game progress advantageous, (B2) a reward making an item used in the game easier to be obtained, (B3) a reward making an enemy character weaker or stronger.

(B4) a reward making a task easy or difficult, (B5) a reward making a possibility of winning a gacha advantageous for the player.

(B6) a reward reducing the consumption of a parameter in the game, (B7) a reward changing the outer appearance/ability/quantity/value/restriction release of an item, (B8) a reward of giving an item, a player character, or a parameter such as game currency/points/strength value, (B9) a reward of giving a trophy/medal/title/emote, and (B10) a reward of changing the outer appearance/ability/attribute of the player character.

Then, the reward control unit 108 searches the reward information based on the identified reward ID, and executes the reward control processing of setting the reward to be acquirable by the corresponding option set player based on the reward information with the corresponding reward ID.

Note that when the mission is accomplished (that is, when the mission accomplishment condition is satisfied), the reward control unit 108 may make the reward acquired based on an intention of the player (an operation instruction indicating an intention to acquire the reward for example) or assuming a payment based on consumption or billing of the game currency or points (also including strength parameter or the like) (assuming that the mission with such a specification is identified and registered in the mission information).

Specifically, the reward control unit 108 may execute the reward control processing of unconditionally giving the reward to the player, and may also make the reward acquired assuming that the billing or consumption of the game currency or the points are involved, suspend the provision of the reward if the player does not show an intention to acquire the reward (for example, an operation instruction), or determine whether the reward is to be provided based on determination processing of determining whether the reward is actually provided in a lottery event such as gacha.

When the mission is accomplished, the reward control unit 108 may set the reward with an available period to be acquired or to be acquirable (assuming that a mission defining such a specification is identified and registered in the mission information as in the case described above).

Reward Control Processing when Switching Advantage Option

When the advantage option switches to another advantage option during the valid period, the reward control unit 108 stops the reward control processing for the mission information of the advantage option information that is already set, and executes the reward control processing only based on the mission information of the advantage option information newly set.

Specifically, in the second embodiment, the mission accomplishment condition or the reward defined can be changed to that in the mission information of the other advantage option information, (C1) when a degree of difficulty of one or more mission accomplishment conditions defined in the set mission information currently set is high, or (C2) when the player has acquired all the rewards he or she wants among the rewards defined in the mission information of the advantage option information, and thus does not require unacquired rewards, for example.

Specifically, the reward control unit 108 stops the reward control processing executed with the previously set advantage option without affecting the rewards obtained based on the previously set advantage option.

The reward control unit 108 executes the reward control processing on the mission defined in the newly set advantage option and determined.

Specifically, as in the case described above, the reward control unit 108 executes, also in a case where the advantage option is switched to another advantage option, the reward control processing during the game within a valid period, to make the reward defined in the mission information to be acquirable by the option set player, when the mission accomplishment condition in the set mission information set for the option set player is determined to be satisfied by (D1) given game processing executed in the game by the player (that is, option set player) associated with the set mission information set, or (D2) a result of the given game processing executed in the game by the player (similarly, option set player) associated with the set mission information set.

2.4.6 Status Determination Processing

Next, the status determination processing according to the second embodiment will be described.

Basic Principle of Status Determination Processing

As described above, the status detection unit 106 executes, for each option set player for which the advantage option has been selected and the mission information has been set, status determination processing of determining whether a given status determination condition is satisfied by the accomplishment status of the mission accomplishment condition defined in the mission information or the reward acquisition status defined in the mission information, and determining a condition for switching the advantage option to another advantage option.

Specifically, to link the acquisition of the reward based on the accomplishment of a mission with the advantage option with timing of switching the advantage option, the status detection unit 106 may determine that the status determination condition is satisfied when a certain mission accomplishment condition is determined to be satisfied in a case where a plurality of mission accomplishment conditions is set in the mission information set for the option set player.

In this case, as the status determination processing, the status detection unit 106 determines (A1) when a plurality of mission accomplishment conditions are defined in the mission information of each advantage option information, whether a certain mission accomplishment condition among the plurality of mission accomplishment conditions is satisfied, or (A2) when a plurality of mission accomplishment conditions are defined in the mission information of each advantage option information with the mission accomplishment conditions set in an incremental manner based on degrees of difficulty, whether a mission accomplishment condition of a certain degree of difficulty is satisfied.

Furthermore, the status detection unit 106 may determine that the status determination condition is satisfied when one degree of difficulty among the mission accomplishment conditions defined in the mission information set for the option set player or when all the mission accomplishment conditions is/are determined to be satisfied, so that a sense of accomplishment and superiority in acquisition of the advantage option as well as further advantage can be enjoyed in the game.

As the status determination processing, the status detection unit 106 may determine whether a condition different from the mission accomplishment condition defined in each mission information is satisfied.

For example, in this case, the status detection unit 106 may determine whether the player or the player character has satisfied a given condition, that is, may determine (B1) whether the game level of the player or the player character has reached a game level set in advance, (B2) whether the player character has acquired a certain item in the game, (B3) whether a requirement set for a parameter (such as experience points, points, game currency, or an ability value set in advance) set for the player or the player character is satisfied, or (B4) whether the player character has defeated a certain enemy character such as a boss character.

2.4.7 Information Provision Processing Related to Display Control

Next, information provision processing related to display control according to the second embodiment will be described.

The information provision unit 110 provides to the corresponding terminal device 20 during the game, various types of game information related to control and display for the game, as well as information related to a reward such as advantage option information, mission information, or reward information set for each player, at a given timing (when the game starts, during the game, or when the game ends) as display control information displaying the information on an image related to the game being executed by the terminal device 20.

Specifically, the information provision unit 110 provides the terminal device 20 with the information related to the obtainable advantage option, set advantage option, and set mission or the information related to the reward that can be obtained from the mission, as the display control information, at a given timing including:

(A1) a timing when the advantage option is started to be provided;

(A2) a timing when the advantage option is set;

(A3) a timing when a new mission is set;

(A4) a timing when the reward is set to be acquirable or a timing when the reward is acquired; or (A5) a timing when the reward is changed.

The information provision unit 110 provides the corresponding terminal device 20 with the game information as a display related to the mission, which is information including, for example:

(B1) the content of the mission (the type of the mission, the type and the number of enemy characters to be defeated, or a description on a stage and a specific item obtained);

(B2) the fact that the mission is set and the content of the reward set to be acquirable or the reward acquired when the mission is accomplished;

(B3) mission accomplishment condition;
(B4) reward changed by the reward change processing; and
(B5) a condition for changing the reward (condition to be satisfied as the option status).

For the option set player for which the advantage option, the information provision unit 110 may generate the display control information for displaying a list of rewards that have been obtained and rewards acquirable in the future, and provide the display control information thus generated to the corresponding terminal device 20.

In this case, the information provision unit 110 may generate display control information for displaying an item name and an image of each reward, when the list of rewards that have been obtained and rewards to be obtained is displayed.

When the mission accomplishment status is displayed, the information provision unit 110 may generate display control information for displaying information indicating that each mission is unaccomplished or accomplished for each option set player or player or character that is the operation target of the option set player, and provide the display control information thus generated to the corresponding terminal device 20.

2.4.8 Modification
2.4.8.1 First Modification

Next, a first modification (modification of the reward control processing) of the second embodiment will be described.

When each mission accomplishment condition defined in the mission information of the advantage option information that has been set for the option set player is determined to be satisfied, the reward control unit 108 may execute suspension processing of suspending acquisition of a reward defined in the mission information based on an instruction from the option set player.

In this case, in accordance with the suspended reward, the reward control unit 108 may set, in the reward control processing, at least one of the mission accomplishment condition and the reward defined in the new advantage option information as a result of switching the advantage option, to be advantageous in the game for the option set player for which the mission information is set.

Specifically, in accordance with the number, the type, or the value of rewards set to be acquirable in the reward control processing, the reward control unit 108 may reduce the degree of difficulty of the mission accomplishment condition defined in the advantage option information about the new advantage option, reduce the requirements for the mission accomplishment condition, or increase the number, the type, or the value of rewards defined in the advantage option information.

2.4.8.2 Second Modification

Figure 16:
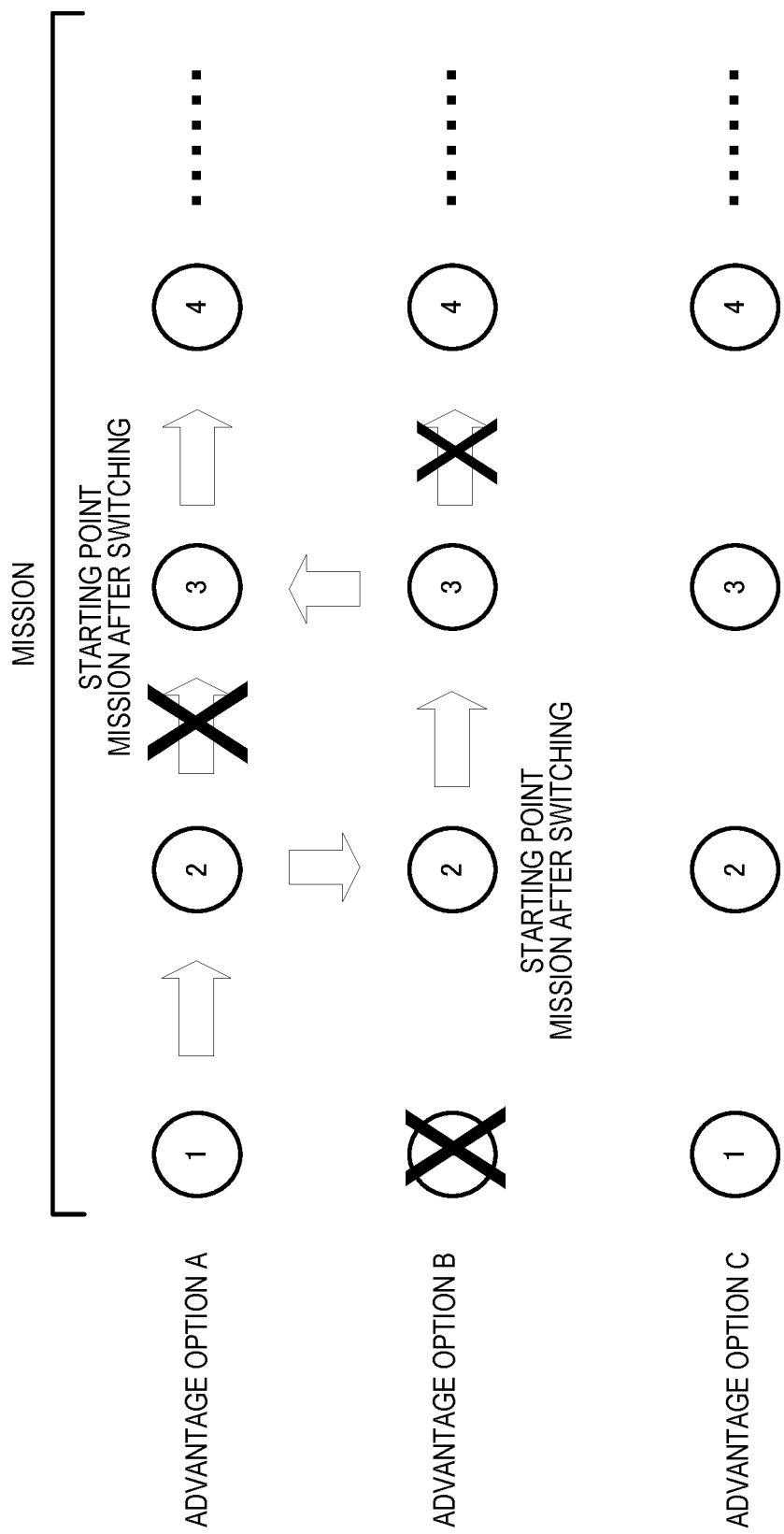
FIG. 16 is a diagram illustrating the advantage option selection setting processing and advantage option switching according to a modification of the second embodiment.

Next, a second modification (modification related to determination of a mission when the advantage option is switched) of the second embodiment will be described with reference to FIG. 16. FIG. 16 is a diagram illustrating the advantage option selection setting processing and advantage option switching according to the present modification.

In the above described example related to the determination of a mission when the advantage option is switched, the option management unit 105 switches between two advantage options at once. Alternatively, the switching among three or more advantage options may be implemented such as in a case where the advantage option A switched to the advantage option B. and then the advantage option B switched to the advantage option C. Furthermore, as illustrated in FIG. 16, after the switching to the new advantage option, the new advantage option may be switched back to the original advantage option.

FIG. 16 is a diagram illustrating a case where the mission as the starting point is determined when the advantage option based on the number of missions, the advantage options A, B, and C can be set, first the advantage option A is set, then the advantage option A is switched to the advantage option B at a certain switching timing (that is, at a timing when the certain status determination condition is satisfied), and then the advantage option B is switched back to the advantage option A.

2.5 Operation in Second Embodiment

Next, an operation of the game processing involved in setting the advantage option including the option selection setting processing and the reward control processing executed by the server 10 according to the second embodiment will be described with reference to FIG. 17 and FIG. 18.

Figure 17:
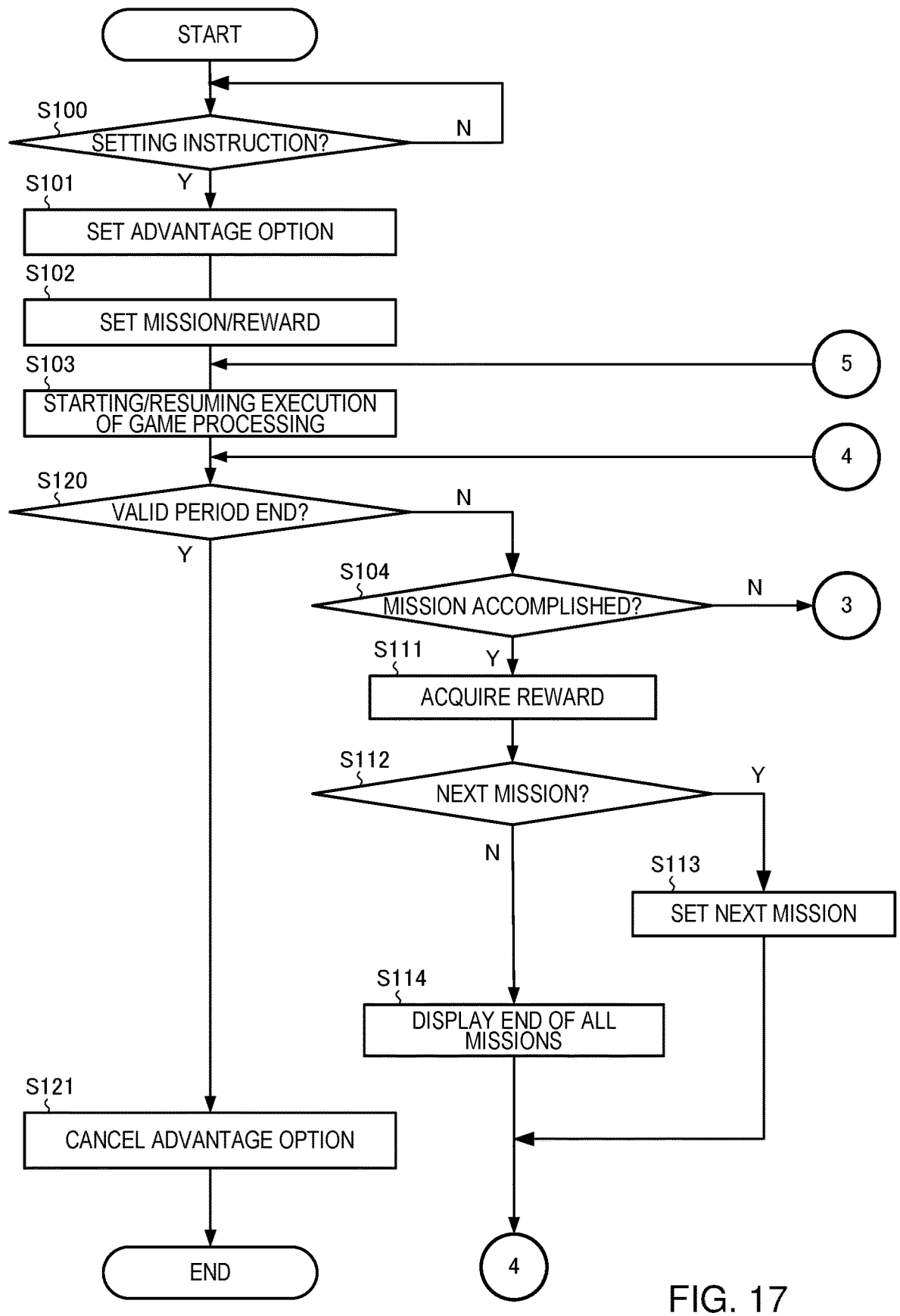
FIG. 17 is a flowchart illustrating an operation of game processing involved in the advantage option setting including the option selection setting processing and the reward control processing executed by the server according to the second embodiment.
Figure 18:
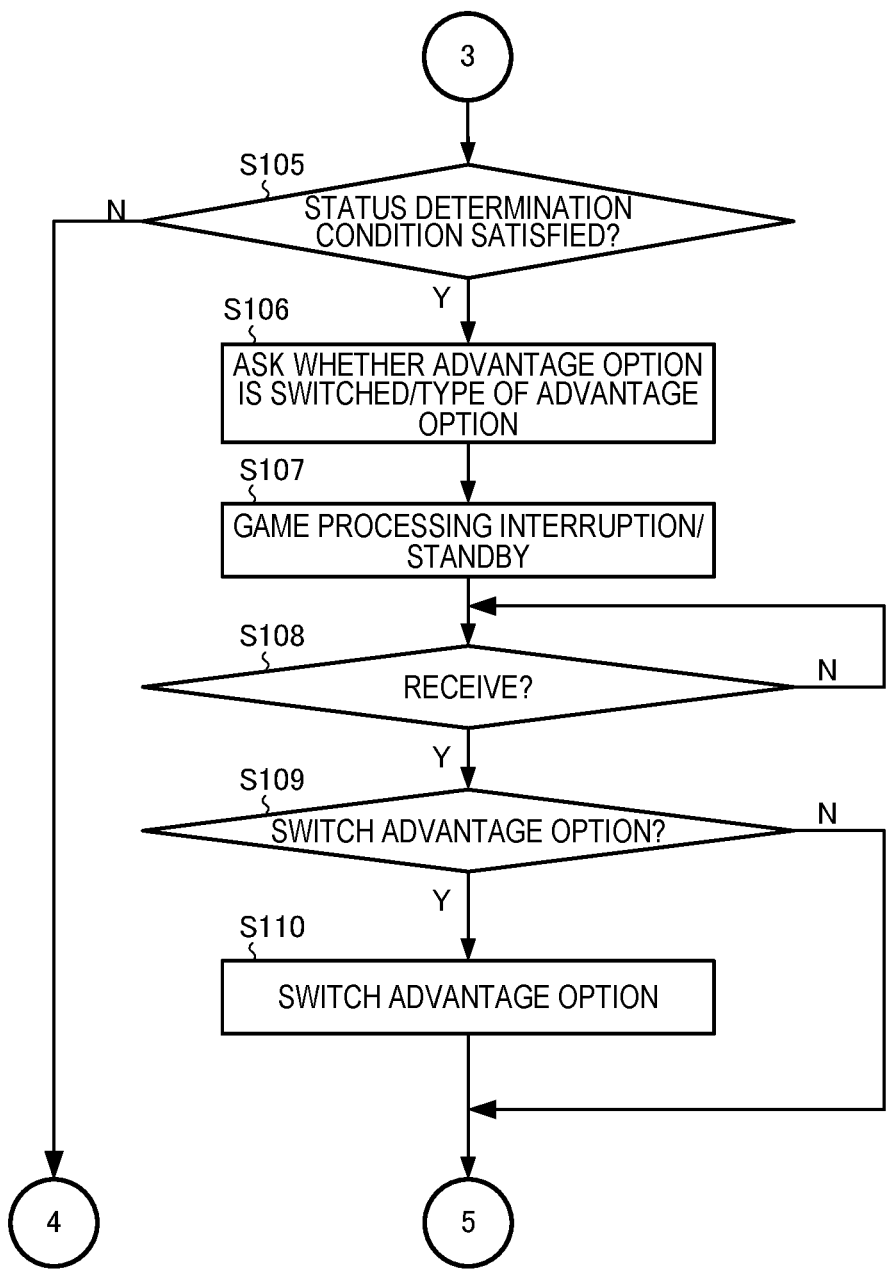
FIG. 18 is a flowchart illustrating an operation of game processing involved in the advantage option setting including the option selection setting processing and the reward control processing executed by the server according to the second embodiment.

FIG. 17 and FIG. 18 are flowcharts illustrating an operation of game processing involved in the advantage option setting including the option selection setting processing and the reward control processing executed by the server 10 according to the second embodiment.

The operation is an operation executed for each player, an operation executed in a case where the advantage option is set for each player, and an operation related to switching of an advantage option including setting a mission and automatically acquiring the reward when the mission is accomplished.

The operations assume that the player has already registered in and logged into the game, and that the valid period of the advantage option has started.

Specifically, the operations assume that for each advantage option, a plurality of missions with different levels are defined in an incremental manner meaning that missions are cleared one by one in an ascending order of the level, and each time a mission is cleared, the reward corresponding to a mission is automatically acquired and the next mission is set.

In the operation, the advantage option is assumed to be selected based on an instruction from the player, and also when the advantage option that is set is switched to another advantage option (new advantage option), the new advantage to be switched is assumed to be selected based on an instruction from the player.

First, when the communication control unit 101 receives a setting instruction for the advantage option from the player transmitted from the terminal device 20 (step S100), the option management unit 105 executes the advantage option setting processing of setting an advantage option selected from a plurality of advantage options selected by the corresponding player based on an instruction from the player (step S101).

Next, based on the mission information and the reward information defined in the advantage option information of the advantage option selected, the mission management unit 107
(A1) sets the first mission defined in the advantage option information to the corresponding player,
(A2) when the advantage option is switched (when the processing proceeds from step S109), set a mission to be the starting point after the switching to the corresponding player, and
sets a reward to be acquired when the mission set for the player is accomplished (step S102).

Next, the game management unit 103 starts or resumes the execution of the game processing involving the processing (hereinafter, referred to as "advantage processing") related to the advantage corresponding to the advantage option (step S103).

Next, the game management unit 103 determines whether the end timing of the valid period of the advantage option has arrived (step S120).

In this case, the processing proceeds to step S104 when the game management unit 103 determines that the end timing of the valid period has not arrived yet and proceeds to step S121 when the game management unit 103 determines that the end timing of the valid period has arrived.

On the other hand, when the game management unit 103 determines that the end timing of the valid period has not arrived, the mission management unit 107 determines whether the mission accomplishment condition of the currently set mission is satisfied (step S104).

In this process, when the mission management unit 107 determines that the mission accomplishment condition of the set mission is not satisfied, the processing proceeds to step S105. When the mission accomplishment condition is determined to be satisfied, the processing proceeds to step S111.

Next, when the mission management unit 107 determines that the set mission accomplishment condition is not satisfied, the status detection unit 106 determines whether the given status determination condition is satisfied by the accomplishment status of the mission accomplishment condition defined in the mission information about the advantage option that has been set, or the acquisition status of the reward defined in the mission information (step S105).

In this case, when the status detection unit 106 determines that the given status determination condition is satisfied by the accomplishment status of the mission accomplishment condition or the acquisition status of the reward defined in the mission information, the processing proceeds to step S106. When the given status determination condition is determined to be not satisfied by the accomplishment status of the mission accomplishment or the acquisition status of the reward defined in the mission information, the processing proceeds to step S120.

Next, when the status detection unit 106 determines that the given status determination condition is satisfied by the accomplishment status of the mission accomplishment condition or the acquisition status of the reward defined in the mission information, the option management unit 105 makes the information provision unit 110 generate game information indicating that the advantage option can be switched for the corresponding player and game information for identifying the type of the new advantage option when the advantage option is desired to be switched, and transmit the game information generated to the terminal device 20 of the corresponding player (step S106).

Next, the game management unit 103 temporarily stops the game processing being executed, and the option management unit 105 determines whether the advantage option is to be switched, and when the advantage option is to be switched, stands by for the reception of the information about the type of the new advantage option (step S107).

Next, upon receiving information (hereinafter, referred to as "advantage option switching related information") related to switching of the advantage option from the corresponding terminal device 20 (step S108), the option management unit 105 determines whether the advantage option is switched based on the advantage option switching related information thus received (step S109).

In this case, upon determining that the advantage option is to be switched based on the advantage option switching related information received, the option management unit 105 switches the advantage option to the advantage option of the type included in the advantage option switching related information received (step S110), and the processing proceeds to step S102.

When the option management unit 105 determines that the advantage option is not to be switched based on the advantage option switching related information received, the processing proceeds to step S103.

On the other hand, when the mission management unit 107 determines that the mission accomplishment condition of the currently set option is satisfied, the reward control unit 108 sets the set reward to be acquired by the corresponding option set player (step S111).

The mission management unit 107 determines whether there is a mission to be set next (step S112). When it is determined that there is the mission to be set next, the corresponding mission is set for the option set player (step S113), and the processing proceeds to step S120.

Upon determining that there is no mission to be set next, the mission management unit 107 notifies the terminal device 20 of the player of the completion of all the missions (step S114), and the processing proceeds to step S120.

Then, upon determining that the end timing of the valid period of the advantage option has arrived, the game management unit 103 cancels the advantage option of the corresponding player (step S121) and terminates the operations.

The game management unit 103 cancels the advantage option of the corresponding player, by deleting the player ID of the corresponding player from the advantage option information.

The game management unit 103 may set the valid period of the advantage option for each option set player, but basically sets the unified valid period for all the players. Thus, the game management unit 103 cancels the advantage option of all the option set players in the processing in step S121.

2.6 Others

The invention is not limited to the embodiment described above, and various modifications can be made. For example, any term cited with a different term having a broader meaning or the same meaning in the specification and the drawings may be replaced by the different term in any place in the specification and the drawings.

In the second embodiment, the terminal devices 20 may be provided with each game by a single server 10 or a plurality of servers 10 may operate in conjunction with one another to construct a server system to provide the terminal devices 20 with each game.

In the second embodiment, the game provided by the server 10 is executed by the terminal device 20. Alternatively, an operation input may be omitted, and the functions of the processing unit 20 and execution of the game program by the terminal device 20 described above may be executed by the server 10, and the terminal device 20 may implement the game described above by executing image display through an operation input and streaming.

Furthermore, the second embodiment may be implemented by a single game device having the functions of the server 10, that is, a (standalone) device that operates independently without depending on other devices such as the server. In this case, a plurality of input terminal devices may be provided.

Such a plurality of game terminal devices may be connected to each other in a wired or wireless manner, and one game device may function as the server 10, and a plurality of game devices may implement the game.

In the second embodiment, the game system according to the invention is applied to the server 10 that executes the game while cooperating with the terminal device 20 via the network. Alternatively, the invention can be applied to a tablet type information terminal device, a personal computer, or a game device installed in an amusement park.

The invention includes substantially identical configurations (for example, configurations having identical functions, methods, and results, or configurations having identical objects and advantageous effects) as in the configuration described in the second embodiment. Further, the invention includes configurations in which non-essential portions of the configurations described in the second embodiment are replaced. Further, the invention also includes configurations that achieve identical advantageous effects and configurations capable of achieving identical objects as in the configurations described in the second embodiment. Further, the invention includes configurations in which a publicly known technology is added to the configurations described in the second embodiment.

The second embodiment of the invention has been described in detail above, but those skilled in the art will readily appreciate that various modifications can be made from the embodiment without materially departing from the novel teachings and effects of the invention. Accordingly, all such modifications are assumed to be included in the scope of the invention.

3. Third Embodiment

Next, a game system according to a third embodiment of the invention will be described with reference to FIGS. 19 to 26.

3.1 Game System

The game system 1 of the third embodiment has the same configuration as the first embodiment illustrated in FIG. 1, and thus the same reference numerals will be assigned to the same reference numerals, and descriptions thereof will be omitted.

3.2 Server

The server 10 according to the third embodiment illustrated in FIG. 2 is different from that in the first embodiment only in functions of some of the members, meaning that the other members and their functions are the same between the embodiments. Thus, the same members or the members with the same functions (including members having the same functions as well as other functions) are denoted with the same reference numerals and the description thereof will be omitted. The functions different from those in the first embodiment will be described below.

The reward control unit 108 executes reward control processing of setting, when a mission is determined to have been accomplished by a corresponding option set player or option player's player character, a corresponding reward to be acquired by the player as in the first embodiment.

The reward control unit 108 executes reward change processing of changing a reward that is a content of an advantage to be acquired by the option set player, when the mission is determined to be completed based on a detection result of the game status detection processing.

3.3 Terminal Device

The terminal device 20 according to the third embodiment has the same configuration as that in the first embodiment illustrated in FIG. 3, and thus the common members are denoted with the same reference numerals, and the description thereof will be omitted.

3.4 Method According Third Embodiment

3.4.1 Overview

Next, an overview of a method of the third embodiment (game processing during advantage option setting including reward change processing) will be described with reference to FIG. 19.

Figure 19:
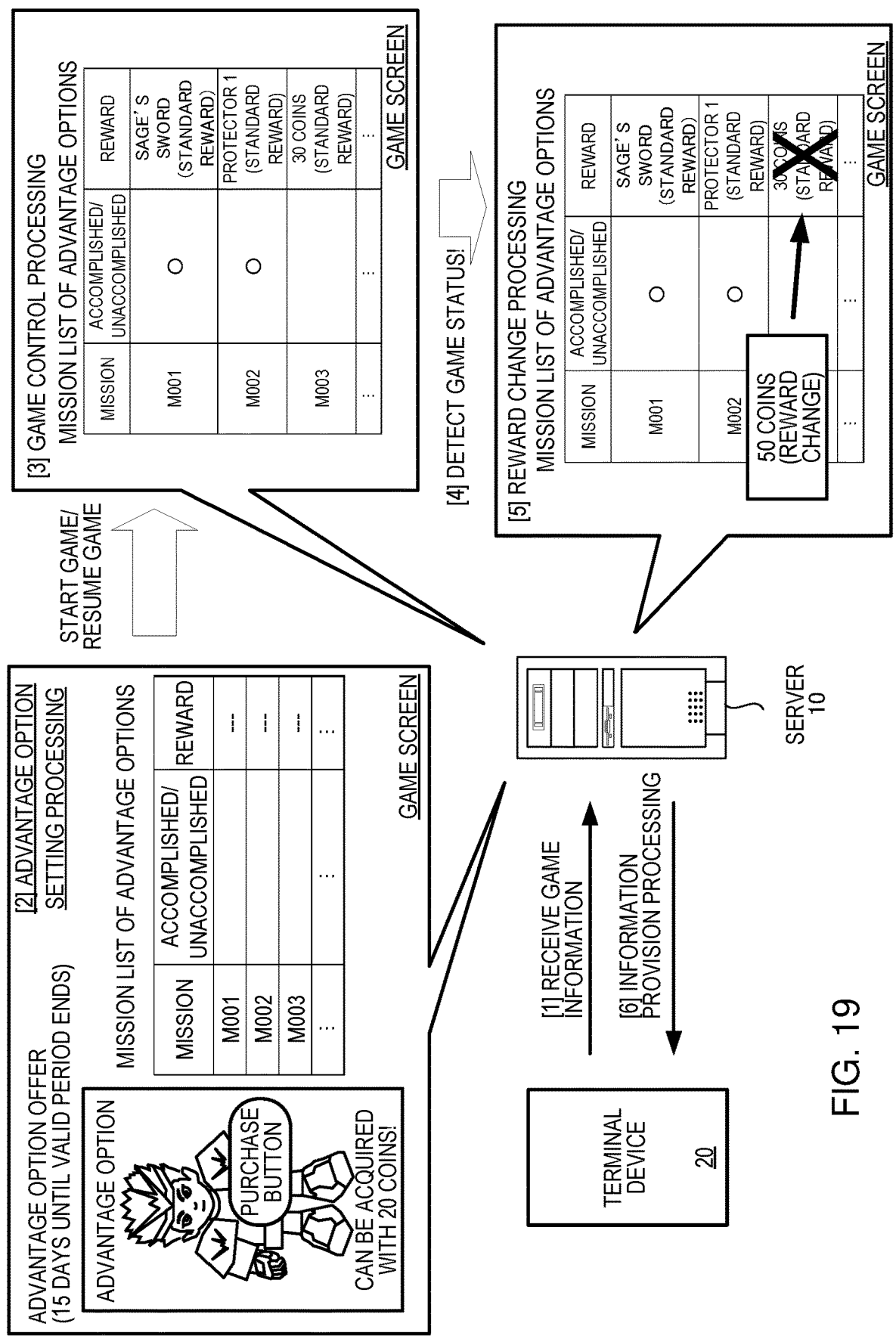
FIG. 19 is a diagram illustrating game processing during advantage option setting including reward change processing according to the third embodiment.

FIG. 19 is a diagram illustrating game processing during advantage option setting including the reward change processing according to the third embodiment.

The server 10 according to the third embodiment is configured to cooperate with the terminal device 20 to execute a game such as a match-up game, examples of which include a combat game and fighting game, an RPG, or a simulation game, based on an operation performed by each player input using the terminal device 20, while providing to the terminal device 20, game information such as a player character and other characters, game space or a part thereof, game parameter, BGM, and game scenario for each player.

In particular, the server 10 is configured to set a plurality of missions, in an incremental (tiered) manner, to each option set player for which the advantage option has been set, and when it is determined that a given condition (hereinafter, referred to as a "mission accomplishment condition") of each mission is satisfied within a predetermined valid period, sets a reward, as the content of the advantage associated with the mission, to be acquired.

The server 10 is configured to execute in accordance with a game status of each option set player indicating the progress of the game, record, skill, contribution level for activating the game, and level of immersion to the game, the reward change processing of changing the reward acquired by the corresponding option set player when the mission accomplishment condition.

Specifically, the server 10 is configured to execute mission determination processing for each option set player of determining whether an unaccomplished mission among a plurality of missions defined in the advantage option in an incremental manner is accomplished, and upon determining that the mission is accomplished, execute reward control processing of making the reward defined in association with the mission to be acquired by the corresponding option set player, as an advantage treatment in the advantage option.

The server 10 executes the reward change processing of changing the reward thus acquired, in accordance with the game status of the corresponding option set player.

Specifically, the server 10 according to the third embodiment configures a server system that performs game control for executing a given game for the terminal device 20 that is connected via a network and is controlled by the player.

Furthermore, as illustrated in FIG. 19, the server 10 according to the third embodiment is configured to execute reception processing ([1] in FIG. 19) of receiving game information such as an operation instruction from the player via the terminal device 20, and execute game processing of executing a game using a player character (that is, an option player's player character) that is an operation target of the player, based on the operation instruction from the player that has been received.

The server 10 is configured to manage, when the advantage option is set for a player, various types of data including advantage option information which is information about the advantage option defined as the advantage content of the advantage in the game within a given valid period.

Furthermore, as illustrated in FIG. 19, the server 10 is configured to execute (A1) advantage option setting processing of setting, based on an instruction from a player that has been received, an advantage option for the player ([2] in FIG. 19), (A2) game control processing of making, when a game starts or is resumed with the advantage option set, the game progress based on an operation instruction from an option set player for the option set player or an option player's player character that is an operation target of the option set player, and advantage option information associated with the advantage option set for the option set player ([3] in FIG. 19), (A3) game status detection processing of detecting the game status of the option set player related to the game ([4] in FIG. 19), (A4) reward change processing of changing the content of advantage (that is, reward) for the option set player based on the detection result of the game status detection processing ([5] in FIG. 19), (A5) information provision processing of providing game information about various games including information about a changed advantage content to the terminal device 20 ([6] in FIG. 19).

FIG. 19 illustrates a case where (B1) an instruction from a player is received as game information, (B2) an advantage option offered to the player in exchange for 20 coins is set, with a purchase button for the advantage option is pressed (specifically, setting each mission defined for the advantage option for the player), (B3) a game is progressed based on the operation instruction from the option set player and the advantage option information, mission M001 and mission M002 are accomplished and a sage's sword and a protector 1 are obtained as rewards, and currently mission M003 is being challenged, (B4) the game status detection processing of detecting a game status of the game played by the option set player is executed during a game of challenging the mission M003, (B5) processing of changing the reward (hereinafter, referred to as "standard reward") set in advance as an initial value association with the corresponding mission, from "30 coins" to "50 coins" as a result of satisfaction of a given condition by the detection result of the game status detection processing is executed, and (B6) game information including reward information indicating the reward has been given is provided to the corresponding player, as information providing processing.

With this configuration, in the third embodiment, for an option set player having an advantage in the game over a non-option set player having no advantage option set such as acquiring a larger number of rewards or a reward of a higher value (rarity or rank) or level, or easier condition related to the game, the content of the reward to be acquired such as the number or the type of the rewards can be changed in accordance with the game status of the option set player.

Specifically, in the third embodiment, the advantageous effect enjoyed by the option set player based on the game status can be changed in accordance with the game progress status, to make the option set player more focused on the game or more motivated to play the game or actively interact with other players.

Thus, with the third embodiment, the game can be more entertaining, by increasing the motivation to acquire the advantage option as well as the attractiveness of the advantage option, and with the advantage option itself involving the playability.

Similarly, the "valid period" according to the third embodiment is, for example, an initially set period (also referred to as a season) between a predetermined game start timing and a predetermined end timing set regardless of an event in the game, or may be a period from a predetermined game start timing or a start timing of a certain event such as a start of a battle, to a timing arriving in association with an event such as the option player's player character reaching a goal, as in the first embodiment.

The player character according to the third embodiment includes, for example:

(C1) a character that is operated by a player;

(C2) a character that automatically operates based on instructions (commands) from the player;

(C3) a character such as an enemy character to compete with in the match-up game;

(C4) a character that cooperates in the game;

(C5) a character that is operated by another player (including instruction); and (C6) a character (NPC) that operates based on an instruction from a computer, as in the first embodiment. Note that in the following description, the character (C1) is the player character unless otherwise noted.

It should also be noted that each of the characters described above is not limited to a human-type character, and may be a robot, ride, or animal character for example.

3.4.2 Advantage Option Information 3.4.2.1 Advantage Option

The advantage option according to the third embodiment is the same as the advantage option according to the second embodiment, and thus the description thereof will be omitted.

3.4.2.2 Mission

The mission according to the third embodiment is the same as the mission according to the second embodiment, and thus the description thereof will be omitted.

3.4.2.3 Reward

The reward according to the third embodiment is the same as the reward according to the second embodiment, and thus the description thereof will be omitted.

3.4.3 Advantage Option Setting Processing

The advantage option setting processing according to the third embodiment is the same as the advantage option setting processing according to the second embodiment, and thus the description thereof will be omitted.

3.4.4 Mission Determination Processing

Instead of managing the option status of the corresponding option set player based on the identified mission accomplishment condition as in the first embodiment, the mission management unit 107 according to the third embodiment manages the game status of the corresponding option set player based on the identified mission accomplishment condition.

The mission management unit 107 executes mission determination processing of determining whether the mission accomplishment condition is satisfied.

3.4.5 Reward Control Processing

Next, the reward control processing according to the third embodiment will be described.

When a mission is determined to be accomplished (that is, when the corresponding mission accomplishment condition is determined to be satisfied) by the mission determination processing, the reward control unit 108 executes, for each option set player or for each option player's player character, reward control processing of making a given reward acquired by the player (that is, the terminal device 20) as in the first embodiment.

Then, the reward control unit 108 searches the reward information based on the identified reward ID, and executes the reward control processing of making the reward acquired by the corresponding option set player based on the reward information with the corresponding reward ID.

3.4.6 Game Status Detection Processing

Next, the game status detection processing according to the third embodiment will be described.

Basic Principle of Game Status Detection Processing

The status detection unit 106 executes, for each option set player for which an advantage option is set, game status detection processing of detecting as the game status, information (hereinafter, referred to as "game element information") about a game-related index or a state of each player at a certain timing, within a valid period.

Specifically, the status detection unit 106 executes the game status detection processing of detecting the game status such as:

(A1) a parameter (hereinafter, referred to as "varying game parameter") of an individual player or a player character that varies as the game progresses, such as a level and experience points;

(A2) game element information indicating at least one of whether the player or player character has a game element and the type of the game element;

(A3) information (hereinafter, also referred to as "game action information") about at least one of whether a player has made a game action such as a login and advantage option acquisition timing, and a temporal element (such as timing or period) related to the game action; or (A4) information (hereinafter, also referred to as "related player information") about another player (hereinafter, referred to as "related player") related to the player.

The status detection unit 106 instructs the reward control unit 108 to execute the reward change processing of changing the advantage content (that is, a reward) in accordance with the game status detected.

The status detection unit 106 basically detects any of the game elements (A1) to (A4) as the game status, but may also detect two or more of these game elements as the game status.

Game Status Detection Processing for Varying Game Parameter

The status detection unit 106 may execute the game status detection processing of detecting the varying game parameter of the option set player or option player's player character as the game progresses, as the game status.

Specifically, in the third embodiment, parameters (that is, a parameter expressed as a numerical value such as a player level or experience points) indicating an index of the player in the game such as a record, progress, and skill of the player in the game can be detected as the game status. Thus, the advantage content can be changed to be advantageous based on such parameters.

Specifically, the status detection unit 106 detects the current or past varying game parameter of the corresponding option set player and option player's player character, which is one or a plurality of parameters such as a player level, a player character level, a billing amount (total billing amount within a certain period or from the start of the game), experience points, points, game currency amount, and the number of items possessed.

The status detection unit 106 instructs the reward control unit 108 to execute the reward change processing of changing the advantage content (that is, a reward) in accordance with the detected game status.

Game Status Detection Processing for Game Element

The status detection unit 106 may execute game status detection processing of detecting, as the game status, information indicating at least one of whether the option set player or the option player's player character has a game element and the type of the game element.

Specifically, in the third embodiment, the information indicating at least one of whether the game element is possessed and the type of the game element is detected, and the advantage content can be changed to be advantageous based on such information.

Specifically, the status detection unit 106 detects as the game status, the current or past game element of the corresponding option set player or option player's player character, which is one or a plurality of items possessed by the option set player or option player's player character, whether the character possesses the item (including the number of the items possessed), and the type of the possessed item.

Game Status Detection Processing for Game Action and its Temporal Element

The status detection unit 106 may execute game status detection processing of detecting as the game status, information indicating at least one of a game action related to the option set player or option player's player character and a temporal element related to the game action.

Specifically, in the third embodiment, for each option set player, whether the current time point is in a period during which the advantage is given can be detected by detecting an index of a player such as a contribution level for activating the game or level of immersion, or by detecting whether the current timing point is within an advantage period immediately after the acquisition of the advantage option, whereby the advantage content can be changed to be advantageous based on these.

Specifically, the status detection unit 106 detects as the game statuses, various game actions such as login, game execution (play), billing, acquisition of (paid or free) advantage option, and participation in an event such as a lottery event (including gacha) or a minigame.

The status detection unit 106 detects as the game status, a temporal element related to the game action which is the various above described game actions corresponding to a timing based temporal element or a continuous temporal element.

Specifically, the status detection unit 106 may detect as the game status, a game action performed by the option set player or option player's player character at a given timing, as a timing based temporal element.

The status detection unit 106 may detect as the game status, an access status to the game as the game action performed by the option set player as the continuous temporal element.

For example, the status detection unit 106 detects as the game status corresponding to the timing based temporal element related to various game actions, (B1) a timing when an advantage option is set, (B2) login timing (certain login timing such as a first login timing, or plurality of login timings), (B3) a billing timing (billing timing for a reward such as the first billing timing), (B4) a timing at which the billing reaches a certain amount, (B5) a game start timing, (B6) a timing when a certain level is reached, and (B7) a timing when a certain item is acquired.

For example, the status detection unit 106 detects as the continuous temporal element related to various game actions, (C1) a login count (access count),
(C2) a login frequency (consecutive login days and the number of accesses in a day), and
(C3) an access time to the game (within a valid period, a total time from the start of the game, and within a certain period).

The status detection unit 106 detects as the game status, a game action or a temporal element of the game action within a valid period and a period in which the advantage option is set, but may also detect a game status within a given special period with respect to the valid period.

Specifically, the status detection unit 106 may detect the game status within a given special period with respect to a valid period.

Specifically, the status detection unit 106 may detect as the game status, each of the temporal elements (B1) to (B7) and (C1) to (C3) described above within a period before the valid period and after the advantage option has been set, an overall period over the entirety of the game, or a certain period (that is, an event period) in the valid period or the overall period.

For example, when the advantage option is set within a period before the valid period and after the advantage option has been set, an overall period over the entirety of the game, or a special period such as a given event period in the valid period, the status detection unit 106 detects as the game status, the temporal element such as the timing when the advantage option is set.

For example, for the option set player who has acquired the advantage option in advance, that is, before the valid period starts, the status detection unit 106 may detect this status as the game status with the period before the valid period regarded as the special period, to change the advantage content to be better than that of the option set player for which another advantage option is set before the valid period starts.

Game Status Detection Processing for Related Player

The status detection unit 106 may execute game status detection processing of detecting as the game status, information (hereinafter, referred to as "related player information") about another player related to the option set player.

Specifically, the related player information includes: information about a player in a predetermined relationship with the option set player; and information about a player index and active or inactive state (not only including whether the number of currently active users is large or small, but also includes a load element on a system provided the game such as a server) indicating whether the game is actively played.

For example, in the third embodiment, the game status is based on the number of and types of other players in a friend relationship indicating a certain relationship with other players, such as a friend or a follower and includes:
(D1) closeness to another player;
(D2) contribution to activation of the game;
(D3) a team status (the scale of the team, a status indicating whether the team is winning or losing in the game, teamwork (whether the team record is good or bad));
(D4) the scale of the game (the number of players registered to participate in the game as a whole);
(D5) the number of active users (percentage of the players currently participating in the game or participated in the game in the past);
(D6) a time zone (for example, in units of hours) in which the game is in a less popular state (or not in a less popular state);
(D7) a load on a system providing the game such as a server; and
(D8) a percentage of players who possess the advantage option or a rate of players who acquired the advantage option in the past (advantage option acquisition rate).

The game status detected in this case is preferably an element that can be basically defined using numerical values.

In this case, the game status not only includes elements directly detected, but also includes elements calculated based on (D1) to (D8) described above, such as the time zone in which the game is less popular as in (D6) described above calculated as a ratio of the number of active users to the number of players currently registered to participate.

Specifically, to detect as the related player information, the game status as the closeness or a contribution to the vitalization of the game, the status detection unit 106 detects:
(E1) the number of friends or followers or their level or record;
(E2) a communication count or frequency, such as the number of comments or emails sent/received during the game;
(E3) view count and frequency of player information; and
(E4) the number of times and frequency of exchange (handover) of an item with another player, for example.

To detect the team status as the related player information, the status detection unit 106 detects as the game status, the number of members in a team, a team record, the number of times or rate of successful team play (a combination play such a combo).

To detect the team scale as the related player information, the status detection unit 106 detects as the game status, the number of all the players registered in the game and the record of each player.

To detect as the related player information, the number of active users or the time zone in which the number of players is smaller or is not small, the status detection unit 106 detects as the game status, the number of players currently participating (accessing) or the number of players who have accessed in the past.

To detect the acquisition rate of the advantage option as the related player information, the status detection unit 106 detects as the game status, the number of players currently possessing the advantage option or the number of players who acquired the advantage option in the past.

3.4.7 Reward Change Processing

Next, the reward change processing according to the third embodiment will be described with reference to FIGS. 20 to 23. FIGS. 20 to 23 are diagrams illustrating the reward change processing according to the third embodiment.

The reward control unit 108 executes, for each option set player, the reward change processing of changing the advantage content for the option set player based on the detection result of the game status detection processing.

Specifically, the reward control unit 108 changes the content of the reward (that is, the standard reward) set as an initial value in association with the corresponding mission based on the game status that is.
(A1) a varying game parameter;
(A2) game element information indicating at least one of whether the player or player character has a game element and the type of the game element;
(A3) information (hereinafter, also referred to as "game action information") about at least one of whether a player has made a game action such as a login and advantage option acquisition timing, and a temporal element (such as timing or period) related to the game action; or (A4) related player information.

Specifically, as the reward change processing, the reward control unit 108 changes the reward that is the advantage content in accordance with the game progress (the numerical value expressing the game progress), the access status, or a status in a valid period or the entire game period of the option set player.

In each reward information, reward change information for changing the content of the reward for each predetermined game status, and when the corresponding game status is detected, the reward control unit 108 searches the reward information about the reward already set, for reward change information, and changes the reward content based on the corresponding reward change information.

Reward Change Processing Based on Varying Game Parameter

When the varying game parameter which is the past or current record or the option set player or the current billing amount is detected as the game status, the reward control unit 108 may execute, in accordance with the reward change information, the reward change processing of increasing, as the record becomes higher or the total billing amount increases, ability value, rarity, value, experience points, strength value, or a percentage of item/player character/opponent character (enemy character) desired by the option set player to be acquired in a lottery event (gacha)/appear in the game field or the number of such elements acquired defined in the standard reward, or updating the standard reward through the addition of a new ability or the like.

For example, a case is assumed where the reward change processing is executed with player character A being the operation target of the option set player, with the personal record is detected as the game status, with the mission M003 being challenged, and with the acquisition of 30 coins defined as the standard reward.

In this case, as illustrated in FIG. 20, the reward control unit 108 executes reward change processing of incrementing the number of coins as a standard reward or a reward that has been changed by 10, each time the mission management unit 107 detects winning in a match against the enemy character.

FIG. 20 illustrates a case where the reward is changed by the advantage option information with the game status indicating a case where the number of wins against the enemy character is one, and a case where the number of wins against the enemy character is seven.

For an advantage option in which a plurality of missions are defined in an incremental manner based on levels so that the missions are to be accomplished in an ascending order of the level, the reward control unit 108 similarly executes, when the current or past record or billing amount of the option set player is set as the game status, reward change processing of changing the standard reward to a reward obtained by a higher level unaccomplished mission each time the record reaches a certain record or higher, or each time the total billing amount reaches a certain amount or more, in accordance with the reward change information.

In this case, the reward control unit 108 may change the reward to that obtained from an unaccomplished mission with a higher level, in accordance with a record (that is, for a higher record) or in accordance with a billing amount (that is, for a larger billing amount), based on the reward change information.

Furthermore, in this case, the reward control unit 108 may change the acquired order of the standard reward from the next mission and after, by changing the standard reward from the next mission and after to a reward from an unaccomplished mission with a higher level, based on the reward change information.

For example, a case is assumed where the reward change processing is executed on the option set player that is an operation target of the player character A under the following condition. Specifically, the personal record is detected as the game status. By accomplishing the missions one by one, a bronze sword, an increase in the sword attack power (+10), a sage's sword, and a hyper sage's sword can be acquired in this order as standard rewards. The mission M002 is currently being challenged. The standard reward changes to the one acquired from the mission with one level higher, each time the record of the match against the enemy character reaches 10 wins.

Figure 21:
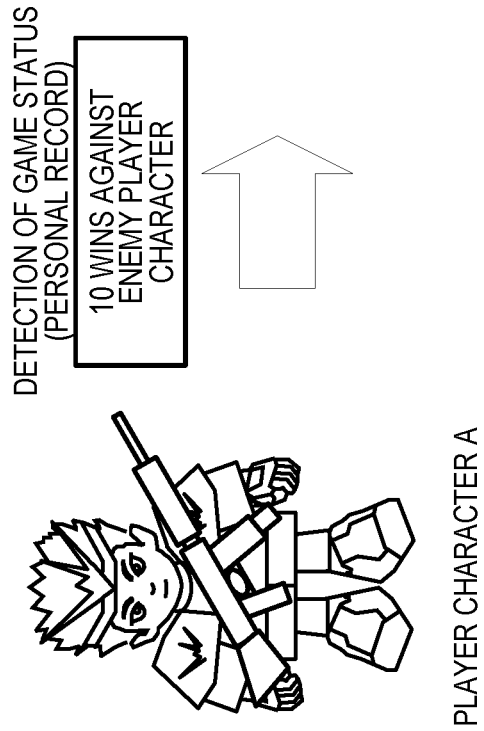
FIG. 21 is a diagram illustrating reward change processing executed by the reward control unit according to the third embodiment.

In this case, as illustrated in FIG. 21, the reward control unit 108 executes reward change processing of changing the standard reward to the "sage's sword" that is a reward from the next mission M003, when the mission management unit 107 detects 10 wins in matches against the enemy character.

In this case, the standard reward from the mission M003 changed from the reward from the mission of the previous level may be changed to the standard reward of one level higher (changed to the sage's sword hyper) or may be randomly changed (randomly changed to one of rewards that are to be acquired and are items not possessed by the option set player for example) to another reward (for example, a sage's shield).

When the past or current record or billing amount of the option set player is detected as the game status, the reward control unit 108 may execute reward change processing of changing a standard reward "one or more unacquired rewards the acquirable timing of which has been passed (for example, daily bonuses that can be acquired by logging in every day)" to an "acquired reward as a result of raising the rank of unacquired daily bonus by one" in accordance with the reward change information.

For example, as illustrated in FIG. 22, a case is assumed where the player is in day 7 of a login bonus challenge after acquiring the actual login bonuses in day 1, day 3, and day 4, and the standard reward of enabling an unacquired login bonus to be acquired is changed to "acquired reward as a result of raising the rank of unacquired daily bonus by one", as a result of satisfying a mission accomplishment condition "billing reaching a certain amount" in a mission set to an advantage option.

In this case, as illustrated in FIG. 22, the reward control unit 108 makes unacquired login bonuses defined for day 2, day 5, and day 6 to be acquired as normal rewards (when the billing amount has not reached a certain amount).

On the other hand, when the billing amount reaches a certain amount and thus the normal reward is changed to "reward as a result of raising the rank unacquired daily bonuses by one" by the reward change processing, the reward control unit 108 makes rewards as a result of raising the ranks of the unacquired login bonuses defined for day 2, day 5, and day 6 by one ("dance 1" changed to "super dance 1", "silver level" changed to "gold medal", and "sage's stone" changed to "sage's stone hyper") acquired.

Reward Change Processing Based on Game Element

When the game element including the type or the number of certain items possessed in the past or currently possessed is detected as the game status, the reward control unit 108 may execute reward change processing of increasing the ability value, rarity, or value defined in the standard reward or upgrading the version of the standard reward such as adding new ability, in accordance with the reward change information.

When the type or the number of certain items possessed in the past or currently possessed is detected as the game status, the reward control unit 108 may execute reward change processing of checking the type of the item to be acquired as the standard reward, and changing the item as the standard reward to another reward (a reward defined in another mission for example) of a different type when the item is the same as a certain one of the items possessed, in accordance with the reward change information.

In this case, when an item selected by a lottery processing such as gacha is acquired as a standard reward, the reward control unit 108 may execute reward change processing of zeroing or lowering the chance of winning an item that is the same as the certain possessed item.

In this case, when an item selected by a lottery processing such as gacha is acquired as a standard reward, the reward control unit 108 may execute reward change processing of identifying an item frequently used by the option set player in the game so far, and changing the standard reward to the item thus identified, or of increasing the chance of winning the item that is the same as the frequently used item by the factor of five, if an item selected by lottery processing such as gacha is acquired.

Reward Change Processing Based on Game Action and its Temporal Element

When a game action and its temporal element are detected as the game status, and when the corresponding mission is accomplished within a specific period such as a certain period immediately after the advantage option has been set, the reward control unit 108 may execute reward change processing of increasing the ability value, rarity, or value defined in the standard reward or upgrading the version of the standard reward such as adding new ability, in accordance with the reward change information.

When the corresponding mission is accomplished within the specific period in a similar case, the reward control unit 108 executes reward change processing of changing the standard reward to a reward from an unaccomplished mission with a higher level, in accordance with the reward change information.

For example, a case is assumed where with reward change processing on the option set player the operation target of which is the player character A the reward acquirable by accomplishment of each mission within 72 hours from the timing when the advantage option is set is changed from the standard reward to a reward of a higher grade.

Figure 23:
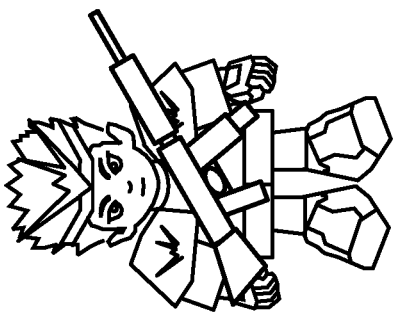
FIG. 23 is a diagram illustrating reward change processing executed by the reward control unit according to the third embodiment.

In this case, as illustrated in FIG. 23, when the advantage option is set, the reward control unit 108 executes reward change processing of changing rewards acquired by accomplishment of missions M001 to M003 respectively from the standard reward "sage's sword" to "sage's sword hyper", from the standard reward "protector 1" to "bronze protector", and from the standard reward "30 coins" to "100 coins", when the accomplishment is within 72 hours from the setting of the advantage option.

FIG. 23 illustrates the reward acquirable from each mission changing to the standard reward, when the mission accomplished after 72 hours from the setting timing of the advantage option.

In this case, the reward control unit 108 may change a reward to that obtained from an unaccomplished mission with a higher level, in accordance with a timing at which the mission is accomplished within a specific period (that is, earlier timing of the mission accomplishment relates to a higher level) in accordance with the reward change information.

When the access time, login count, or login frequency (whether the player has logged in once in every predetermined period, such as once a day) of the option set player is detected as the game action and temporal element, the reward control unit 108 may execute reward change processing of increasing the ability value, rarity, or value defined in the standard reward to be larger when the access time is longer, the login count is larger, or the login frequency is higher (for example, a longer login period within each predetermined period), or upgrading the version of the standard reward such as adding a new ability, in accordance with the reward change information.

For an advantage option in which a plurality of missions are defined in an incremental manner based on levels so that the missions are to be accomplished in an ascending order of the level, the reward control unit 108 similarly executes, when the access time, the login count, or the login frequency of the option set player is set as the game status, reward change processing of changing the standard reward to a reward obtained by a higher level unaccomplished mission each time the access time, the login count, or the login frequency reaches a certain level or higher, in accordance with the reward change information.

In this case, the reward control unit 108 may change the standard reward to a reward from an unaccomplished mission with a higher level in accordance with the access time, the login count, or the login frequency (that is, for a longer access time, a larger login count) or may change the acquisition order of the standard rewards from the next mission or after so that a standard reward acquired from the next mission and after to a reward acquired from an unaccomplished mission with a higher level, in accordance with the reward change information.

Reward Change Processing Based on Related Player Information

When the related player information such as the number of friends of the option set player or a team record of the team of the option set player is detected as the game status, the reward control unit 108 may execute, in accordance with the reward change information, the reward change processing of increasing, as the number of friends increases or the team record becomes higher, ability value, rarity, value, experience points, strength value, or a percentage of items/ player characters/opponent characters (enemy characters) desired by the option set player to be acquired in a lottery event (gacha)/appearance rate in the game field or the number of such elements acquired defined in the standard reward, or updating the standard reward through the addition of a new ability or the like.

For an advantage option in which a plurality of missions are defined in an incremental manner based on levels so that the missions are to be accomplished in an ascending order of the level, the reward control unit 108 similarly executes, when the related player information such as the number of friends of the option set player or the team record of the option set player is set as the game status, reward change processing of changing the standard reward to a reward obtained by a higher level unaccomplished mission each time the number of friends reaches a certain number or more or the team record reaches a certain level or higher, or each time the total billing amount reaches a certain amount or more, in accordance with the reward change information.

In this case, the reward control unit 108 may change the reward to that obtained from an unaccomplished mission with a higher level, in accordance with the number of friends (that is, for a larger number of friends) or in accordance with a team record (that is, for a higher team record), based on the reward change information.

Furthermore, in this case, the reward control unit 108 may change the acquired order of the standard reward from the next mission and after, by changing the standard reward from the next mission and after to a reward from an unaccomplished mission with a higher level, based on the reward change information.

When the number of friends or the team record is detected as the game status as described above, the reward control unit 108 may execute reward change processing of changing a standard reward to a reward of enabling acquisition of one or more unacquired rewards the acquirable timing of which has been passed (for example, daily bonuses that can be acquired by logging in every day), in accordance with the reward change information.

The above description is given using the number of friends and team record as an example, but the reward change processing is executed in a manner that is the same as that described above, also when the other types of related player information such as the number of registrations in the game or the number of active users.

3.4.8 Information Provision Processing Related to Display Control

Next, information provision processing related to display control according to the third embodiment will be described.

The information provision unit 110 provides to the corresponding terminal device 20 during the game, various types of game information related to control and display for the game, as well as information related to a reward such as advantage option information, mission information, or reward information set for each player, at a given timing (when the game starts, during the game, or when the game ends) as display control information displaying the information on an image related to the game being executed by the terminal device 20.

Specifically, the information provision unit 110 provides to the terminal device 20, the information related to the obtainable advantage option, set advantage option, and set mission or the information related to the reward acquirable from the mission, as the display control information, at a given timing including:
(A1) a timing when the advantage option is started to be provided;
(A2) a timing when the advantage option is set;
(A3) a timing when a new mission is set;
(A4) a timing when the reward is obtained; or
(A5) a timing when the reward is changed.

The information provision unit 110 provides to the corresponding terminal device 20, the game information as a display related to the mission, which is information including, for example:
(B1) the content of the mission (the type of the mission, the type and the number of enemy characters to be defeated, or a description on a stage and a specific item obtained);
(B2) the fact that the mission is set and the content of the reward obtained when the mission is accomplished;
(B3) mission accomplishment condition;
(B4) reward changed by the reward change processing; and
(B5) a condition for changing the reward (condition to be satisfied by the game status).

For the option set player for which the advantage option, the information provision unit 110 may generate the display control information for displaying a list of rewards that have been obtained and rewards acquirable in the future, and provide the display control information thus generated to the corresponding terminal device 20.

In this case, the information provision unit 110 may generate display control information for displaying an item name and an image of each reward, when the list of rewards that have been obtained and rewards to be obtained is displayed.

When the mission accomplishment status is displayed, the information provision unit 110 may generate display control information for displaying information indicating that each mission is unaccomplished or accomplished for each option set player or player or character that is the operation target of the option set player, and provide the display control information thus generated to the corresponding terminal device 20.

3.4.9 Modification

Figure 24:
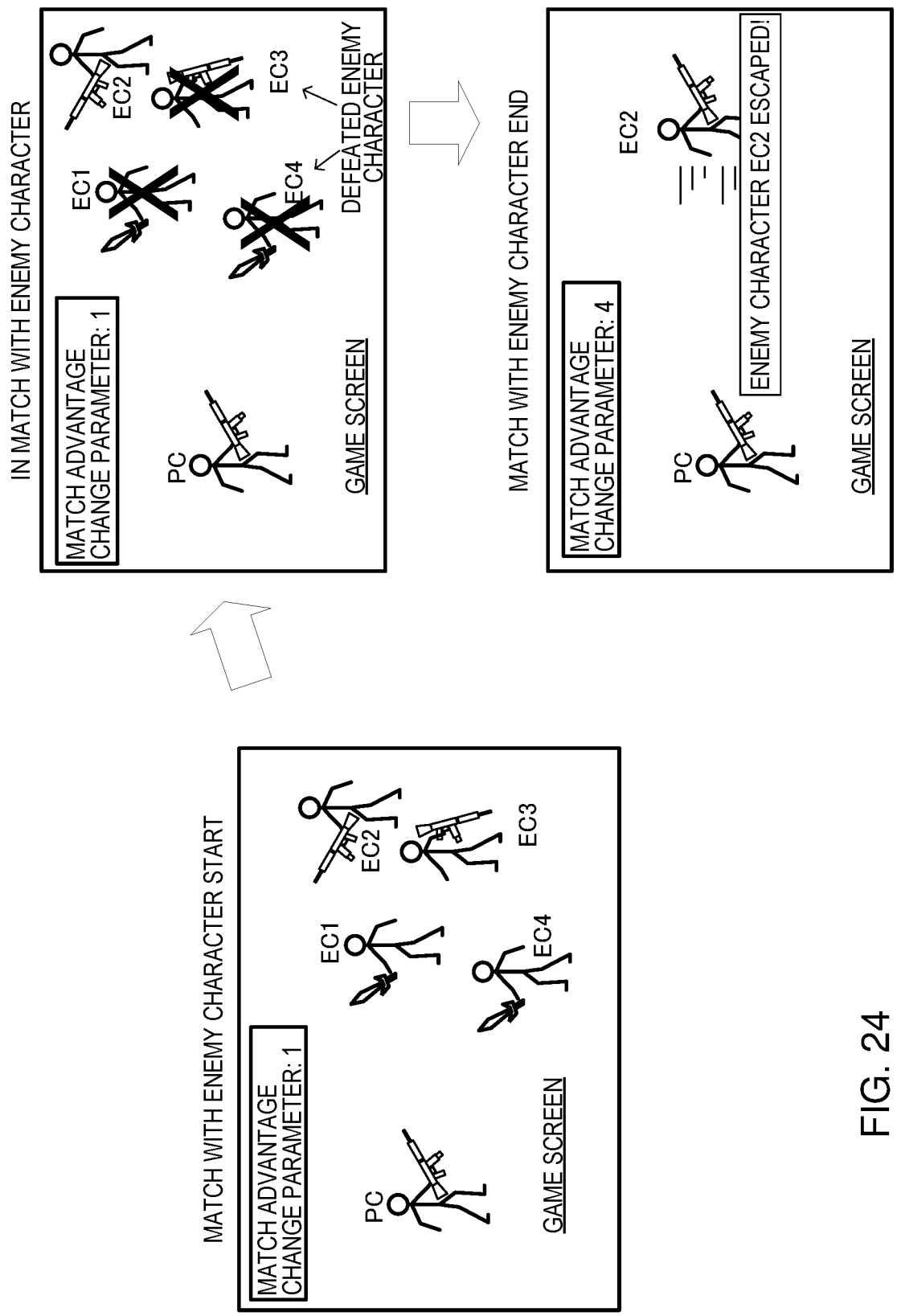
FIG. 24 is a diagram illustrating a modification of the reward change processing according to the third embodiment.

Next, a modification (modification of the reward change processing) of the third embodiment will be described with reference to FIG. 24. FIG. 24 is a diagram illustrating the modification of the reward change processing according to the third embodiment.

In the reward change processing, the reward control unit 108 may execute reward change processing of:
(A1) detecting, for each type of game action such as the option player's player character being in a match or accomplishing a task in the game, an advantage change parameter for changing the reward as the advantage content, the advantage change parameter varying in accordance with the game status as a result of each game action; and
(A2) changing, based on advantage change parameters thus detected, the respective advantage contents.

Specifically, the reward control unit 108 according to the present modification is configured to be capable of changing, based on each advantage content change parameter changing in accordance with the game status as a result of each game action, the corresponding reward or the content of the reward, while being capable of focusing on the reward or the reward content to be changed for the sake of the player, since the type of the game action is directly related to the reward or the reward content to be changed.

With the present modification, the reward or the content thereof can be easily changed as desired by the player in this manner, whereby the game can be more entertaining.

Specifically, for example, the reward control unit 108 sets in advance,
(B1) an advantage change parameter (hereinafter, referred to as "match-up advantage change parameter") varying in accordance with the game status regarding a match against an enemy character (including an NPC and a player character that is an operation target of another player); or
(B2) an advantage change parameter (hereinafter, referred to as "task advantage change parameter") varying in accordance with a clear status of a task such as an acquisition of a specific item, finishing in a certain place in a race game, or clearing a certain stage.

The reward control unit 108 changes the match-up advantage change parameter in accordance with a game status regarding a match, or changes the task advantage change parameter in accordance with a game status regarding a task.

When a mission is determined to be accomplished (that is, when the mission accomplishment condition is determined to be satisfied), the reward control unit 108 changes the number, type, and options of standard rewards, as well as an effect of making a player or a player character as an operation target of the player advantageous in accordance with the advantage change parameter at that point, and makes the reward as a result of the change acquired by the option set player.

Specifically, the reward control unit 108 controls the content of the change in the reward in accordance with the type of the advantage change parameter.

Regarding the match-up advantage change parameter, when the standard reward is an item required for a match, the reward control unit 108 multiplies the number of standard rewards by a value K of the match-up advantage change parameter, and makes the standard rewards in the factor of K acquired by the corresponding option set player.

For example, a case is assumed where the current value of the match-up advantage change parameter of a player character PC is "1", and the match-up advantage change parameter is incremented by "1" when the player character PC defeats an enemy character EC and is decremented by "1" when the player character PC is defeated by the enemy character EC.

In this case, when three enemy characters EC are defeated, the reward control unit 108 increments the match-up advantage change parameter by "3", and thus changes the match-up advantage change parameter to "4" as illustrated in FIG. 24.

In this state, when the mission accomplishment condition is accomplished so that an item "gun" is acquired as the standard reward, the reward control unit 108 makes the player character A acquire the item "gun" with the attack power changing from "10" to "40".

Regarding the task advantage change parameter, when the type of the standard reward is an item required for a task, the reward control unit 108 may multiply the number of standard rewards by a value K of the task advantage change parameter, and makes the standard rewards in the factor of K acquired by the corresponding option set player.

When the standard reward is usable for a match and for a task, the reward control unit 108 may multiply a value of an ability related the match in a standard reward (that is, match ability value) by a value K1 of the match-up advantage change parameter, multiply a value of an ability related to the task in the standard reward (that is, a task ability value) by a value K2 of the task advantage change parameter, and make the corresponding option set player acquire the standard reward having the match ability value multiplied by K1, and the task ability value multiplied by K2.

For example, the information provision unit 110 generates display control information for displaying advantage change parameter values on the game screen as illustrated in FIG. 24, and provides the display control information thus generated to the corresponding terminal device (that is, the terminal device of the option set player) 20.

3.5 Operation in Third Embodiment

Next, operations related to the game processing during the advantage option setting, including the reward change processing executed by the server 10 according to the third embodiment using FIG. 25 and FIG. 26 will be described.

Figure 25:
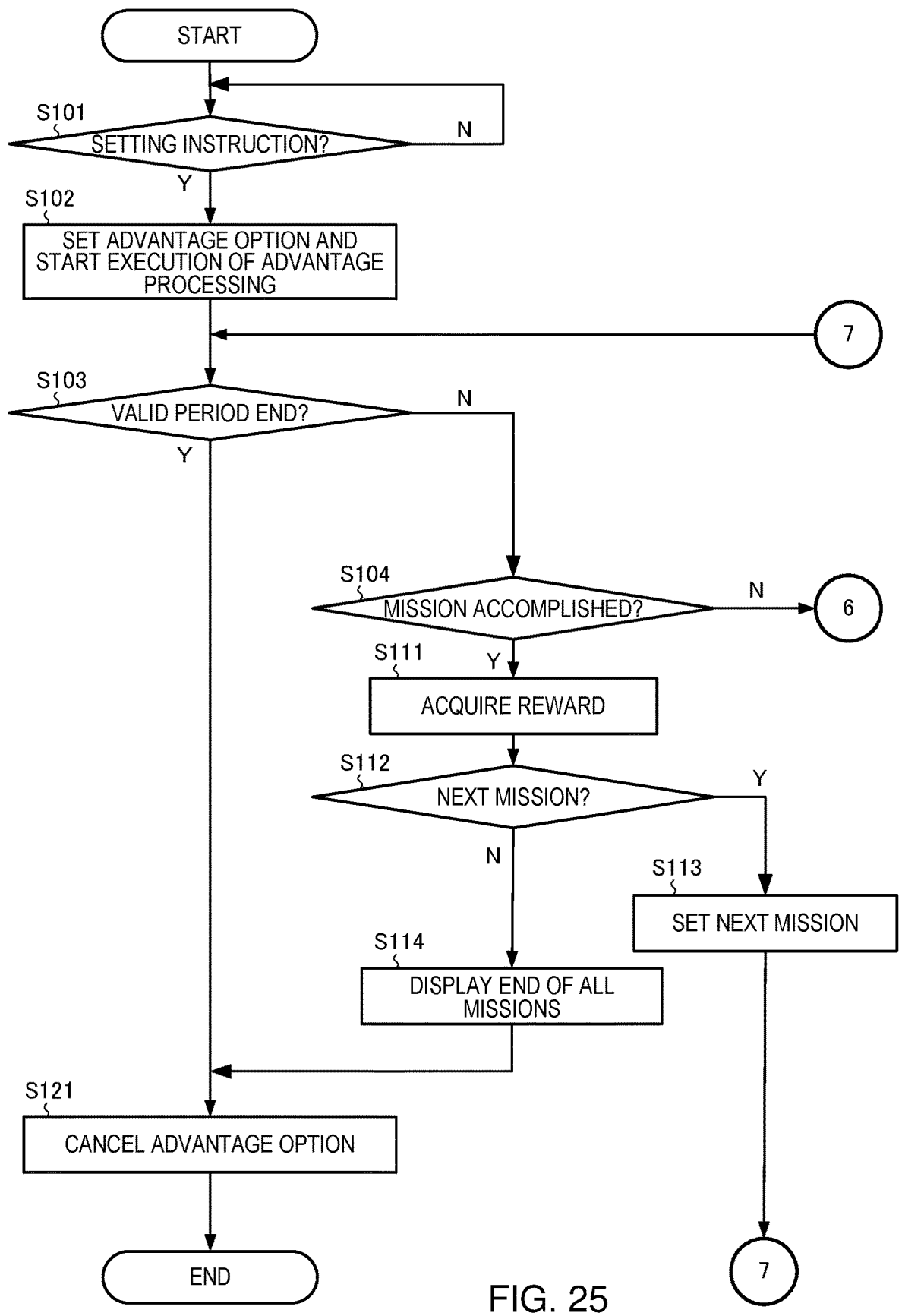
FIG. 25 is a flowchart illustrating operations related to game processing executed with the advantage option set, by a server according to the third embodiment including reward change processing.
Figure 26:
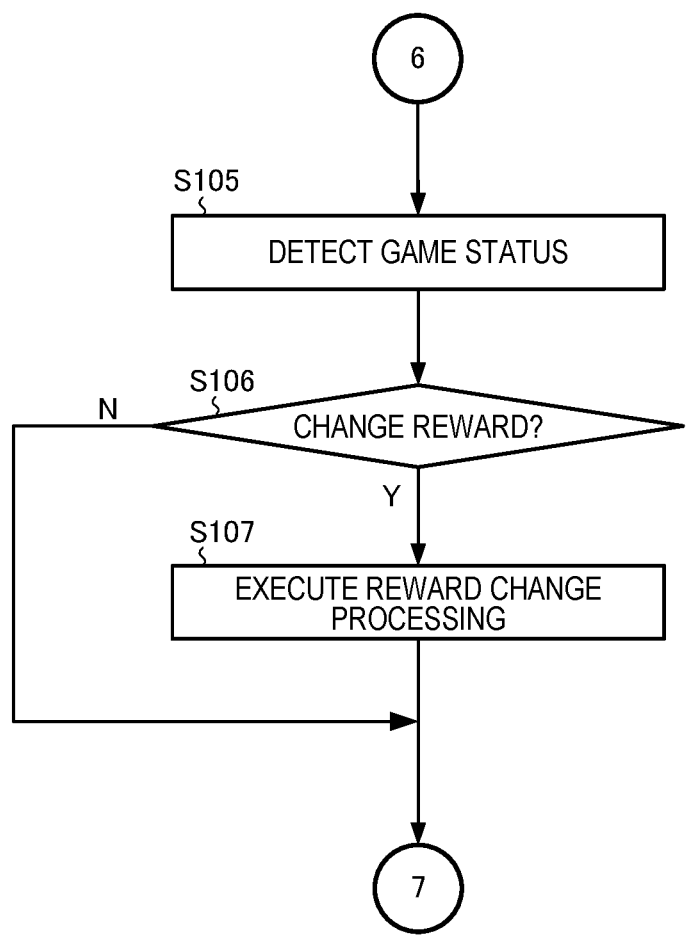
FIG. 26 is a flowchart illustrating operations related to game processing executed with the advantage option set, by the server according to the third embodiment including reward change processing.

FIG. 25 and FIG. 26 are flowcharts illustrating operations related to game processing executed with the advantage option set, by the server 10 according to the third embodiment including reward change processing.

The operations are operations in a case where the advantage option is set including the reward change processing of changing the content of the advantage content including the game status detection processing and the specification change processing, and related to setting of a mission and acquisition of the reward in response to the accomplishment of the mission.

The operations are executed for each player, and are executed in particular for the option set player for which the advantage option is set.

The operations assume that the player has already registered in and logged into the game, and that the valid period of the advantage option has started.

Specifically, the operations assume that for the advantage option, a plurality of missions with different levels are defined in an incremental manner meaning that missions are cleared one by one in an ascending order of the level, and each time a mission is cleared, the reward corresponding to a mission is automatically acquired and the next mission is set.

In the operations, the game status detected to be used in the reward change processing is assumed to be determined in advance.

First, when the communication control unit 101 receives a setting instruction for the advantage option from the player transmitted from the terminal device 20 (step S101), the option management unit 105 executes the advantage option setting processing of setting an advantage option to a corresponding player based on the instruction from the player, and initiates execution of processing (hereinafter, referred to as "advantage processing") related to the advantage corresponding to the advantage option (step S102).

In this process, the mission management unit 107 sets the first mission defined in the advantage option to the corresponding player and sets the reward corresponding to the mission and is acquired when the mission is accomplished as the standard reward, based on the mission information and the reward information.

Then, the game management unit 103 determines whether the end timing of the valid period of the advantage option has arrived (step S103), and when it is determined that the end timing of the valid period has arrived, cancels the advantage option of the corresponding player (step S121) and terminates the operations.

The game management unit 103 cancels the advantage option of the corresponding player, by deleting the player ID of the corresponding player from the advantage option information.

The game management unit 103 may set the valid period of the advantage option for each option set player, but basically sets the unified valid period for all the players. Thus, the game management unit 103 cancels the advantage option of all the option set players in the processing in step S121.

On the other hand, when the game management unit 103 determines that the end timing of the valid period has not arrived yet, the mission management unit 107 determines whether the mission accomplishment condition of the set mission is satisfied (step S104).

In this process, when the mission management unit 107 determines that the accomplishment condition of the set mission is satisfied, the processing proceeds to step S111. When the mission accomplishment condition is determined to be not satisfied, the processing proceeds to step S105.

Next, when the mission accomplishment condition set by the mission management unit 107 is determined to be not satisfied, the status detection unit 106 detects for the corresponding option set player or option player's player character, a predetermined game status (such as points or a record of the player) (step S105).

Next, based on the reward change information, the reward control unit 108 determines whether to change the currently set reward (standard reward when no change has been made yet, or a changed reward when a change has been made) in accordance with the detected game status (step S106).

In this case, upon determining to change the currently set reward, the reward control unit 108 changes the reward in accordance with the corresponding reward change information (step S107), and the processing proceeds to step S103. When the currently set reward is determined not to be changed, the processing directly proceeds to step S103.

On the other hand, when the mission management unit 107 determines that the mission accomplishment condition of the currently set option is satisfied, the reward control unit 108 sets the set reward to be acquired by the corresponding option set player (step S111).

The mission management unit 107 determines whether there is a mission to be set next (step S112). When it is determined that there is the mission to be set next, the corresponding mission is set for the option set player (step S113), and the processing proceeds to step S103.

Upon determining that there is no mission to be set next, the mission management unit 107 notifies the terminal device 20 of the player of the accomplishment of all the missions (step S114), cancels the advantage option of the corresponding player (step S121), and terminates the operations.

3.6. Others

The invention is not limited to the embodiment described above, and various modifications can be made. For example, any term cited with a different term having a broader meaning or the same meaning in the specification and the drawings may be replaced by the different term in any place in the specification and the drawings.

In the third embodiment, the terminal devices 20 may be provided with each game by a single server 10 or a plurality of servers 10 may operate in conjunction with one another to construct a server system to provide the terminal devices 20 with each game.

In the third embodiment, the game provided by the server 10 is executed by the terminal device 20. Alternatively, an operation input may be omitted, and the functions of the processing unit 200 and execution of the game program by the terminal device 20 described above may be executed by the server 10, and the terminal device 20 may implement the game described above by executing image display through an operation input and streaming.

Furthermore, the third embodiment may be implemented by a single game device having the functions of the server 10, that is, a (standalone) device that operates independently without depending on other devices such as the server. In this case, a plurality of input terminal devices may be provided.

Such a plurality of game terminal devices may be connected to each other in a wired or wireless manner, and one game device may function as the server 10, and a plurality of game devices may implement the game.

In the third embodiment, the game system according to the invention is applied to the server 10 that executes the game while cooperating with the terminal device 20 via the network. Alternatively, the invention can be applied to a tablet type information terminal device, a personal computer, or a game device installed in an amusement park.

The invention includes substantially identical configurations (for example, configurations having identical functions, methods, and results, or configurations having identical objects and advantageous effects) as in the configuration described in the third embodiment. Further, the invention includes configurations in which non-essential portions of the configurations described in the third embodiment are replaced. Further, the invention also includes configurations that achieve identical advantageous effects and configurations capable of achieving identical objects as in the configurations described in the third embodiment. Further, the invention includes configurations in which a publicly known technology is added to the configurations described in the third embodiment.

The third embodiment of the invention has been described in detail above, but those skilled in the art will readily appreciate that various modifications can be made from the embodiment without materially departing from the novel teachings and effects of the invention. Accordingly, all such modifications are assumed to be included in the scope of the invention.

What is claimed is:

1. A server system configured to cause a terminal device, connected to the server system via a network, to execute a game, the server system comprising a processor programmed to:
   receive an operation instruction from a player via the terminal device;
   set, for the player, based on the operation instruction from the player that has been received, an advantage option indicating an option to give an advantage in the game to the player during a given valid period, wherein the given valid period is a predetermined period which is between a predetermined start timing and a predetermined end timing;
   control a storage storing, as advantage option information, information of a specification of the advantage option including at least mission information defining a mission accomplishment condition indicating a condition of a mission to be accomplished within the given valid period by the player for which the advantage option is set and a reward to be acquired by the player upon accomplishing the mission;
   make the game progress, for an option set player that is the player for which the advantage option is set or an option set player character that is an operation target of the option set player, based on the operation instruction from the option set player and using the advantage option information associated with the advantage option set for the option set player;
   determine whether or not the option set player or the option set player character satisfies the mission accomplishment condition defined in the mission information during the given valid period;
   execute reward control processing of setting, when the option set player or the option set player character is determined to satisfy the mission accomplishment condition, the reward defined in the mission information to be acquirable by the option set player;
   execute option status detection processing of detecting as an option status, at a predetermined timing during the given valid period, the option status being a status of an option element indicating an element related to the advantage option set for the option set player;
   determine whether or not the option element has more advantage than a reference set in advance;
   execute specification change processing of changing, when the option element has more advantage than the reference, based on a detection result of the option status detection processing, at least one of (a) the specification of a set advantage option indicating the advantage option that is set for the option set player, and (b) the specification of another advantage option different from the set advantage option set for the option set player; and provide game information of the game including information related to the reward acquired, to the terminal device.

2. The server system according to claim 1, wherein
in the mission information, an order in which the determination is performed for a plurality of the mission accomplishment conditions is defined in advance, and
the processor is programmed to:
execute mission determination processing of determining whether the mission accomplishment condition of the mission information set for the player is satisfied, and
as the mission determination processing, determine, in the defined order, whether each of the mission accomplishment conditions is satisfied.

3. The server system according to claim 1, wherein
the processor is programmed to:
detect as the option status, a comparison result as a result of comparing the option element with a given reference; and
execute, based on the comparison result as the option status detected, the specification change processing of changing the specification of the set advantage option or the specification of the other advantage option.

4. The server system according to claim 1, wherein
the processor is programmed to:
detect, as the option status, a contribution level indicating a contribution of the option element to the game; and
execute, based on the contribution level of the option element, the specification change processing of changing the specification of at least one of the set advantage option and the other advantage option.

5. The server system according to claim 4, wherein
the processor is programmed to:
detects, as the contribution level, a numerical value related to use of the reward acquired as a result of accomplishment of the mission; and
execute the specification change processing of changing the specification related to the reward for the set advantage option or the other advantage option to a specification with which another reward with the contribution level satisfying a given condition is acquired with a priority over other rewards.

6. The server system according to claim 1, wherein
the processor is programmed to detect, for the option set player, a progress status of the mission defined in the mission information of the advantage option set for the option set player, as the option status of the advantage option.

7. The server system according to claim 6, wherein
the processor is programmed to detect, based on a temporal element related to the mission defined in the mission information of the advantage option, the progress status of the mission.

8. The server system according to claim 1, wherein
the processor is programmed to:
execute mission switching processing of, when a given special condition in the game is satisfied in a case where the game processing is executed for the option set player based on a specific mission accomplishment condition in the mission information, switching the mission accomplishment condition of the mission executed by the option set player to a mission accomplishment condition defined as a mission to be executed first in the mission information; and detect an execution status of the mission switching processing as the option status of the set advantage option.

9. The server system according to claim 1, wherein
the processor is programmed to change the specification of the set advantage option or the other advantage option, by changing a degree of difficulty of the mission accomplishment condition defined in the mission information of the advantage option.

10. The server system according to claim 9, wherein
the processor is programmed to change, when the degree of difficulty of the mission accomplishment condition is changed, a content of the reward associated with the mission accomplishment condition in accordance with the changed degree of difficulty.

11. The server system according to claim 1, wherein
the processor is programmed to:
as the option status detection processing, detect the option status for an attribute of the option element, and
execute, based on the option status for the attribute, the specification change processing of changing the specification of at least one of the set advantage option and the other advantage option.

12. The server system according to claim 1, wherein
the processor is programmed to:
detect, as the option status, a status of a change in the specification of the set advantage option or the other advantage option in the specification change processing; and
execute, based on the change in the specification of the set advantage option or the other advantage option, the specification change processing of changing the specification of at least one of the set advantage option and the other advantage option.

13. The server system according to claim 1, wherein
the processor is programmed to;
detect, as the option status, a given status of another option element of another player different from the option set player; and
execute, based on a detection result of the option status of the other option element of the other player, the specification change processing of changing the specification of at least one of the set advantage option and the other advantage option.

14. A game execution method of causing a terminal device to execute a game, the method comprising:
executing reception processing of receiving an operation instruction from a player via the terminal device;
setting, for the player, based on the operation instruction from the player that has been received, an advantage option indicating an option to give an advantage in the game to the player during a given valid period, wherein the given valid period is a predetermined period which is between a predetermined start timing and a predetermined end timing,
controlling a storage storing, as advantage option information, information of a specification of an advantage option including at least mission information defining a mission accomplishment condition indicating a condition of a mission to be accomplished within the given valid period by the player for which the advantage option is set, and a reward to be acquired by the player upon accomplishing the mission;
making the game progress, for an option set player that is the player for which the advantage option is set or an option set player character that is an operation target of the option set player, based on the operation instruction from the option set player and using the advantage option information associated with the advantage option set for the option set player;

determining whether or not the option set player or the option set player character satisfies the mission accomplishment condition defined in the mission information during the given valid period;

executing reward control processing of setting, when the option set player or the option set player character is determined to satisfy the mission accomplishment condition, a reward defined in the mission information to be acquirable by the option set player;

executing option status detection processing of detecting as an option status, at a predetermined timing during the given valid period, the option status being a status of an option element indicating an element related to the advantage option set for the option set player;

determining whether or not the option element has more advantage than a reference set in advance;

executing specification change processing of changing, when the option element has more advantage than the reference, based on a detection result of the option status detection processing, at least one of (a) the specification of a set advantage option indicating the advantage option that is set for the option set player, and (b) the specification of another advantage option indicating another advantage option to be set for the option set player after the valid period ends; and displaying game information of the game including information related to the reward acquired, on the terminal device.

15. A game system configured to execute a game, the game system comprising a processor programmed to:

receive an operation instruction from a player;

a setting unit configured to set, for the player, based on the operation instruction from the player that has been received, an advantage option indicating an option to give an advantage in the game to the player during a given valid period, wherein the given valid period is a predetermined period which is between a predetermined start timing and a predetermined end timing;

control a storage storing, as advantage option information, information of a specification of an advantage option including at least mission information defining a mission accomplishment condition indicating a condition of a mission to be accomplished within the given valid period by the player for which the advantage option is set, and a reward to be acquired by the player upon accomplishing the mission;

make the game progress, for an option set player that is the player for which the advantage option is set or an option set player character that is an operation target of the option set player, based on the operation instruction from the option set player and using the advantage option information associated with the advantage option set for the option set player; a reward control unit configured to execute reward control processing of setting, when the option set player is determined to have satisfied the mission accomplishment condition defined in the mission information within the valid period, a reward defined in the mission information to be acquirable by the option set player;

determine whether or not the option set player or the option set player character satisfies the mission accomplishment condition defined in the mission information during the given valid period;

execute option status detection processing of detecting as an option status, at a predetermined timing during the given valid period, the option status being a status of an option element indicating an element related to the advantage option set for the option set player;

determine whether or not the option element has more advantage than a reference set in advance;

execute specification change processing of changing, when the option element has more advantage than the reference, based on a detection result of the option status detection processing, at least one of (a) the specification of a set advantage option indicating the advantage option that is set for the option set player, and (b) the specification of another advantage option indicating another advantage option to be set for the option set player after the valid period ends; and display on a display, game information related to the game including information of the reward acquired.

16. A server system configured to cause a terminal device, connected to the server system via a network, to execute a game, the server system comprising a processor programmed to:

receive an operation instruction from a player via the terminal device;

execute the game based on the operation instruction from the player that has been received;

control a storage storing mission information in which a mission accomplishment condition indicating a condition of a mission to be accomplished within a given valid period by the player and a reward acquired by the player when the mission is accomplished are defined in association with a type of an advantage option indicating an option for giving an advantage to the player in the game during the given valid period, wherein the given valid period is a predetermined period which is between a predetermined start timing and a predetermined end timing;

execute, based on a given selection instruction, selection setting processing of setting, for the player, when an advantage option associated with the player is selected from a plurality of the advantage options as a selected advantage option, first mission information stored in association with the selected advantage option;

determine whether or not the player satisfies a first mission accomplishment condition defined in the first mission information during the given valid period;

execute, when the player is determined to satisfy the first mission accomplishment condition, reward control processing of setting a first reward defined in the first mission information to be acquirable by the player;

provide game information of the game, including at least information of the reward set to be acquirable, to the terminal device;

set, for the player, when it is determined that an accomplishment status of the mission accomplishment condition defined in the first mission information or an acquisition status of the first reward defined in the first mission information regarding the player for which the first mission information is set satisfies a given status determination condition, second mission information stored in association with an unselected advantage option different from the selected advantage option selected;

determine whether or not the player satisfies a second mission accomplishment condition defined in the second mission information during the given valid period; and execute, when the player is determined to satisfy the second mission accomplishment condition, the reward control processing of setting a second reward defined in the second mission information to be acquirable by the player.

17. The server system according to claim 16, wherein the processor is programmed to manage the valid period as a common period for the plurality of advantage options.

18. The server system according to claim 16, wherein in the mission information, a plurality of the mission accomplishment conditions and a plurality of the rewards corresponding to the respective mission accomplishment conditions are set, and the processor is programmed to execute, when a corresponding one of the plurality of mission accomplishment conditions in the mission information set for the player is determined to be satisfied within the valid period, the reward control processing of setting the reward defined in association with the mission accomplishment condition thus determined, to be acquirable by the player.

19. The server system according to claim 18, wherein in the mission information, an order in which the determination is performed for the plurality of mission accomplishment conditions is defined, and the processor is programmed to:

execute mission determination processing of determining whether a mission accomplishment condition in the mission information set for the player is satisfied; and as the mission determination processing, determine, in the defined order, whether each of the mission accomplishment conditions is satisfied.

20. The server system according to claim 19, wherein the processor is programmed to determine, when the second mission information of the unselected advantage option is set for the player, a mission accomplishment condition from which the determination processing starts to be executed among the mission accomplishment conditions defined in the order in the second mission information, in accordance with the accomplishment status of the mission accomplishment condition defined in the first mission information for the selected advantage option or the acquisition status of the reward defined in the first mission information, wherein sequentially execute the mission determination processing on the mission accomplishment conditions associated with the second mission information among the mission accomplishment conditions determined, in the defined order.

21. The server system according to claim 16, wherein the processor is programmed to, when the second mission information is set for the player, stop the reward control processing being executed on the first mission information that has already been set, and execute the reward control processing based only on the second mission information newly set.

22. The server system according to claim 16, wherein a category of a mission to be accomplished as defined in the mission information differs among the advantage options.

23. The server system according to claim 16, wherein a degree of difficulty in the game of a mission to be accomplished as defined in the mission information differs among the advantage options.

24. The server system according to claim 16, wherein the processor is programmed to:

execute status determination processing of determining whether the status determination condition is satisfied; and determine that the status determination condition is satisfied when a plurality of mission accomplishment conditions is defined in the mission information set for the player, and when a certain one of the mission accomplishment conditions is determined to be satisfied.

25. The server system according to claim 24, wherein the processor is programmed to determine that the status determination condition is satisfied, when a mission accomplishment condition with a highest degree of difficulty defined in the mission information set for the player is determined to be satisfied or all the mission accomplishment conditions are determined to be satisfied.

26. The server system according to claim 16, wherein the processor is programmed to:

manage the mission information set for the player; and when the first mission accomplishment condition defined in the first mission information is determined to be satisfied, execute, based on the operation instruction from the player, suspension processing of suspending acquisition of a reward that is defined in the first mission information and is set to be acquirable; and set, in the reward control processing, in accordance with the reward suspended, at least one of the mission accomplishment condition and the reward defined in the second mission information to be advantageous in the game for the player for which the mission information is set.

27. A game execution method of making a terminal device execute a game, the method comprising:

executing reception processing of receiving an operation instruction from a player via the terminal device;

executing the game based on the operation instruction from the player that has been received;

controlling a storage storing mission information in which a mission accomplishment condition indicating a condition of a mission to be accomplished by the player within a given valid period and a reward acquired by the player when the mission is accomplished are defined in association with a type of an advantage option indicating an option for giving an advantage to the player in the game during the given valid period, wherein the given valid period is a predetermined period which is between a predetermined start timing and a predetermined end timing;

executing, based on a given selection instruction, selection setting processing of setting, for the player, when an advantage option associated with the player is selected from a plurality of the advantage options as a selected advantage option, first mission information stored in association with the selected advantage option;

determining whether or not the player satisfies a first mission accomplishment condition defined in the first mission information during the given valid period;

executing, when the player is determined to satisfy the first mission accomplishment condition, reward control processing of setting a first reward defined in the first mission information to be acquirable by the player;

providing game information of the game, including at least information of the reward set to be acquirable, to the terminal device;

setting, as the selection setting processing, for the player, when it is determined that an accomplishment status of the mission accomplishment condition defined in the first mission information or an acquisition status of the first reward defined in the first mission information regarding the player for which the first mission information is set satisfies a given status determination condition, second mission information stored in association with an unselected advantage option different from the selected advantage option selected;

determining whether or not the player satisfies a second mission accomplishment condition defined in the second mission information during the given valid period; and executing, when the player is determined to satisfy the second mission accomplishment condition, the reward control processing of setting a second reward defined in the second mission information to be acquirable by the player.

28. A game system comprising a processor programmed to:

receive an operation instruction from a player;

execute a game based on the operation instruction from the player that has been received;

control a storage storing mission information in which a mission accomplishment condition indicating a condition of a mission to be accomplished by the player within a given valid period and a reward acquired by the player when the mission is accomplished are defined in association with a type of an advantage option indicating an option for giving an advantage to the player in the game during the given valid period, wherein the given valid period is a predetermined period which is between a predetermined start timing and a predetermined end timing;

execute, based on a given selection instruction, selection setting processing of setting, for the player, when an advantage option associated with the player is selected from a plurality of the advantage options as a selected advantage option, first mission information stored in association with the selected advantage option;

determine whether or not the player satisfies a first mission accomplishment condition defined in the first mission information during the given valid period;

execute, when the player is determined to satisfy the first mission accomplishment condition, reward control processing of setting a first reward defined in the first mission information to be acquirable by the player;

as the selection setting processing, set, for the player, when it is determined that an accomplishment status of the mission accomplishment condition defined in the first mission information or an acquisition status of a first reward defined in the first mission information regarding the player for which the first mission information is set satisfies a given status determination condition, second mission information stored in association with an unselected advantage option different from the selected advantage option selected;

determine whether or not the player satisfies a second mission accomplishment condition defined in the second mission information during the given valid period; and execute, when the player is determined to satisfy the second mission accomplishment condition, the reward control processing of setting a second reward defined in the second mission information to be acquirable by the player.

29. A server system configured to cause a terminal device, connected to the server system via a network, to execute a game, the server system comprising a processor programmed to:

control a storage storing as advantage option information, information of an advantage option having an advantage content defined as a content of an advantage in the game given within a given valid period to a player for which the advantage option is set, wherein the given valid period is a predetermined period which is between a predetermined start timing and a predetermined end timing;

receive an operation instruction from the player via the terminal device;

set the advantage option for the player, based on the operation instruction from the player that has been received;

execute the game, for an option set player that is the player for which the advantage option is set or an option set player character that is an operation target of the option set player, based on the operation instruction from the option set player and using the advantage option information associated with the advantage option set for the option set player;

execute game status detection processing of detecting, at a predetermined timing during the given valid period, a game status of the option set player related to the game;

determine whether or not the game status has more advantage than a reference set in advance;

execute change processing of changing, when the game status has more advantage than the reference, the advantage content given to the option set player, based on a detection result of the game status detection processing; and provide to the terminal device, game information of the game including information of the advantage content.

30. The server system according to claim 29, wherein the processor programmed to execute the game status detection processing of detecting as the game status, game element information including a variable game parameter that varies with a game progress of the option set player or the player character that is the operation target of the option set player.

31. The server system according to claim 30, wherein the variable game parameter includes at least one of a parameter related to a record in the game, a parameter related to billing in the game, and a parameter related to an item provided in the game.

32. The server system according to claim 29, wherein the processor is programmed to execute the game status detection processing of detecting as the game status, game element information including at least one of information of whether the option set player or the player character that is the operation target of the option set player has a game element and information of a type of the game element.

33. The server system according to claim 29, wherein the processor is programmed to execute the game status detection processing of detecting as the game status, at least one of a game action related to the option set player or the player character that is the operation target of the option set player and a temporal element related to the game action.

34. The server system according to claim 33, wherein the processor is programmed to detect the game status in a given special period with respect to the valid period.

35. The server system according to claim 33, wherein the processor is programmed to executes the game status detection processing of detecting as the game status, the game action performed by the option set player or the player character that is the operation target of the option set player at a given timing corresponding to the temporal element related to the game action.

36. The server system according to claim 33, wherein the processor is programmed to execute the game status detection processing of detecting as the game status, an access status to the game corresponding to the game action performed by the option set player.

37. The server system according to claim 29, wherein the processor is programmed to execute the game status detection processing of detecting as the game status, related player information of another player related to the option set player.

38. The server system according to claim 37, wherein the related player information includes information of a player in a predetermined relationship with the option set player and information of all players participating in the game.

39. The server system according to claim 29, wherein the processor is programmed to detect for a type of a game action performed by the player character that is the operation target of the option set player, an advantage content change parameter for changing the advantage content, the advantage change parameter varying in accordance with the game status as a result of the game action, and executes the change processing of changing the advantage content based on the advantage change parameter detected.

40. A game execution method of making a terminal device execute a game, the method comprising:
controlling a storage storing as advantage option information, information of an advantage option having an advantage content defined as a content of an advantage in the game given within a given valid period to a player for which the advantage option is set, wherein the given valid period is a predetermined period which is between a predetermined start timing and a predetermined end timing;
executing reception processing of receiving an operation instruction from the player via the terminal device;
setting the advantage option for the player, based on the operation instruction from the player that has been received;
executing the game, for an option set player that is the player for which the advantage option is set or an option set player character that is an operation target of the option set player, based on the operation instruction from the option set player and using the advantage option information associated with the advantage option set for the option set player;
executing game status detection processing of detecting, at a predetermined timing during the given valid period, a game status of the option set player related to the game;
determining whether or not the game status has more advantage than a reference set in advance;
executing change processing of changing, when the game status has more advantage than the reference, the advantage content given to the option set player, based on a detection result of the game status detection processing; and
causing the terminal device to display game information of the game, including information of the advantage content.

41. A game system executing a game, the game system comprising the processor programmed to:
control a storage storing as advantage option information, information of an advantage option having an advantage content defined as a content of an advantage in the game given to a player within a given valid period to which the advantage option is set, wherein the given valid period is a predetermined period which is between a predetermined start timing and a predetermined end timing;
receive an operation instruction from the player via the terminal device;
set the advantage option for the player, based on the operation instruction from the player that has been received;
execute the game, for an option set player that is the player for which the advantage option is set or an option set player character that is an operation target of the option set player, based on the operation instruction from the option set player and using the advantage option information associated with the advantage option set for the option set player;
execute game status detection processing of detecting, at a predetermined timing during the given valid period, a game status of the option set player related to the game;
determine whether or not the game status has more advantage than a reference set in advance;
execute change processing of changing, when the game status has more advantage than the reference, the advantage content given to the option set player, based on a detection result of the game status detection processing; and
cause a display to display game information of the game, including information of the advantage content.

* * * * *